US011436765B2

(12) United States Patent
George et al.

(10) Patent No.: US 11,436,765 B2
(45) Date of Patent: Sep. 6, 2022

(54) METHOD AND SYSTEM FOR FAST REPROJECTION

(71) Applicant: InstaRecon, Inc., Urbana, IL (US)

(72) Inventors: Ashvin K George, Golden, CO (US);
Jeffrey Brokish, Savoy, IL (US);
Yoram Bresler, Urbana, IL (US)

(73) Assignee: InstaRecon, Urbana, IL (US)

( * ) Notice: Subject to any disclaimer, the term of this patent is extended or adjusted under 35 U.S.C. 154(b) by 0 days.

(21) Appl. No.: 16/685,659

(22) Filed: Nov. 15, 2019

(65) Prior Publication Data

US 2020/0202590 A1    Jun. 25, 2020

Related U.S. Application Data

(60) Provisional application No. 62/767,637, filed on Nov. 15, 2018.

(51) Int. Cl.
*G06T 11/00*    (2006.01)
(52) U.S. Cl.
CPC .................. *G06T 11/006* (2013.01)
(58) Field of Classification Search
CPC .............. G06T 11/003–008; G06T 2211/428
See application file for complete search history.

(56) References Cited

U.S. PATENT DOCUMENTS

| 7,729,526 | B2 | 6/2010 | George et al. |
| 8,121,378 | B2 | 2/2012 | George et al. |
| 2008/0212860 | A1* | 9/2008 | Schomberg ........... G06T 11/006 382/131 |

(Continued)

FOREIGN PATENT DOCUMENTS

| DE | 102007020879 A1 | * | 4/2009 | .......... G06T 11/006 |
| JP | 2018085140 A | * | 5/2018 | ............. G06T 5/006 |
| WO | WO-2017019161 A1 | * | 2/2017 | ............. G06F 16/41 |

OTHER PUBLICATIONS

Levakhina, ch. 3 Forward and backprojection model (FP/BP), Three-Dimensional Digital Tomosynthesis (2014), Springer Fachmedien Wisebaden, p. 43-74. (Year: 2014).*

(Continued)

*Primary Examiner* — Matthew C Bella
*Assistant Examiner* — Kathleen M Broughton
(74) *Attorney, Agent, or Firm* — Greer, Burns & Crain, Ltd.; Steven P. Fallon

(57) ABSTRACT

Methods and systems for computed tomography provide advances in efficiency. The methods operating within the parallel-beam geometry, rather than a divergent beam geometry, for the majority of the operations. In back projection methods perform digital image coordinate transformations on selected intermediate-images, the parameters of one or more coordinate transformations being chosen such that Fourier spectral support of the intermediate-image is modified so that a region of interest has an increased extent along one or more coordinate direction and the aggregates of the intermediate-images can be represented with a desired accuracy by sparse samples. Forward projection methods perform digital image coordinate transformations on an input image to produce multiple intermediate-images, the parameters of one or more coordinate transformations being chosen such that Fourier spectral support of an intermediate-image being produced is modified so that a region of interest has a reduced extent along one or more coordinate direction and the intermediate-images can be represented with a desired accuracy by sparse samples.

17 Claims, 42 Drawing Sheets

(56) References Cited

U.S. PATENT DOCUMENTS

| | | | | |
|---|---|---|---|---|
| 2010/0002955 | A1* | 1/2010 | George | G06T 15/08 |
| | | | | 382/280 |
| 2016/0247302 | A1* | 8/2016 | Pan | G06T 11/005 |
| 2017/0003392 | A1* | 1/2017 | Bartlett | G01S 7/4814 |
| 2019/0099146 | A1* | 4/2019 | Mistretta | A61B 6/504 |

OTHER PUBLICATIONS

Levakhina, Three-Dimensional Digital Tomosynthesis, 2014, Springer Fachmedian Wiesbaden, 43-74. (Year: 2014).*

Long et al, 3D Forward and Back-Projection for X-Ray CT Using Separable Footprints, 2010, IEEE Trans Med Imaging; 29(11): 1839-1850. (Year: 2010).*

George et al, Shear-Based Fast Hierarchical Backprojection for Parallel-Beam Tomography, 2007, IEEE Transactions on Medical Imaging, 26(3):317-334. (Year: 2007).*

Ahmad et al, Four-dimensional volume-of-interest reconstruction for cone-beam computed tomography-guided radiation therapy, 2011, Med. Phys. 38 (10): 5646-5656. (Year: 2011).*

George et al., "Shear-Based Fast Hierarchical Backprojection for Parallel-Beam Tomography", IEEE Transactions on Medical Imaging, 2007, pp. 317-334, vol. 26, No. 3, IEEE.

Kak et al., Chapter 3 from Principles of Computerized Tomographic Imaging, 1988, IEEE Press.

George et al., "A fast fan-beam backprojection algorithm based on efficient sampling", Physics in Medicine and Biology, 2013, pp. 1415-1431, vol. 58, Institute of Physics Publishing.

Antoniou, Section 8.2.7 from Digital Signal Processing, 2005, McGraw-Hill Professional.

Weisstein, "Legendre-Gauss Quadrature", 2017, From MathWorld—A Wolfram Web Resource.

Noo et al., "Exact helical reconstruction using native cone-beam geometries", Physics in Medicine and Biology, 2003, pp. 3787-3818, vol. 48, Institute of Physics Publishing.

Markoe, Definition 2.74 from Analytic Tomography, vol. 13, 2006, Cambridge University Press.

Blu et al., "MOMS: Maximal-Order Interpolation of Minimal Support", IEEE Transactions on Image Processing, 2001, pp. 1069-1080, vol. 10, No. 7, IEEE.

* cited by examiner

Selected intermediate images in DTFT Domain :

(i)

(ii)

(iii)

(iv)

(v)

Level 1

Level 2

PARALLEL-BEAM

FAN-BEAM

DTFT DOMAIN

SAMPLE DOMAIN

⋮

$S_N$

∪

$S_{N+1}$

∪

$S_{N+2}$

∪

⋮

$= [-\pi, \pi]^3$

2D DTFT DOMAIN:

3D DTFT DOMAIN:

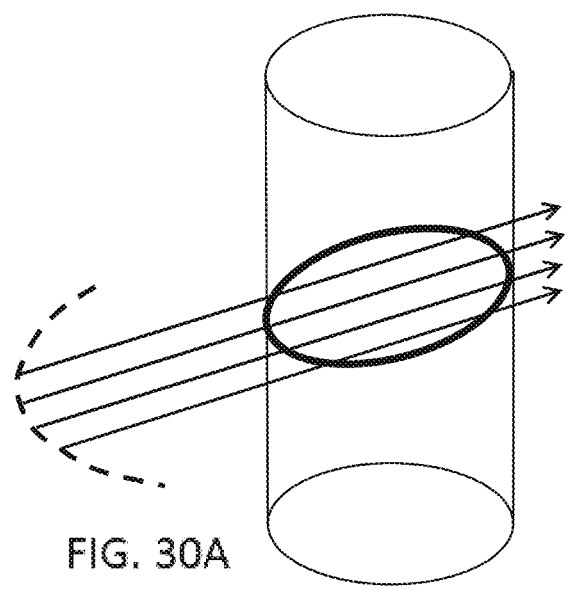
FIG. 30A
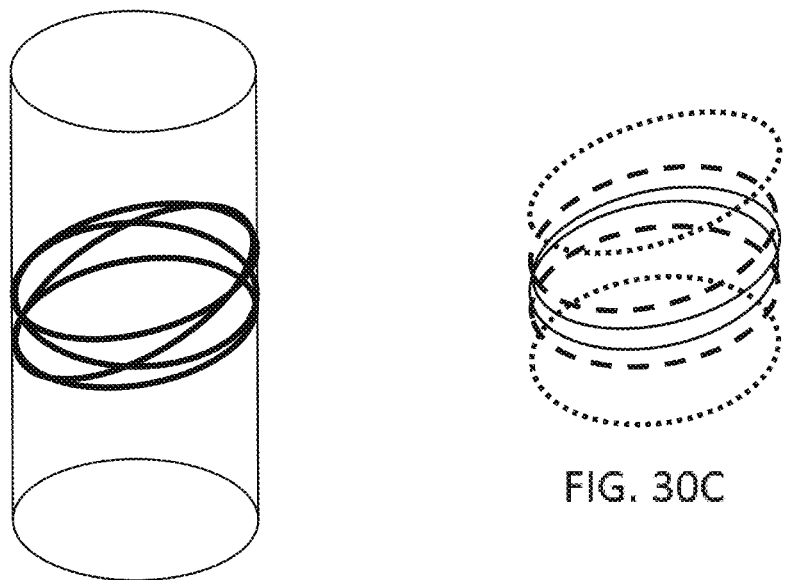
FIG. 30C
FIG. 30B

```
def A_s_transpose(h):
    int m = M-1   #Highest index
    int zh = n_st(m)
    float running_sum = 0 for (m=M-2; m>=0; m--):
        int next_zh=zh
        zh = n_st(m)
        running_sum+=h[m+1]
        for(k=zh; k<next_zh; k++):
            y_hat[k]=running_sum return y_hat
```

FIG. 40

METHOD AND SYSTEM FOR FAST REPROJECTION

PRIORITY CLAIM AND REFERENCE TO RELATED APPLICATION

The application claims priority under 35 U.S.C. § 119 from prior provisional application Ser. No. 62/767,637, which was filed Nov. 15, 2018.

STATEMENT OF GOVERNMENT INTEREST

This invention was made with government support under R44EB014669 awarded by National Institutes of Health, National Center for Advancing Translational Sciences (NCATS) and National Institute of Biomedical Imaging and Bioengineering (NIBIB). The government has certain rights in the invention.

FIELD OF THE INVENTION

The present invention relates to computed tomographic imaging. The invention is applicable to various computed tomography techniques, including, for example, X-ray Computed Tomography (CT), single photon emission computed tomography (SPECT), positron emission tomography (PET), synchrotron radiation tomography, certain modes of magnetic resonance imaging (MRI), ultrasound tomography, optical tomography, synthetic aperture radar, and other tomographic imaging modalities. The invention described here is a method and system for use in the reconstruction of images from tomographic data.

Methods and systems of the invention provide the ability determine the forward projection (also known as reprojection, or X-ray transform) of a digital (discrete) image in a variety of imaging geometries, including parallel-beam, fan-beam, 3D cone-beam, and 3D helical (spiral) cone-beam. Methods and systems of the invention can also be used to determine the adjoint operation of forward projection, that is, backprojection, in the same imaging geometries.

The invention is a family of fast algorithms for the backprojection of images from tomographic projections or the reprojection of images to produce tomographic projections, which alone or in combination are key components in tomographic image formation. Backprojection can be used directly for the reconstruction of an image from projections such as in the filtered backprojection method. Alternatively backprojection and reprojection can be used in a loop or repeatedly for the iterative or deep-learning-based reconstruction of images from tomographic projections. Reprojection can also be used in processes of correction or mitigation of image artifacts, such those due to as beam hardening, scatter, misalignment, etc.

The invention improves on the methods and systems for performing the backprojection and reprojection computational operations, in computational requirements, namely by providing higher speed and/or reduced memory requirements, or improved accuracy, or combination thereof.

BACKGROUND OF THE INVENTION

Computed tomography techniques including X-ray Computed Tomography (CT), single photon emission computed tomography (SPECT), positron emission tomography (PET), synchrotron radiation, etc. are well-established imaging modalities. Systems using these imaging modalities (referred to as tomographic imaging systems) are used in applications such as medical, biomedical, security, and industrial, with the scanned objects being patients, small animals, material or tissue samples, pieces of luggage, or manufactured parts.

A computational process that is commonly used in tomographic imaging systems is reprojection, which, for a given two-dimension (2D) or three dimensional (3D) image, produces a set of numbers known as projections, which are closely related to the set of measurements that would be measured by a detector array in a tomographic system. Another commonly used computational process is backprojection, which is the adjoint or transpose of reprojection, and which, for a given set of projections or pre-processed projections, creates a corresponding image.

The accuracy with which the operations of reprojection and backprojection are performed affects the quality of images produced by tomographic imaging systems. Also, reprojection and backprojection are some of the most computationally demanding operations in tomographic imaging systems. For these reasons, much effort has been devoted to the development of reprojection and backprojection methods that are both accurate and computationally efficient when implemented on computers or special-purpose hardware.

The algorithm is based on previous work on fast algorithms for the parallel-beam geometry [1] and is related to our US patents on tomographic backprojection (BP) and reprojection (RP) [7, 8]. These patents, U.S. Pat. Nos. 7,729,52; 8,121,37 are incorporated herein by reference in their entirety.

The methods of this invention are significantly more efficient computationally, or more accurate, or both, than previously described related tomographic RP/BP methods such as those described in [3, 7, 8]. The various reprojectors described above also have corresponding backprojection methods, with related advantages and drawbacks.

REFERENCES

[1] George A and Bresler Y, *Shear-Based Fast Hierarchical Backprojection for Parallel-Beam Tomography*, IEEE Trans Med Imag 26 (2007), 317-34.

[2] Kak A C and Slaney M, *Computerized Tomographic Imaging*, IEEE Press, 1988.

[3] George A K and Bresler Y, *A fast fan-beam backprojection algorithm based on efficient sampling*, Physics in medicine and biology 58 (2013), 1415.

[4] Andreas Antoniou, *Digital signal processing*, McGraw-Hill, 2005.

[5] Weisstein E W, *Legendre-Gauss Quadrature*, (2017), From MathWorld—A Wolfram Web Resource. http://mathworld.wolfram.com/Legendre-GaussQuadrature.html.

[6] Noo F, Pack J, and Heuscher D, *Exact helical reconstruction using native cone-beam geometries*, Phys Med Biol 48 (2003), 3787-3818.

[7] A. K. George and Y. Bresler, Fast hierarchical tomography methods and apparatus, Jun. 1, 2010, U.S. Pat. No. 7,729,526.

[8] George & Bresler, Fast hierarchical tomography methods and apparatus, Feb. 21, 2012, U.S. Pat. No. 8,121,378.

[9] Andrew Markoe, Analytic tomography, vol. 13, Cambridge University Press, 2006.

[10] Blu T, Thevenaz P, and Unser M, *MOMS: Maximal-Order Interpolation of Minimal Support*, IEEE Trans Image Process 10 (2001), 1069-1080.

SUMMARY OF THE INVENTION

A preferred method for back projection in computed tomography (CT) obtains a pixel image. In the method a subject is imaged with a divergent beam source to obtain image projections taken along a collection of lines, curves, or surfaces. Intermediate-images are produced, one or more of which are sampled on a sheared Cartesian grid from selected projections. Digital image coordinate transformations are performed on selected intermediate-images, the parameters of one or more coordinate transformations being chosen such that Fourier spectral support of the intermediate-image is modified so that a region of interest has an increased extent along one or more coordinate direction and the aggregates of the intermediate-images can be represented with a desired accuracy by sparse samples. Subsets of transformed intermediate-images are aggregated to produce aggregate intermediate-images. The transformations and aggregating are repeated in a recursive manner until all projections and intermediate images have been processed and aggregated to form the pixel image.

A preferred method for forward projection in computed tomography (CT) obtains output tomographic projections from a pixel image. The pixel image is provided as an input image. Digital image coordinate transformations are performed on the input image to produce multiple intermediate-images, the parameters of one or more coordinate transformations being chosen such that Fourier spectral support of an intermediate-image being produced is modified so that a region of interest has a reduced extent along one or more coordinate direction and the intermediate-images can be represented with a desired accuracy by sparse samples. The coordinate transformations are repeated in a recursive manner, for a finite number of recursions, to produce additional intermediate-images of which one or more are sampled on a sheared Cartesian grid. Samples of the output tomographic projections are produced by interpolation of the intermediate-images onto lines, curves or surface, and weighted summation of the data along lines, curves, or surfaces.

BRIEF DESCRIPTION OF THE DRAWINGS

FIG. 1A 2D Parallel beam Geometry with view-angle $\theta$ and detector coordinate t, FIG. 1B 2D Curved Fan Beam Geometry with source-angle $\beta$ and fan angle $\alpha$, FIG. 1C 3D Curved Cone Beam Geometry with a helical trajectory; source-angle $\beta$, fan-angle $\alpha$ and vertical detector coordinates v;

FIG. 2A The projection ray ($\mathcal{P}_\theta f$)(t) is the line-integral computed along the line indicated by the red dashed arrow. The set of all such line-integrals for all $t \in \mathbb{R}$ form a single parallel-beam projection at view $\theta$. FIG. 2B The geometry used in the derivation of shear-scale based RP as explained in Appendix A;

FIG. 5A A path from the root to a single leaf of the block-diagram in FIG. 4 corresponding to RP at a single parallel-beam view-angle. FIG. 5B Fourier transform of input image. The solid line represents the spectral support of a single parallel-beam projection at view angle $\theta$ as explained by the Fourier Slice theorem. The striped square is simply to illustrate the geometric transformation. FIG. 5C The shear operator $\mathcal{S}(-\tan \theta)$ along the $x_1$ axis causes the Fourier transform to be sheared along $\omega_2$ such that the spectral support of $p_\theta$ lies on the $\omega_1$-axis FIG. 5D The subsequent shear-scale operator $\mathcal{C}(\sec \theta, 0)$ results in a coordinate scaling along $x_1$ by a factor of sec $\theta$, and a stretching of the spectral support along the $\omega_1$ axis by sec $\theta$;

FIG. 13A Spectral support of parent image $I_{l,m}^d$ FIG. 13B Spectral support of parent image upon shearing. After decimation this will yield the child image $I_{l+1,3m}^d$. Because of the periodicty of the DTFT the parts extending beyond the $\pm\pi$ boundaries are wrapped in the $[-\pi, \pi]$ interval along $\omega_s$ but this is not shown for simplicity;

FIG. 14A In the parallel beam case the shear-scale operator $\mathcal{C}$ is equivalent to interpolating the input image along a set of slanted, parallel lines. FIG. 14B The zero-view-projection operator is equivalent to summing the shear-scaled image along the slow coordinate. FIG. 14C In contrast in the fan-beam case the first operation is an interpolation onto a set of slanted, non-parallel lines followed by FIG. 14D summing the resulting image along the slow coordinate;

FIG. 16A The DTFT of the input image showing the spectral support of the parallel beam projection containing the ray whose parallel-beam view angle is $\theta'$ (i.e., "the spectral support of the ray"). FIG. 16B The DTFT of the kernel-stage input image that contains the spectrum of this parallel-beam projection FIG. 16C shows the location of the ray $(\theta', t')$ in the coordinate system of the input image y (in FIG. 11) and FIG. 16D shows the location of this ray when transformed into the coordinate system of the relevant kernel-stage input image;

FIG. 17A The rays in the projection set are parameterized by sourc-angle $\beta$, fan-angle $\alpha$ and vertical detector coordinate v. Here the trajectory of the source is helical/spiral. FIG. 17B Circular source trajectory;

FIG. 18A In spatial coordinates a 3D parallel-beam X-ray transform projection is parameterized by a azimuthal angle $\theta$ and elevation angle $\xi$. FIG. 18B In the 3D Fourier domain the support of this projection is a 2D plane that is oriented at $(\theta, \xi)$ as shown;

FIG. 19A-C Shows the evolution of the DTFT support of a single child branch in a decomposition stage node of the 2D RP algorithm. The striped region in FIG. 19A is the subset of the DTFT of the parent image that gets retained in the child image. Recursively applying the evolution in FIG. 19A-C to all the decomposition levels we see that the subset of the DTFT of the input image that gets retained in a kernel-stage input image is as shown in D. FIG. 19E In the narrow-cone method every z-slice of the input image is operated on identically so the 3D spectral support corresponding to the 2D spectral support shown in FIG. 19D is a slab extended along $\omega_z$. FIG. 19F For large $|\xi|$ the spectral support of the parallel-beam projection no longer lies inside the support of the kernel-stage input image. FIG. 19G A side view of FIG. 19F showing how the spectral support of the projection falls outside the support of the kernel-stage input image;

FIG. 24B Partitioning of $\theta$-$\xi$ plane for the corresponding low-cone-angle DIA method;

FIG. 25A A subset of the $\theta$-$\xi$ plane. Four points in the plane are indicated by (i)-(iv). Each point corresponds to a 3D PB projection. FIG. 25B-E The 3D spectral support of the 3D PB projections corresponding to points (i)-(iv). In each plot the spectral support of the projection is shown by the cross-hatched plane and the spectral support of the kernel-stage image is indicated by the rectangular cuboid. While in cases (i)-(iii) the spectral support of the projection lies inside the kernel-stage image, in case (iv) it does not. This leads to the diamond shape of the cell in FIG. 25A shown by the solid black diamond;

FIG. 26C The three spectral supports corresponding to the solid circles in FIG. 26B are indicated by the planes; differentiated by the line-style of the plane edge (dashed, dotted and dot-dashed). The spectral support of the kernel-stage image containing them is shown by the cuboid containing the planes;

FIG. 27A Recall in the 2D algorithm the spectral support of any intermediate image corresponds to a slanted strip in the DTFT of the input image. This spectral support can be transformed to baseband by a shear in the DTFT domain along w, that is equivalent to a shear in the space domain along f. FIG. 27B In the case of wide-cone angle RP method, a sequence of two shears can transform the spectral support of any intermediate image to baseband. The spectral support of the intermediate image, in the DTFT domain of the input image is as shown in (b1), after a shear in the Fourier domain in $\omega_s$-$\omega_f$ the spectral support is transformed to the slab shown in (b2), and after a shear in $\omega_s$-$\omega_z$ the spectral support is transformed to the slab shown in (b3) such that it has a low bandwidth along $\omega_s$;

FIG. 28B The $\theta$-$\xi$ partitioning in the second lowest decomposition levels is constructed by combining the cells from the lowest decomposition levels in groups of 3×3. Each parent cell, indicated by the thick diamonds, contains a set of 3×3 child cells. FIG. 28C The θ-ξ partitioning in the highest decomposition level results after repeated 3×3 combinations of lower levels. Here we are interested in a geometry that has a max cone angle of 10° so the region of the θ-ξ plane that we are interested in is [−45°, +135°]×[−10°, 10°]

FIGS. 30A-30C illustrate how spatial Localization of rays within a θ-ξ cell allows for the intermediate images to be cropped in such a way that their z-extent scales by a factor of 3 from one level to the next. Without loss of generality we are showing the case of a CCB geometry. FIG. 30A All rays that share the same (θ, ξ) intersect the cylinderical shell of the FOV in a 3D curve that lies on a plane. FIG. 30B The curves corresponding to the four corner points of a θ-ξ diamond in the lowest decomposition level are shown by the black curves. The containing volume of the whole cell is computed by finding the z extent of these curves. FIG. 30C The containing volume of the three lowest levels in the decomposition stage are indicated by solid, dashed and dotted ellipses respectively. The z-extent of the three containing volumes scales by a factor of 3 from a child to a parent level;

FIG. 31A Consider the intermediate image corresponding to the θ-ξ cell indicated by the thick-lined diamond. FIG. 31B The spectral support of this image in the domain of the DTFT of the input image to the RP algorithm. FIG. 31C The spatial support, i.e. the borders of the containing volume, in the coordinate system of the input image to the RP algorithm. FIG. 31D The spectral support of this image after transformation to baseband. Note that the bandwidth along $\omega_s$ is small. FIG. 31E The spatial support of this intermediate image after transformation to baseband;

FIG. 37A Geometry of a single ray with parallel-beam detector coordinate t and view-angle θ. FIG. 37B Integration width for finite detector modeling. FIG. 37C Computing r (distance from a sample to source). FIG. 37D Beamlets from a point source to a set of detectorlets. FIG. 37E) Integration width for finite focal spot modeling. FIG. 37F Beamlets from a set of detectorlets to a point detector;

FIG. 39A Matrix $A_s$ representing the forward cumulative sum operator. The entries in the cross-hatched region are 1. All other entries are zeros. The dark lines denote the borders between regions. The dashed lines denote individual rows or columns. FIG. 39B The matrix of the adjoint of cumulative sum operator denoted $A_s^T$;

FIG. 40 is pseudocode for the adjoint of cumulative sum part of integrating detector interpolation;

DETAILED DESCRIPTION OF PREFERRED EMBODIMENTS

Figure 1A:
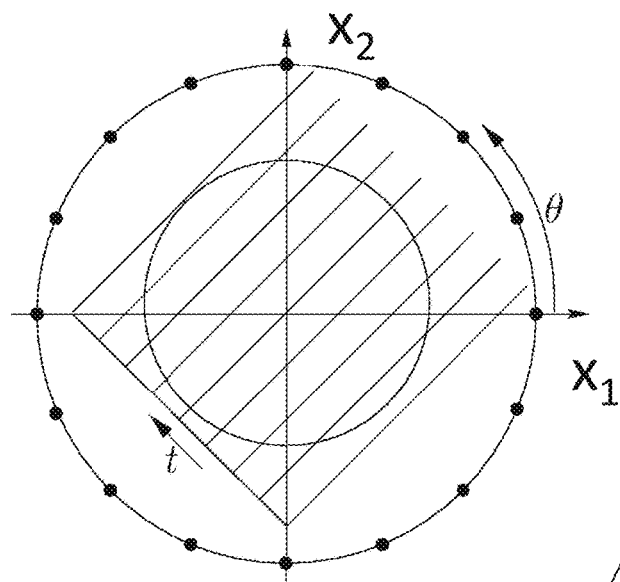
FIGS. 1A-1C are illustrations of some of the tomographic imaging geometries to which this invention is applicable.

Methods of the invention provide computationally efficient and accurate methods for reprojection and for backprojection that overcome drawbacks of the existing methods discussed in the background Preferred embodiments provides advances in efficiency. Important aspects of preferred embodiments include methods to obtain a pixel image (1) operating within the parallel-beam geometry, rather than a divergent-beam geometry, for the majority of the operations, (2) representing images in the hybrid space-Fourier domain rather than the space domain, (3) allowing adjacent 2D slices of the 3D volume to be operated on independently, and (4) determining the image transformations and cropping that allow for an efficient implementation on geometries with large cone angles.

Preferred embodiments can be implemented in reconfigurable hardware such as field-programmable gate array (FPGA), or special purpose hardware such as an application specific integrated circuit (ASIC), in which cases no separate storage of instructions or computer programs is required instead the structure of the hardware (computing circuit) is adapted to execute the methods of this invention on image data fed into this hardware, which then produces the desired output in accordance with methods of the invention.

Those knowledgeable in the art will appreciate that other embodiments of the present invention lend themselves well to practice in the form of computer program products. Accordingly, it will be appreciated that embodiments of the present invention may comprise computer program products comprising computer executable instructions stored on a non-transitory computer readable medium that, when executed, cause a computer to undertake methods according to the present invention, or a computer configured to carry out such methods. The executable instructions may comprise computer program language instructions that have been compiled into a machine-readable format. The non-transitory computer-readable medium may comprise, by way of example, a magnetic, optical, signal-based, and/or circuitry medium useful for storing data. The instructions may be downloaded entirely or in part from a networked computer. Also, it will be appreciated that the term "computer" as used herein is intended to broadly refer to any machine capable of reading and executing recorded instructions. It will also be understood that results of methods of the present invention may be displayed on one or more monitors or displays (e.g., as text, graphics, charts, code, etc.), printed on suitable media, stored in appropriate memory or storage, etc.

Preferred embodiments of the invention will now be discussed with respect to the drawings. The drawings may include schematic representations, which will be understood by artisans in view of the general knowledge in the art and the description that follows. Features may be exaggerated in the drawings for emphasis, and features may not be to scale.

Figure 1B:
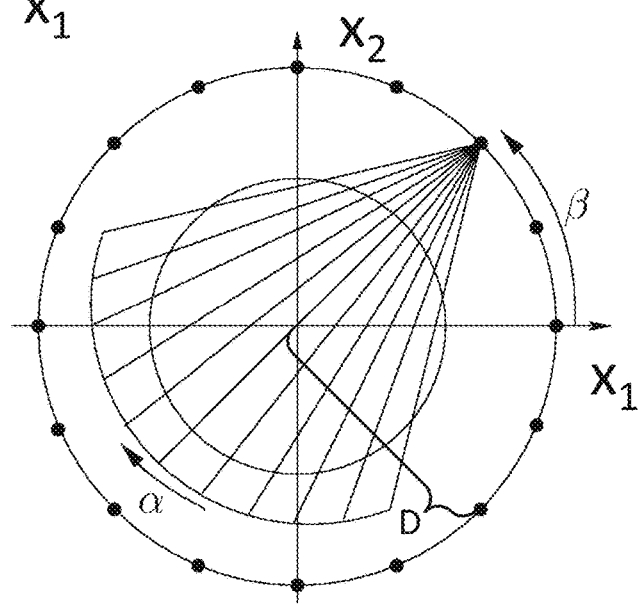
Figure 1C:
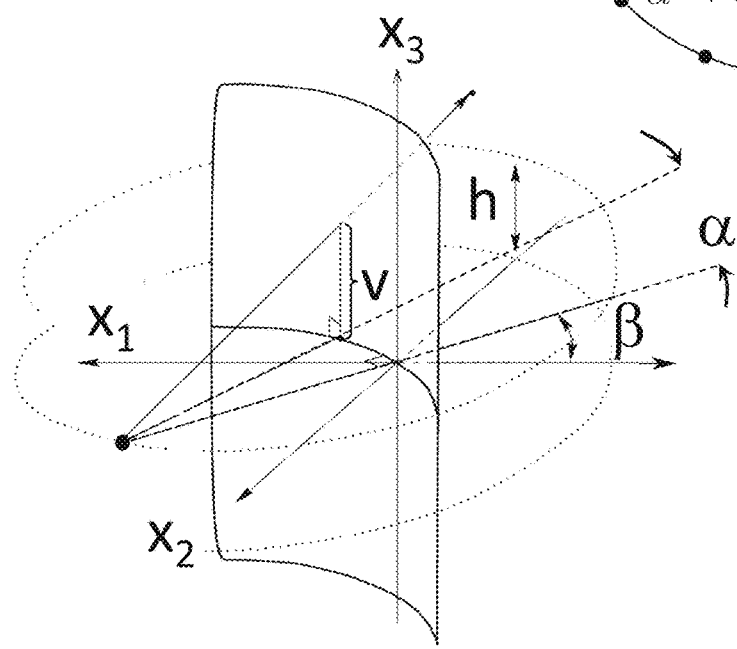

1.1 Definitions Etc 1.1.1 Tomography Basics
- a. Tomographic reconstruction refers to the mathematical problem of computing the values of a function $y: \mathbb{R}^n \to \mathbb{R}$ given a set of line-integrals through it.
- b. A line in $\mathbb{R}^n$ can be fully characterized by a point in space $\vec{x}_0$ and a unit direction vector $\vec{d}$, so a line-integral through y is defined as $\int_{-\infty}^{\infty} y(\vec{x}_0 + t\vec{d})dt$. We refer to the line along which this integral is performed as a "ray".
- c. (Re)projection (RP) is the mathematical operation of computing a set of such line integrals from $y(\vec{x})$. The phrase "compute a ray" refers to computing the integral along a single such line.
- d. The location and orientation of the lines along which integrals are computed depend on the geometry and physics of the data acquisition. In X-ray tomography the lines along which the integrals are computed connect an X-ray source to a detector. The geometry of the X-ray tomography problem refers to the description positions of the sources, and the relative position of the sources and detectors. FIGS. 1A-1C show several common classes of tomographic geometries for 2D and 3D.
- e. As shown in FIGS. 1A-1C, the location of the source and the detector in common geometries can be characterized by a small number of parameters.
    For example, as shown in FIG. 1A, in the 2D parallel-beam geometry there are two parameters: the view-angle θ and the detector coordinate t. The set of sources lie on a line that is oriented at a view-angle θ relative to the X-axis. The detectors, numbering the same as the sources, lie on a parallel line to the sources. The line-integral lines connect each source to its corresponding detector.
    In 2D fan-beam geometries, as shown in FIG. 1B, the line integral lines connect a single source to multiple detectors. The location of the source is characterized by the source-radius D and the view-angle β. The location of the detectors is characterized by the fan-angle α.
    The common 3D geometries have a similar parameterization to the 2D Fan Beam geometries. As shown in FIG. 1C additional parameters capture the location and orientation of the line-integral lines in the third coordinate dimension. Comparing the 2D geometry in FIG. 1B to its 3D equivalent in FIG. 1C, we see that the 3D geometry parameterization has the following additional parameters. It has a third spatial coordinate $x_3$. It has a second detector coordinate v, in addition to the fan-angle α, that characterizes the angle of inclination of the detector from the source, and the helical pitch h that encapsulates the movement of the source trajectory along the $x_3$ coordinate axis.
    While these are only a few of the possible tomographic geometries and associated parameterizations, they illustrate the ways in which the locations of the source and detectors are typically characterized.
- f. In each of these geometries we consider a single projection to be the set of line-integrals that share the same view-angle. So for the 2D fan-beam geometries a single projection is the 1D function that is constructed by holding the view-angle β fixed and only varying the detector coordinate s or α, as appropriate. In the case of 3D cone-beam geometries a single projection is the 2D function that is constructed by holding the view-angle β fixed and varying the two detector coordinates (u, v), in the case of the flat cone beam geometry, or (α, v) in the case of the curved cone beam geometry.
- g. Backprojection is the mathematical adjoint to reprojection [9]. There are several tomographic reconstruction algorithms that first perform a preprocessing step in which the projections are filtered and weighted followed by a backprojection of those filtered projections to recover an estimate of the original function y.

1.1.2 Image Notation

We sometimes use vector notation for the coordinates of an image. So $y(\vec{x}) \triangleq y(x_1, x_2, \ldots, x_N)$. We sometimes denote discrete domain images by square brackets, i.e., $y[\vec{n}]$, for $\vec{n} \in \mathbb{Z}^n$, to distinguish them from continuous-domain images that are indicated by curved brackets i.e., $y(\vec{x})$, for $\vec{x} \in \mathbb{R}^n$.

1.1.3 Linear Transformation in Fourier-Domain

The following are the relationship between the spatial and Fourier domains [1] when an image is subject to a linear tranformation V.

Suppose an image $y(\vec{x})$ is transformed in the spatial domain by matrix V i.e. $g(\vec{x}) = y(V\vec{x})$ Then in the Fourier domain the Fourier transform $y(\vec{\omega})$ of $y(\vec{x})$ it undergoes the following transformation: $G(\vec{\omega}) = (1/|V|) Y(V^{-T}\vec{\omega})$, where $|V|$ is the determinant of the matrix V Consequently a point that is located at $\vec{x}_f$ in the input image y will be transformed to the location $\vec{x}_g = V^{-1}\vec{x}_f$ in the output image g.

Similarly a point in the spectral support originally located at $\vec{\omega}_f$ in the Fourier transform $y(\vec{\omega})$ of the input image $y(\vec{x})$ will be transformed to the location $\vec{\omega}_g = V^T \vec{\omega}_f$ in the Fourier transform $G(\vec{\omega})$ of the output image $g(\vec{x})$.

1.1.4 Spline Interpolation

Let us define the 1D interpolation operation as follows. Given a discrete-domain signal $y^d$, sampling interval T, some interpolating function $\psi$ (such as the sinc or a spline-based function), and a set of output coordinates $\{x_n | n \in \mathbb{Z}\}$, then the interpolated signal $g^d$ is defined as follows.

$$g^d[n] = y(x_n) \text{ where } y(x) = \sum_m \psi\left(\frac{x-mT}{T}\right) y^d[m] \quad (1)$$

We assume that $\psi$ satisfies the interpolation condition i.e.

$\psi(0)=1$ and $\psi(k)=0$ if $k \in \mathbb{Z} \setminus \{0\}$ (2)

Here $y^d$ is the original discrete-domain signal. The continuous-domain function y is what is produced when $y^d$ is interpolated from the discrete-domain to the continuous-domain using basis function $\psi$. $g^d$ is the discrete-domain signal that is produced by sampling $y(x)$ at the set of output coordinates $\{x_n\}$.

The discrete-domain 1D interpolation operation from $y^d$ to $g^d$ can be written in one step as follows:

$$g^d[n] = \sum_m \psi(x_n/T - m) y^d[m] \quad (3)$$

This framework can be generalized to use basis functions $\psi$ that do not satisfy the interpolation condition (2). Unser at al. [10] demonstrated that using a spline basis function can achieve high-quality but computationally cheap interpolation. In this case (1) generalizes to:

$$g^d[n] = y(x_n) \text{ where } y(x) = \sum_m \psi(x-m) \hat{y}^d[m] \quad (4)$$

The signal $\vec{y}^d$ is the set of weights of the basis function and the key is that $\hat{y}^d \neq \vec{y}^d$. Interpolation can be implemented cheaply in two steps:
1) An IIR filtering step, that we call a spline transform. In this step the weights $y^d$ of the basis function are computed from the input signal $y^d$.
2) An FIR filtering step that we call a spline FIR operation. Here the output samples $g^d$ are produced from the basis function weights:

$$g^d[n] = \sum_m \psi\left(\frac{x_n}{T} - m\right) \hat{y}^d[m] \quad (5)$$

This FIR filtering operation can be shift-varying if the output sample spacing is different from the input sample spacing. Since the support of the basis function $\psi$ is small, the FIR filter has a small number of taps.

1.1.5 Interpolation Short-Hand

We describe the specifics for the case of a 3D image. Let $y^d[\vec{n}]$ be a discrete domain image where $\vec{n} \in \mathbb{Z}^3$. Consider the interpolation of this image at some point $\vec{x}$ where $\vec{x} \in \mathbb{R}^3$. We denote this operation by the short-hand $y^d[\vec{x}]$. Here the square brackets [.] indicate that the function is in the discrete domain. By this we mean the following $$y^d[\vec{x}] \triangleq \sum_{\vec{m}} \psi\left(\frac{x_1}{T} - m_1\right) \psi\left(\frac{x_2}{T} - m_2\right) \psi\left(\frac{x_3}{T} - m_3\right) y^d[\vec{m}]$$

Here $\psi$ is the basis function and separable interpolation is shown. If desired, non-separable interpolation may be used too.

1.1.6 Spline Decimation/Interpolation by an Integer Factor

Decimation by an integer factor D is implemented as the adjoint of spline interpolation by an integer factor D. Denoting the impulse response of the spline transform operator corresponding to $\psi$ by $\psi^{-1}$, we can express spline interpolation by an integer factor D as follows. Here the input signal is $g_{LO}$ and the output interpolated signal is $g_{HI}$: $\hat{g}_{LO} = \psi^{-1} * g_{LO}$ followed by $$g_{HI}[n] = \hat{g}_{LO}[n/D] = \sum_m \psi(n/D - m) \hat{g}_{LO}[m] \quad (6)$$

Here * is the 1D convolution operator.

We implement decimation by an integer factor, by taking the adjoint of the interpolation equation (6), which results in the following two step operation:

$$\hat{g}_{LO}[m] = \sum_m \psi(n/D - m) g_{HI}[n] \text{ followed by } g_{LO} = \psi^{-1} * \hat{g}_{LO} \quad (7)$$

1.2 2D Parallel-Beam Geometry

In preparation for the description of the full cone-beam reprojection (RP) and backprojection (BP) methods, we first describe RP, and similarly BP, for the simpler parallel-beam geometry. Since this section describes a simplified form of the algorithm it will only sketch out some aspects of the methods and will leave more details to the next section on the fan-beam geometry (Section 1.3)

1.2.1 Shear-Based RP in Continuous Domain

Consider a 2D continuous domain image $y(x_1, x_2)$. The 1D parallel-beam tomographic projection of y at an angle $\theta$ is the set of all parallel straight-line integrals through the image oriented at the angle $\theta$, as illustrated in FIG. 2A and is defined as follows:

$$(\mathcal{P}_\theta y)(t) \triangleq \int_{-\infty}^{\infty} y\left(\begin{bmatrix} \cos\theta & -\sin\theta \\ \sin\theta & \cos\theta \end{bmatrix}\begin{bmatrix} t \\ s \end{bmatrix}\right) ds \quad (8)$$

Figure 2A:
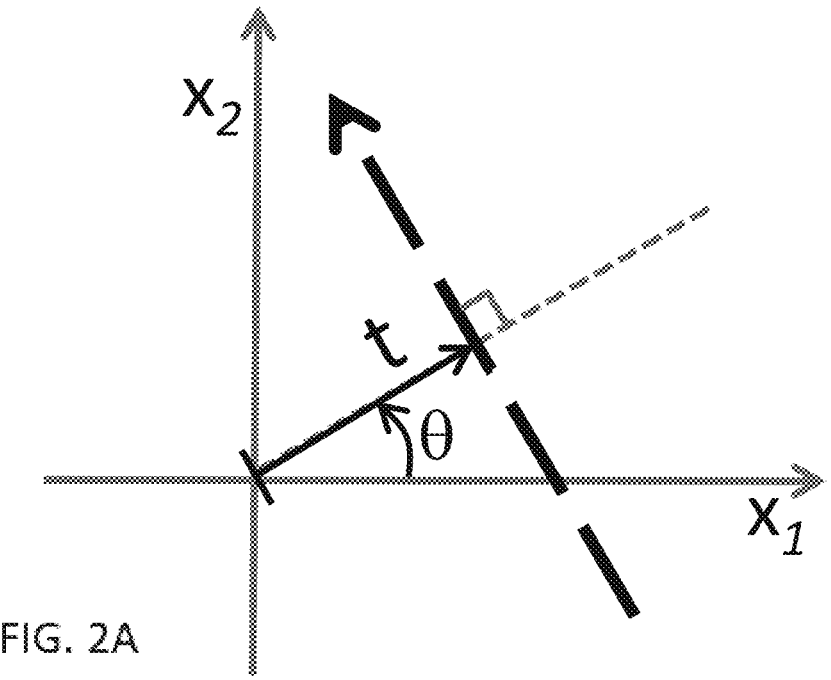
FIGS. 2A-2B illustrate details of the geometry of parallel-beam projection.

In FIG. 2A, the dashed arrow shows the line on which the line-integral is computed for a fixed angle $\theta$ and detector coordinate t.

From the way in which (8) is written, it is easy to see that RP at an angle $\theta$ is equivalent to performing a clockwise rotation by $\theta$ on the input image y and then integrating the rotated image along the second (vertical) coordinate.

We instead show that RP can also be expressed as performing a different image transformation (a shear followed by a coordinate scaling, which we denote by $\mathcal{C}$ and refer to as a shear-scale) and then integrating the shear-scaled image along the second (vertical) coordinate (and scaling the output by $1/\cos\theta$):

$$(\mathcal{P}_\theta y)(t) = \frac{1}{\cos\theta}\int_{-\infty}^{\infty} y\left(\begin{bmatrix} 1/\cos\theta & -\tan\theta \\ 0 & 1 \end{bmatrix}\begin{bmatrix} t \\ s \end{bmatrix}\right) ds \qquad (9)$$

The proof of this is in Section A. Henceforth, for conciseness, we sometimes use "sec $\theta$" instead of "1/cos $\theta$".

Let us define the following two linear image transformation operators (each $\mathbb{R}^2 \to \mathbb{R}^2$)

Figure 3A:
FIGS. 3A-3C are illustrations of Shearing and Shear-scaling FIG. 3A Original image f, FIG. 3B Sheared image $\mathcal{S}(\alpha)f$, defined in (10), with $\alpha=0.2$, FIG. 3C Shear-scaled image $\mathcal{C}(\sigma_1, \sigma_2)f$, defined in (11), with $\sigma_1=1.5$ and $\sigma_2=0.2$.
Figure 3B:

$\mathcal{S}(\mu)$: Shear by $\mu$ along the first coordinate. This operation is illustrated in FIGS. 3A-B and is defined as follows $$(\mathcal{S}(\mu)y)(\vec{x}) = y\left(\begin{bmatrix} 1 & \mu \\ 0 & 1 \end{bmatrix}\vec{x}\right) \qquad (10)$$

Figure 3C:

$\mathcal{C}(\sigma_1, \sigma_2)$: Shear-scale along the first coordinate, with parameter $\vec{\sigma} = [\sigma_1 \ \sigma_2]^T$. The shear parameter is $\sigma_2$ and the scale parameter is $\sigma_1$. This operation is illustrated in the transformation from FIG. 3A to FIG. 3C and is defined as $$(\mathcal{C}(\vec{\sigma})y)(\vec{x}) = y\left(\begin{bmatrix} \sigma_1 & \sigma_2 \\ 0 & 1 \end{bmatrix}\vec{x}\right) \qquad (11)$$

It can also be shown that the shear and shear-scale operators satisfy the following useful identities. The proofs of these are in Appendix B:

$$\mathcal{S}(\mu_1)\mathcal{S}(\mu_2)\ldots\mathcal{S}(\mu_n) = \mathcal{S}(\mu_1+\mu_2+\ldots+\mu_n) \qquad (12)$$

$$\mathcal{C}(\sigma_1,\sigma_2)\mathcal{S}(\mu) = \mathcal{C}(\sigma_1,\sigma_2+\mu) \qquad (13)$$

$$\mathcal{C}(\mu_1,0)\mathcal{S}(\mu) = \mathcal{C}(\sigma_1,\mu) \text{ By setting } \sigma_2=2=0 \text{ in (13)} \qquad (14)$$

$$\mathcal{C}(\sigma_1,0)\mathcal{S}(\mu_1)\mathcal{S}(\mu_2)\ldots\mathcal{S}(\mu_n) = \mathcal{C}(\sigma_1\cdot\mu_1+\mu_2+\ldots+\mu_n) \text{ Combining (12) and (14)} \qquad (15)$$

The shear-based RP expression (9) can be restated in terms of the shear-scale operator, or a sequence of a shear and scale operator:

$$\mathcal{P}_\theta \stackrel{(11)}{=} \sec\theta\mathcal{P}_0\mathcal{C}(\sec\theta, -\tan\theta) \stackrel{(14)}{=} \sec\theta\mathcal{P}_0\mathcal{C}(\sec\theta, 0)\mathcal{S}(-\tan\theta) \qquad (16)$$

Figure 4:
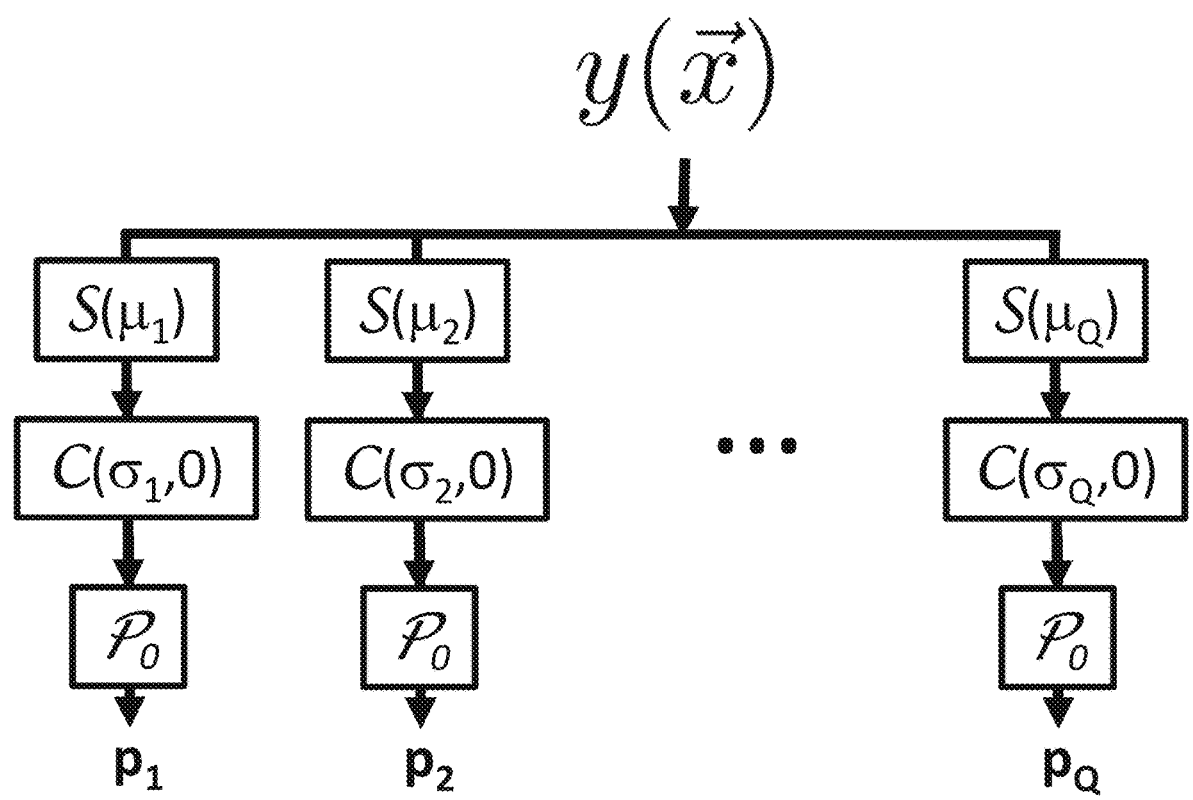
FIG. 4 is a block-diagram of slow, non-hierarchical shear-based RP as described in Section 1.2.1. The input image is y and the output parallel-beam projections are $p_1, \ldots, p_Q$. The intermediate blocks represent shear operators $\mathcal{S}$, shear-scale operators $\mathcal{C}$, and reprojections at a single-view angle $\mathcal{P}_0$.

This says that a reprojection at an angle $\theta$ is equivalent to transforming the input image by the operator $\mathcal{C}$, and then performing a reprojection at a single view-angle $\theta=0$. FIG. 4 is the block diagram representation of (16). The input image is $y(\vec{x})$. The Q output parallel-beam projections $p_1, p_2, \ldots, p_Q$ correspond to view-angles $\theta_1, \theta_2, \ldots, \theta_Q$. So the scale parameters applied in the shear-scale operator blocks, denoted in FIG. 4 by $\mathcal{C}(\sigma_1), \ldots, \mathcal{C}(\sigma_Q)$, are $\sigma_q=\sec\theta_q$. The shear parameters applied in the shear operator blocks, denoted in FIG. 4 by $\mathcal{S}(\mu_1), \ldots, \mathcal{S}(\mu_Q)$, are $\mu_q=-\tan\theta_q$. For now let us only consider $\theta_q \in [-\pi/4, \pi/4)$. For simplicity we omit the weighting by sec $\theta$ from the block diagrams but this scaling should be included in an actual implementation.

1.2.2 Shear-Based RP: Fourier Interpretation

Using a Fourier-domain interpretation of the non-hierarchical block diagram (FIG. 4), we rearrange it into a hierarchical form, that when implemented in the discrete-domain, results in a fast RP algorithm by leveraging the Shannon-Nyquist sampling theory to achieve efficient sampling. The Fourier-domain interpretation combines (a) the Fourier Slice theorem with (b) Fourier-domain understanding of spatial-domain linear geometric image transformations (such as a shear and shear-scale) as explained in Section 1.1.3.

The Fourier slice theorem says that the 1D Fourier transform of a projection at an angle $\theta$ is equal to a radial cut through the 2D Fourier transform of the input image oriented at an angle $\theta$. Denoting a parallel-beam projection at angle $\theta$ by:

$$p_\theta(t) = (\mathcal{P}_\theta y)(\vec{x}) \qquad (17)$$

then its Fourier transform satisfies($\mathcal{F}_1 p_\theta)(\omega) = (\mathcal{F}_2 y)(\omega \cos\theta, \omega \sin\theta) \qquad (18)$ Here we denote the Fourier transform operator in 1 or 2 coordinates by $\mathcal{F}_1$ and $\mathcal{F}_2$ respectively. Note that in the special case when $\theta=0$, the Fourier transform $\mathcal{F}_1 \mathcal{P}_0 y$ is exactly a cut through $\mathcal{F}_2 y$ along the $\omega_1$ axis.

From Section 1.1.3 we know that a spatial shear of y by $\mu$ along $x_1$ results in the Fourier transform of y being sheared by $\mu$ along $\omega_2$. A coordinate-scaling by $\sigma_2$ along $x_1$ (i.e. a shear-scale $\mathcal{C}(0, \sigma_2)$) results in a coordinate-scaling by $1/\sigma_2$ along $\omega_1$ of its Fourier transform.

Figure 5A:
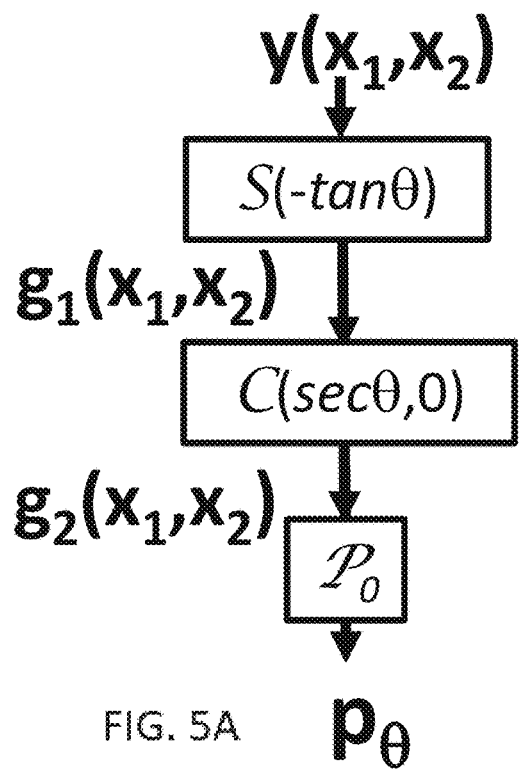
FIGS. 5A-5D are illustrations of the Fourier interpretation of RP via shear and scale.
Figure 5B:
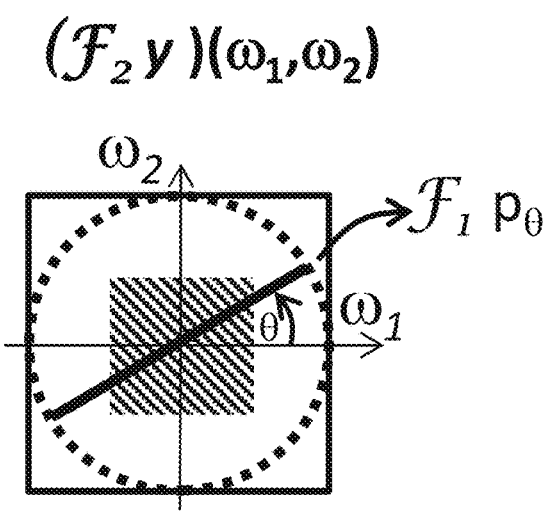
Figure 5C:
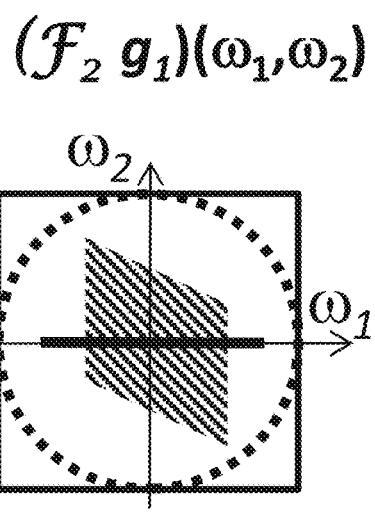
Figure 5D:
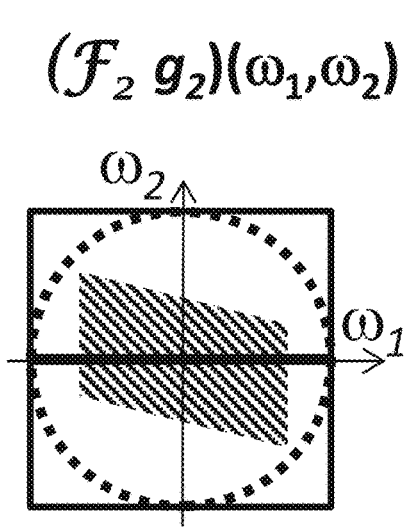

Thus the non-hierarchical shear-based RP represented by FIG. 4 can be interpreted as manipulating the Fourier transform of the input image. This is illustrated in FIGS. 5A-5D. FIG. 5A shows a block diagram of the operations performed on the input image. It shows the path from the root to a single leaf of the block diagram in FIG. 4. The input image y is subject to a shear, denoted by the block $\mathcal{S}(-\tan\theta)$ to produce the image $g_1$, which in turn is subject to the shear-scale operator $\mathcal{C}(-\sec\theta, 0)$ to produce the image $g_2$. FIGS. 5B-D show the effect of these two operations in the Fourier domain.

In FIG. 5B-D, the coordinate transformations of the Fourier transform are illustrated by their effect on a square shaped region in the Fourier domain. In FIG. 5B, the thick line oriented at angle $\theta$ relative to the $\omega_1$ axis represents the spectral support of a single parallel-beam projection at view angle $\theta$ as explained by the Fourier Slice theorem. FIG. 5C shows the spectral support of the sheared image $g_1$. It shows that the Fourier transform of the input image is sheared along $\omega_2$ such that the Fourier content of the desired projection $p_\theta$ (the thick line originally oriented at an angle $\theta$ relative to the $\omega_1$ axis) lies on the $\omega_1$ axis. FIG. 5D shows the spectral support of the shear-scaled image $g_2$. It shows that the Fourier transform is stretched along $\omega_1$. Finally, as indicated by the block $\mathcal{P}_0$ in FIG. 5A, a $\theta=0$ reprojection is computed to extract a 1D cut along the $\omega_1$-axis.

1.2.3 Hierarchical Algorithm (Continuous-Domain)

Figure 6:
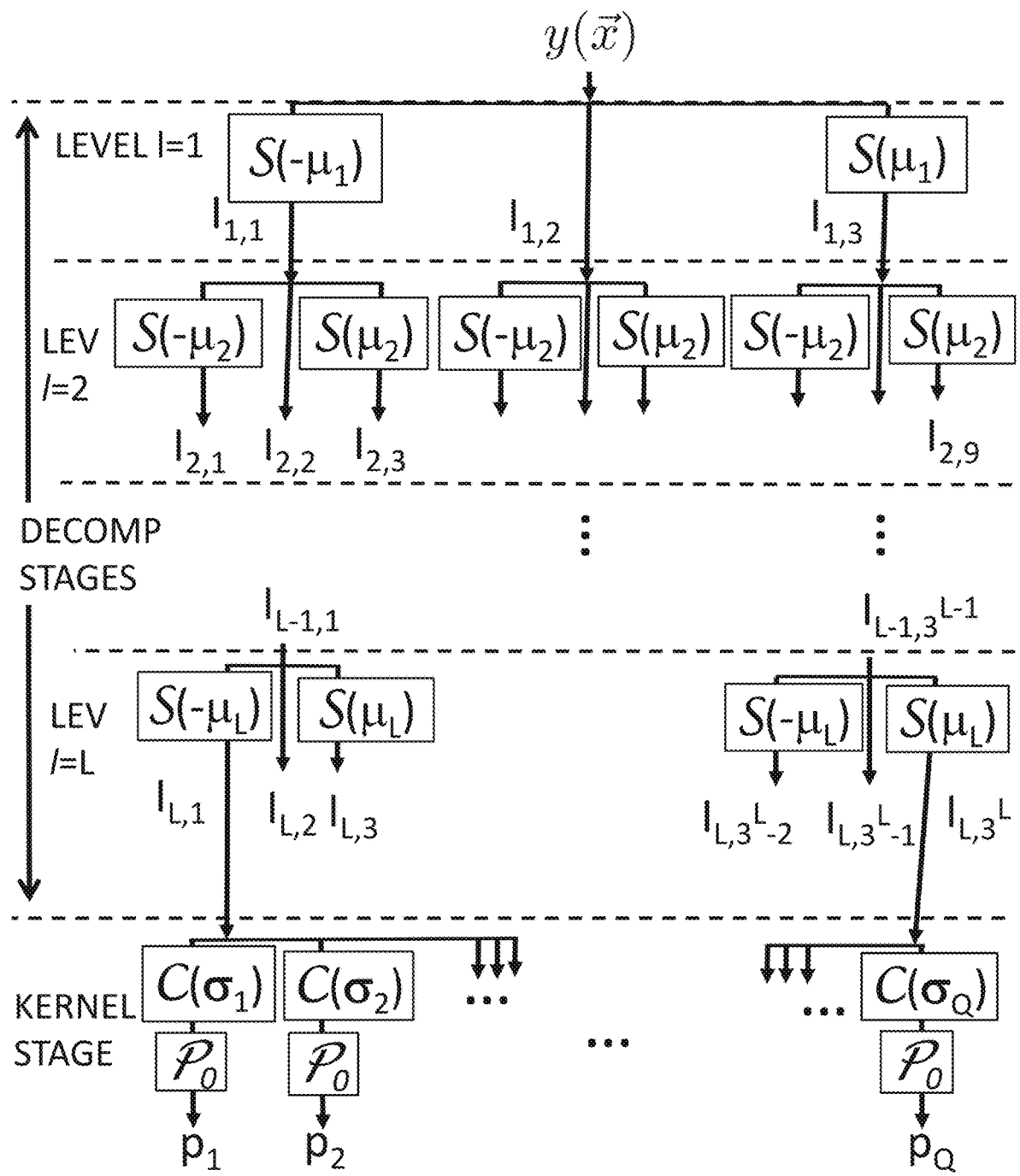
FIG. 6 is block diagram of hierarchical RP for the parallel-beam geometry in the continuous-domain. This block-diagram is a modification of FIG. 4. The input image is y and the output parallel-beam projections are $p_1, p_2, \ldots, p_Q$. As described in Section 1.2.3, the shear and shear-scale operators are rearranged in a hierarchical manner in order that both block-diagrams produce the same output.

Using the identities, (12)-(15), for the shear and shear-scale operators we rearrange the block diagram from FIG. 4 to the hierarchical block diagram shown in FIG. 6. The root node of this hierarchy is the input image $y(\vec{x})$ and the leaves are the output projections $p_1, p_2, \ldots, p_Q$. The first L levels of the hierarchy are called the decomposition stage. At every node in the decomposition stage, the parent image is diverted into three child branches. The image in each child branch is sheared by a different shear factor to produce three child images. (In this particular embodiment of the algorithm, in the central branch of each node the shear factor is 0, so it is omitted). This ternary hierarchy has L levels and therefore the number of images after L levels, i.e. at the end of the decomposition stage, is $3^L$. For brevity we only depicts parts of the decomposition levels 1, 2 and L. The " . . . "s in the block-diagram indicate that in sections of the block-diagram that are not fully illustrated, the missing sections are easily inferred from the nearby sections that are fully illustrated i.e., in the missing sections the blockdiagram should be constructed in a similar hierarchical manner to nearby sections that are fully illustrated.

At the input to the lowest/last stage of the hierarchical tree, what we call the kernel-stage, there are $3^L$ images. At each input node of the kernel-stage the parent image is diverted into child branches. Each child branch corresponds to an output projection at a single view angle. In each branch the input image is first subjected to a shear-scale image transformation operator $\mathcal{C}(\vec{\sigma})$, followed by a zero-view-angle projection.

The cumulative operator that is applied to the input image y to compute any output projection $p_q$ can be determined by following the path from the root of the tree to the $q^{th}$ leaf. It is easy to see that the cumulative operator is a sequence of L shears followed by a shear-scale and a zero-view projection (and scalar multiplication by $\sec \theta_q$) i.e.

$$\mathcal{P}_{\theta_q} y = \sec \theta_q \, \mathcal{P}_0 \mathcal{C}(\vec{\sigma}_q) \mathcal{S}_{(a_L^\nu)} \ldots \mathcal{S}_{(a_2^\nu)} \mathcal{S}_{(a_1^\nu)} y \text{ where } a_l^\nu \in \{-\mu_1, 0, \mu_1\} \quad (19)$$

Here $\vec{\sigma}^\nu = [\sigma_1^\nu, \sigma_2^\nu]^T$. In order for the hierarchical RP block diagram to be correct it is necessary and sufficient for the left hand side (LHS) of (19) to be equal to the LHS of (16). Via the identities (12)-(15), this requires that $$\mathcal{C}(\sigma_1^\nu, \sigma_2^\nu + a_1^\nu + a_2^\nu + \ldots + a_L^\nu) = \mathcal{C}(\sec \theta_q, -\tan \theta_q) \quad (20)$$

The shear and shear-scale parameters in the hierarchy are chosen to satisfy (20). In addition they are chosen such that when this algorithm is implemented in the discrete-domain the intermediate images can be efficiently sampled by leveraging Shannon-Nyquist sampling theory. More details on this are in later sections (1.2.4 and 1.3) in which the discrete-domain methods are described. The mapping of projections to kernel-stage images, i.e., the determination of the set of indices v for which projections $\mathcal{P}_{o_q} y$ are synthesized from kernel-stage image $I_{L,k}$ for $k=1, 2, \ldots, 3^L$, also follows naturally from these parameter choices. The number of projections produced by every kernel-stage node is not necessarily equal and therefore the kernel-stage of the hierarchical tree is not necessarily ternary.

1.2.4 Hierarchical Algorithm (Discrete-Domain)

Figure 7:
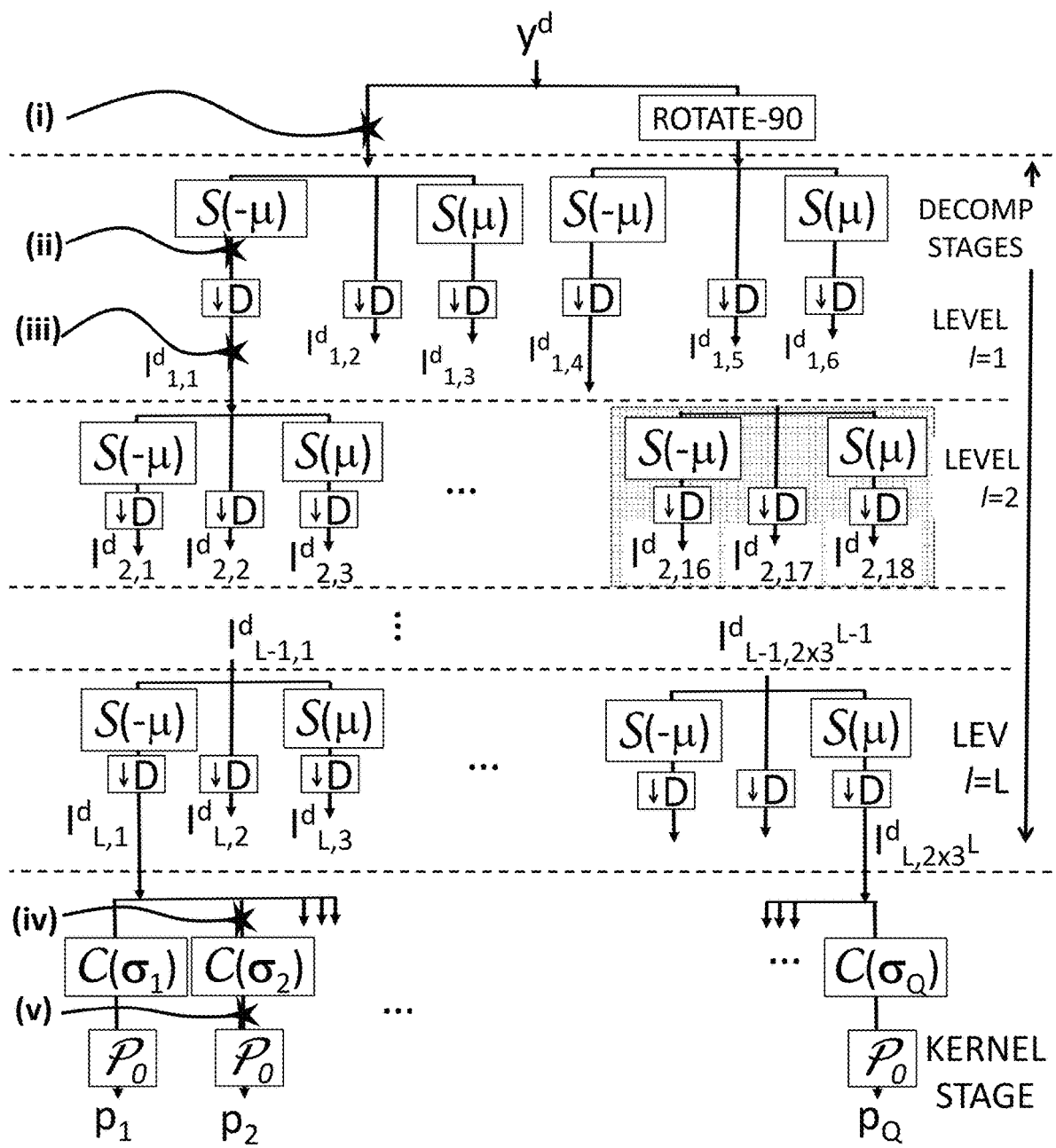
FIG. 7 is an illustration of the discrete-domain hierarchical reprojection algorithm.

FIG. 7 shows the discrete-domain version of the hierarchical RP operator. In this case the input is a 2D discrete-domain image $y^d[m_1, m_2]$, which are samples of a continuous domain image i.e. $y^d[m_1, m_2] = y(Tm_1, Tm_2)$ and the output is a 2D data set of samples of the parallel-beam projections: $p^d[m_\theta, m_t] = (\mathcal{P}_{T_\theta m_\theta} f)(T_t m_t)$. Without loss of generality we can assume that $T = T_t$ i.e. the image sample spacing is equal to the detector coordinate sample spacing. If $T_t \neq T$, the scale parameter of the kernel-stage shear-scale operator can be adjusted to accommodate it.

The image labeled $I_{l,m}^d$, is the discrete-domain equivalent of $I_{l,m}$ in FIG. 6. The blocks labeled, $\mathcal{S}$, $\mathcal{C}$ and $\mathcal{P}_0$ are the discrete-domain equivalent of the shear, shear-scale and zero angle-projection operators in the continuous-domain block diagram (FIG. 6). The block labeled "rotate-90" is a clockwise image rotation by $\pi/2$ radians and is used to be able to reproject a parallel-beam projection at any $\theta$ (not just for $\theta \in [-\pi/4, \pi/4)$).

The decimation blocks, denoted by $\downarrow D$, perform the D-fold reduction in samples in every level. It is the hierarchical structure in conjunction with the decimation that deliver the speedup of the fast algorithm.

The operator blocks in FIG. 7 are defined as follows.

B.1 $\mathcal{S}$, $\mathcal{C}$ and rotate-90 denote the discrete-domain image transformation operators shear, shear-scale and clockwise rotation by $\pi/2$ radians. The input to a discrete-domain image transformation operator is a set of samples $y^d[\vec{m}]$ and the output is the set of samples $g^d[\vec{m}]$. The operator is defined as a sequence of three operations (a) performing the discrete to continuous transformation ($y^d \rightarrow y$):

$$y(x_1, x_2) = \sum_{m_1} \sum_{m_2} \hat{y}^d[m_1, m_2] \psi\left(\frac{x_1}{T} - m_1, \frac{x_2}{T} - m_2\right) \quad (21)$$

where $\psi$ is some basis function (such as the sinc or spline functions) and $\hat{y}^d$ is the basis function weights as explained in Section 1.1.4, (b) applying the linear operator to the continuous-domain image i.e. $g(\vec{x}) = y(V\vec{x})$, and (c) sampling the transformed image on the original grid $g^d(m_1, m_2) = g(Tm_1, Tm_2)$. In practice the whole operation is performed in the discrete domain and no explicit transformation to the continuous domain is necessary.

In the case of the $\mathcal{S}$ operator, $$V = \begin{bmatrix} 1 & \alpha \\ 0 & 1 \end{bmatrix}.$$

In the case of the $\mathcal{C}$ operator, $$V = \begin{bmatrix} \sigma_1 & \sigma_2 \\ 0 & 1 \end{bmatrix}.$$

Note that when the interpolator $\psi$ is separable, both of these operations require only a 1D interpolation operation (as defined in (3)). If $\psi$ is separable it can be expressed as $\psi(x_1, x_2) = \psi_1(x_1)\psi_2(x_2)$ so (21) reduces to:

$$y(x_1, x_2) = \sum_{m_1} \sum_{m_2} \hat{y}^d[m_1, m_2] \psi_1\left(\frac{x_1}{T} - m_1\right) \psi_2\left(\frac{x_2}{T} - m_2\right) \quad (22)$$

Let us pick a 2D basis function $\psi$ such that $\psi_2$ satisfies the interpolation condition property (2) (such as the sinc function) but $\psi_1$ does not (such as a B-spline function). Then the final discrete output image is $$g^d[n_1, n_2] = g(n_1 T, n_2 T) = y(\sigma_1 n_1 T + \sigma_2 n_2 T, n_2 T) \quad (23)$$

$$\stackrel{(21)}{=} \sum_{m_1} \sum_{m_2} y^d[m_1, m_2] \psi_1(\sigma_1 n_1 + \sigma_2 n_2 - m_1) \psi_2(n_2 - m_2) \quad (24)$$

$$= \sum_{m_1} \hat{y}^d[m_1, n_2] \psi_1(\sigma_1 n_1 + \sigma_2 n_2 - m_1) \quad (25)$$

The equality in (25) results from the interpolation condition property (2) i.e., $\psi_2(x)=0$ if $x\in\mathbb{Z}\setminus\{0\}$. For the case of the pure shear, since the scale parameter $\sigma_1=1$, the $\mathcal{S}$ operator reduces further to the following expression:

$$(Sy^d)[n_1, n_2] = g^d[n_1, n_2] = \sum_{m_1} y^d[m_1, n_2]\psi_1(n_1 - m_1 + \alpha n_2) \quad (26)$$

Notice that here the $n_1{}^{th}$-row of the output image $g^d[n_1, \bullet]$ is produced by convolving it with a shifted sampled version of the basis function $\psi$:

$$g^d[\bullet, n_2] = y^d[\bullet, n_2] * h_d^\tau[m]^{\alpha n_2} \text{ where } h_d^\tau[m] \triangleq \psi(m+\tau) \quad (27)$$

Finally in the case of rotate-90 (i.e. clockwise rotation by $\pi/2$ radians)

$$V = \begin{bmatrix} 0 & -1 \\ 1 & 0 \end{bmatrix}.$$

This simplifies to a simple rearranging of pixels: $g^d[n_1, n_2]=y^d[-n_2, n_1]$.

B.2 $\downarrow$ D: Decimation by an integer factor D along the second coordinate. It is a sequence of two operations (a) 1D filtering along the second coordinate with low-pass filter whose passband is $(-\pi/D, \pi/D)$ in the DTFT domain i.e. reduces the bandwidth by a factor of D, followed by (b) downsampling by a factor of D along the second coordinate i.e. $g^d[m, m_2]=y^d[m_1, Dm_2]$. In the Fourier domain the decimation operator scales the frequency content, expanding it by a factor D, along the coordinate along which the decimation is performed (the second coordinate in this case).

B.3 $\mathcal{P}_0$: reprojection at view-angle $\theta=0$. In the discrete-domain this corresponds to summation of the 2D image $y^d$ along the second-coordinate to produce a 1D signal $p_d$. Let $y(\vec{x})$ be defined as in (21) using $\psi$ as the 2D sine interpolator, then $$p_d[m_t] \stackrel{T_t=T}{=} (\mathcal{P}_0 y)(m_t T) \quad (28)$$

$$= \int_{-\infty}^{\infty} y(m_t T, s) ds \quad (29)$$

$$= \int_{-\infty}^{\infty} \sum_{m_1}\sum_{m_2} y^d[m_1, m_2]\psi_1(m_t - m_1)\psi_2\left(\frac{s}{T} - m_2\right) ds \quad (30)$$

$$= \int_{-\infty}^{\infty} \sum_{m_2} y^d[m_t, m_2]\psi_2\left(\frac{s}{T} - m_2\right) ds \quad (31)$$

[Since $\psi_1$ satisfies (2), $m_t \in \mathbb{Z}$]

$$= \sum_{m_2} y^d[m_t, m_2] \int_{-\infty}^{\infty} \psi_2\left(\frac{s}{T} - m_2\right) ds \quad (32)$$

[Since $y^d, \psi_2$ are not pathological]

$$= \sum_{m_2} y^d[m_t, m_2] \int_{-\infty}^{\infty} \psi\left(\frac{s}{T}\right) ds \quad (33)$$

$$\left[\frac{s}{T} \rightarrow \frac{s}{T} - m_2\right]$$

$$\stackrel{[\psi \text{ is sinc}]}{=} T \sum_{m_2} y^d[m_t, m_2] \quad (34)$$

1.2.5 Fourier-Domain Partition Scheme

At each node of the decomposition stage shown in FIG. 7, the input image $y^d$ is diverted into three branches. In each branch the image is subject to a discrete-domain shear by a different shear parameter (+⅔, 0 and −⅔) respectively followed by a decimation by a factor D=3.

These particular shear factors are chosen such that if the spectral support of the input image is divided into wedges, then the DTFT of each child image will contain the DTFT of the input image on a different wedge. This is illustrated in diagrams in FIGS. 8A-E. The intermediate images to which these diagrams refer are indicated by callouts on the block diagram in FIG. 7.

Figure 8A:
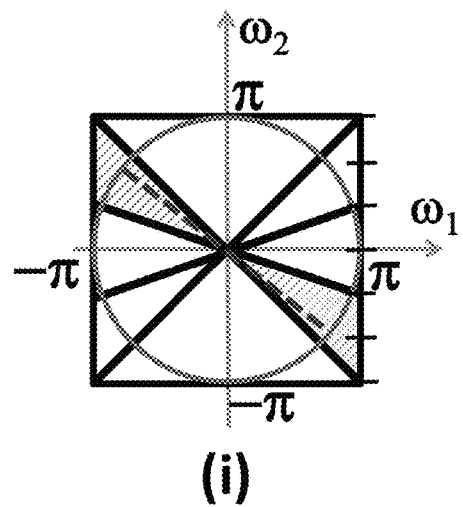
FIGS. 8A-8E illustrate the changes in spectral support and DTFT contents for images in the discrete-domain hierarchical reprojection algorithm.

FIG. 8A shows the input image $y^d$ in the Fourier domain. The notion of spectral support is similar for discrete domain images as it is for continuous domain images. The spectral support of an image $y^d$ is the support of its DTFT $\hat{y}^d$ i.e., contained within a square of size $[-\pi, \pi]\times[-\pi, \pi]$. We are further assuming that the spectral support of the image is restricted to a disc of radius $\pi$ inscribed inside the square, indicated by the circle.

Consider the three bowtie-like wedges whose right boundaries equally divide the $\omega_2$ axis. We refer to wedges whose principal axis is more aligned with the $\omega_1$ axis than the $\omega_2$ axis as horizontal wedges (eg. wedges $W_{1,1}$, $W_{1,2}$, $W_{1,3}$ in FIG. 9A) and those whose principal axis is more aligned with $\omega_2$ axis as vertical wedges (eg. wedges $W_{1,4}$, $W_{1,5}$, $W_{1,6}$ in FIG. 9A).

In FIG. 8A the dashed diagonal, radial line segment denotes the spectral support of a parallel-beam projection. The radial line segment has length $2\pi$ because we are assuming that the spectral support of the image is a disc of radius $\pi$. Of the three horizontal wedges in FIG. 8A, one of the wedges is striped while the other two are not. The striped wedge is the one that happens to contain the spectral support of the parallel-beam projection on which we are focusing.

Figure 8B:
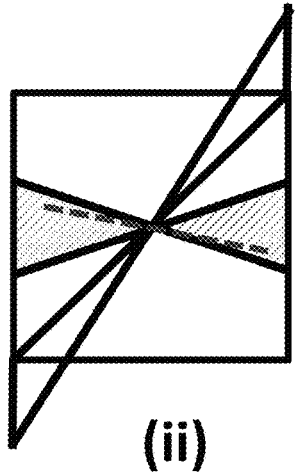

When the image is sheared with shear-parameter +⅔ its spectral support is sheared along the $\omega_2$ axis and the spectral support of the input image is transformed by the matrix $$V^T = \begin{bmatrix} 1 & 0 \\ 2/3 & 1 \end{bmatrix},$$

as explained in Section 1.1.3. So the spectral support of the sheared input image is as shown in FIG. 8B. (It is easy to verify that the wedge boundary points $$\left\{\begin{bmatrix} \pi \\ -\pi \end{bmatrix}, \begin{bmatrix} \pi \\ -\pi/3 \end{bmatrix}\right\}$$

get transformed by $V^T$ to $$\left\{\begin{bmatrix} \pi \\ -\pi/3 \end{bmatrix}, \begin{bmatrix} \pi \\ \pi/3 \end{bmatrix}\right\})$$

Note that the wedge of interest (striped region) is now centered about the $\omega_1$ axis. After the decimation by D=3 the DTFT of the child image is as shown in FIG. 8C, and is stretched to fill the whole $\omega_2$ axis.

Figure 8C:
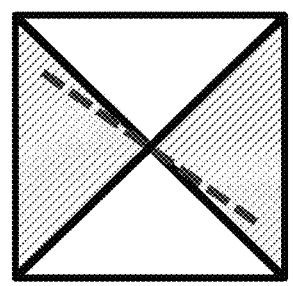

For clarity in FIGS. 8A-C we only depict what happens to the subset of the spectral support that we care about. Specifically we design the operations in a particular branch to manipulate the spectral support wedge of interest (striped region) from the parent image and preserve it intact in the child image. For example in the transformation from FIG. 8A to FIG. 8B all the components of the parent image's spectral support are subject to the same transformation, i.e. a shearing along $\omega_2$. This results in the parts of the spectral support that we do not care about being pushed outside the baseband square $[-\pi, \pi]\times[-\pi, \pi]$ and, because of the periodicity of the DTFT, being aliased back into the baseband square. However, the transformations are designed so that the aliased components do not overlap the spectral support wedge of interest. Next in the transformation from FIG. 8B to FIG. 8C all the components of the spectral support are subject to the same transformation—a 3-fold stretching along the $\omega_2$ axis and then a restriction/cropping to $[-\pi, \pi]$ (assuming the use of an ideal low-pass filter). The low-pass filtering causes the components of the spectral support that we do not care about to be truncated along the $\omega_2$ axis and therefore not preserved intact.

Figure 9A:
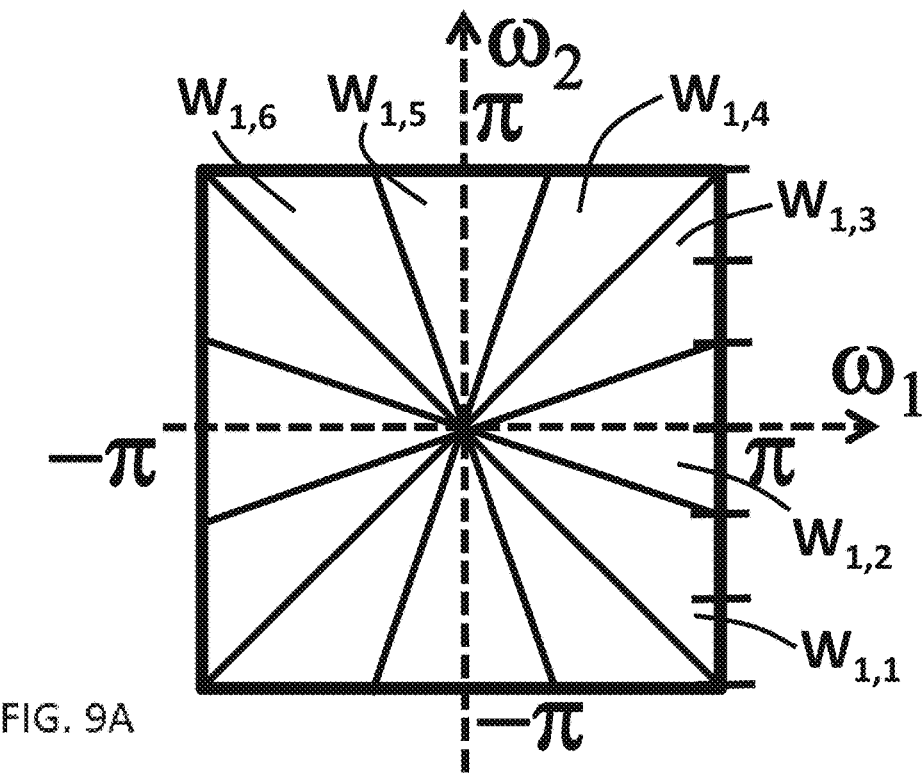
FIGS. 9A-9B illustrate the partitioning of the spectral support and DTFT contents for images in the discrete-domain hierarchical reprojection algorithm.

In the transformation depicted in FIGS. 8A-C, it is easy to see that the DTFT of the other two children images will contain the two other (non-striped) wedges respectively. So the DTFT of the images $I_{1,m}^d$ for m=1, 2, 3 will each contain one of the wedges from subplot(i). Because of the rotation-90 block the image $I_{1,m}^d$ for m=4, 5, 6 will contain the equivalent vertically-oriented wedges. Consequently the spectral support of a parallel-beam projection at any view angle $\theta$ will be contained in one of the images $I_{1,m}^d$ for m=1, 2, ..., 6. And the DTFT of each of the 6 images will contain the DTFT of the input image on one of the 6 wedges that partition the spectral support of the input $y^d$. This is shown in FIG. 9A. The wedges that partition the whole 2D DTFT domain are denoted by $W_{1,m}$, where m=1, 2, ..., 6. It is easy to see that the DTFT of the intermediate image $I_{1,m}^d$ contains the spectral content inside wedge $W_{1,m}$.

Figure 9B:
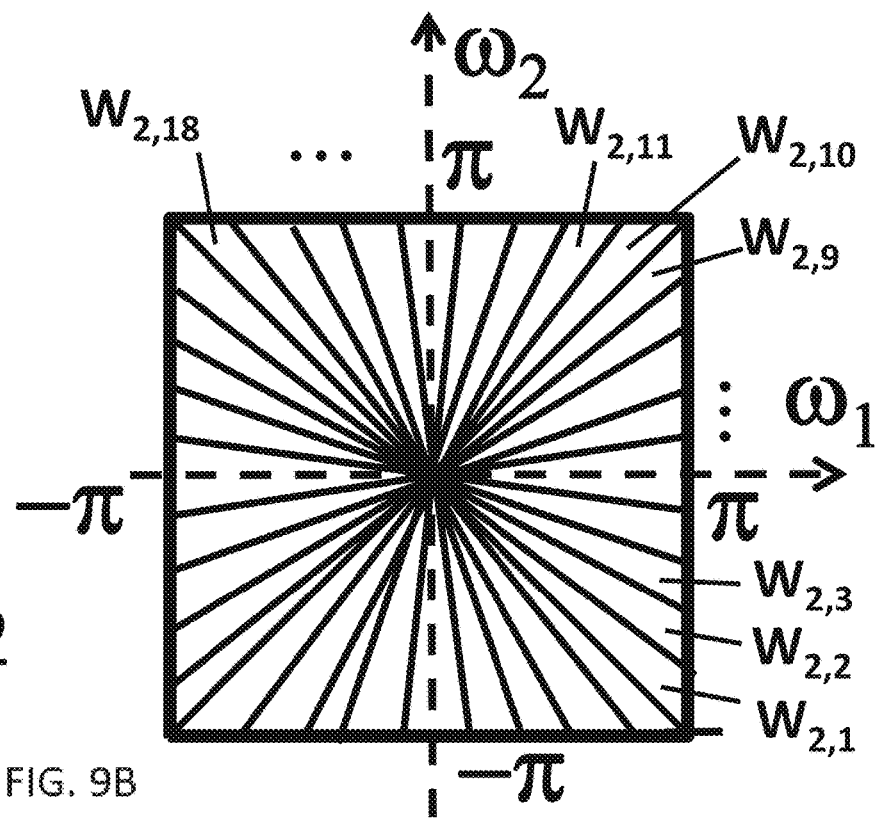

In the next level, l=2 this same shear and decimate strategy is applied to all input images such that each of the child wedges from level l=1 gets further divided into three child wedges. It is easily shown that the spectral support of a parallel-beam projection at any view angle $\theta$ will be contained in the spectral support of one of the images $I_{2,m}^d$ for m=1, 2, ..., 18. And the DTFT of each of the 18 images will contain one of the 18 wedges that partition the DTFT of the input $y^d$. This is shown in FIG. 9B. The DTFT of the intermediate image $I_{2,m}^d$ contains the spectral content inside wedge $W_{2,m}$ where m=1, 2, ... 18.

Recursively applying this 3-way partitioning of each wedge at every level, it can be shown that after l levels the whole DTFT plane is partitioned into $2 \cdot 3^l$ non-overlapping wedges—$3^l$ horizontally oriented and $3^l$ vertically oriented:

$$\bigcup_{m=1}^{2 \cdot 3^l} W_{l,m} = [-\pi, \pi] \times [-\pi, \pi] \text{ and} \quad (35)$$

$$W_{m_1} \cap W_{m_2} = \emptyset \text{ if } m_1 \neq m_2$$

The parameter choices we have described make the decomposition stage of the algorithm highly symmetric and simple. Notice that the subset of the block diagram in which an image $I_{l,m}^d$ is input and three output images are computed $\{I_{l+1,3(m-1)+i}^d | i=0, 1, 2\}$, denoted by the cross-hatched rectangle in FIG. 7, is repeated in a hierarchical manner to build the whole algorithm. The simplicity and symmetry of this structure aids the efficiency of the software implementation.

At the kernel-stage, in FIG. 7, the input images are $I_{L,m}^d$ for m=1, 2, ..., $2 \cdot 3^L$. The input image $I_{L,m}^d$ is diverted into $B_m$ branches. Each branch corresponds to a parallel-beam projection at a single view angle $\theta$. These $B_m$ output views are exactly those whose spectral support lies in wedge $W_{L,m}$ (ref (35)).

Figure 8D:
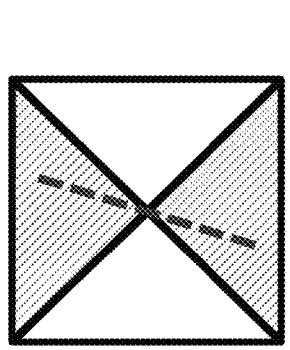
Figure 8E:
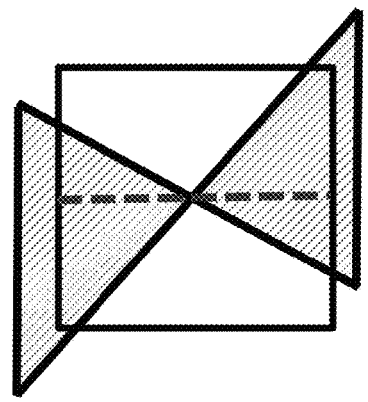

In order to compute projection $p_\theta$, the input image $I_{L,m}^d$ is subjected to a shear-scale tranformation followed by a zero-angle-reprojection $\mathcal{P}_0$, which is simply a summation along the second spatial coordinate. This shear-scale transformation is illustrated in FIGS. 8D-E. FIG. 8D shows the spectral support of the input image. The dashed line is spectral support of the parallel-beam projection of interest which is contained in the wedge of interest (striped region). In order for the algorithm to be correct we want the shear scale transformation to result in the spectral support of the projection to lie on the horizontal axis and be stretched to fill the baseband square, as shown in FIG. 8E. In mathematical terms the shear-scale parameters should be chosen to conform to (20) while accounting for the decimation along the second spatial coordinate. which is included in the discrete algorithm. More details of how this is done for the fan-beam geometry is in Section 1.3.6

1.3 2D Fan-Beam Geometry

Now that we have described a simplified form of the RP algorithm for simpler parallel-beam geometries, we are ready to describe it for the 2D fanbeam geometry. The algorithms that we describe in the rest of this document are preferred embodiments that make several specific design decisions such as in choosing the structure of the hierarchical tree and the operators and their parameters. Other similar embodiments that make different design decisions may be similarly efficient and accurate.

Here we introduce the terminology fast and slow coordinate directions. We refer to the coordinate along which the decimation is performed as the slow coordinate direction. This word encapsulates the idea that the bandwidth of an image, after one or more low-pass filtering operations along a single coordinate direction, is small along that coordinate. Therefore the image is slowly varying along that coordinate. In contrast the other coordinate direction is referred to as the fast coordinate direction. We use the subscripts f and s for fast and slow, respectively.

In the 2D fanbeam geometry, the input is a 2D image $y^d[m_1, m_2]$ and the output is a set of projections for the fan-beam geometry. In the typical case this 2D data set is the set of samples $\{p[n_\beta, n_\alpha] | n_\beta=1, 2, ..., N_\beta \text{ and } n_\alpha=1, 2, ..., N_\alpha\}$. The output sample $p[n_\beta, n_\alpha]$ corresponds to a ray whose fan-beam parameters are view-angle $\beta[n_\beta]$ and fan-angle $\alpha[n_\alpha]$.

The differences between the fan-beam method that we describe here and the simplified parallel-beam method described in Section 1.2 are as follows.

1. At the kernel-stage of the hierarchy the image transformation is not a simple shear-scale. Since the output projections are for the fan-beam geometry, a transformation equivalent to a parallel-to-fan mapping is incorporated into the shear-scale operator. For any ray in the fan-beam geometry, the fan-to-parallel transformation specifies what the parameterization of that ray would be in the parallel-beam geometry, i.e., view-angle $\theta \in [-\pi/4, 3\pi/4)$ and detector-coordinate t.
2. The intermediate images are over-sampled i.e., digitally interpolated to a denser sampling grid. The oversampling parameters $(\gamma_s, \gamma_f)$ control the oversampling in the slow and fast direction of every intermediate image. Increasing oversampling improves the accuracy of the computed projections. The incorporation of the oversampling modifies the formulas for the decimation factor in level l=1 and the shear-parameters in the rest of the decomposition stage.

1.3.1 Fourier-Domain Partition Scheme

Just as in the parallel-beam geometry (Section 1.2.4) we design the hierarchical application of shears and decimations to manipulate the frequency content of the input image such that any fan-beam projection ray can be computed from one of the input images in the kernel-stage.

Figure 10A:
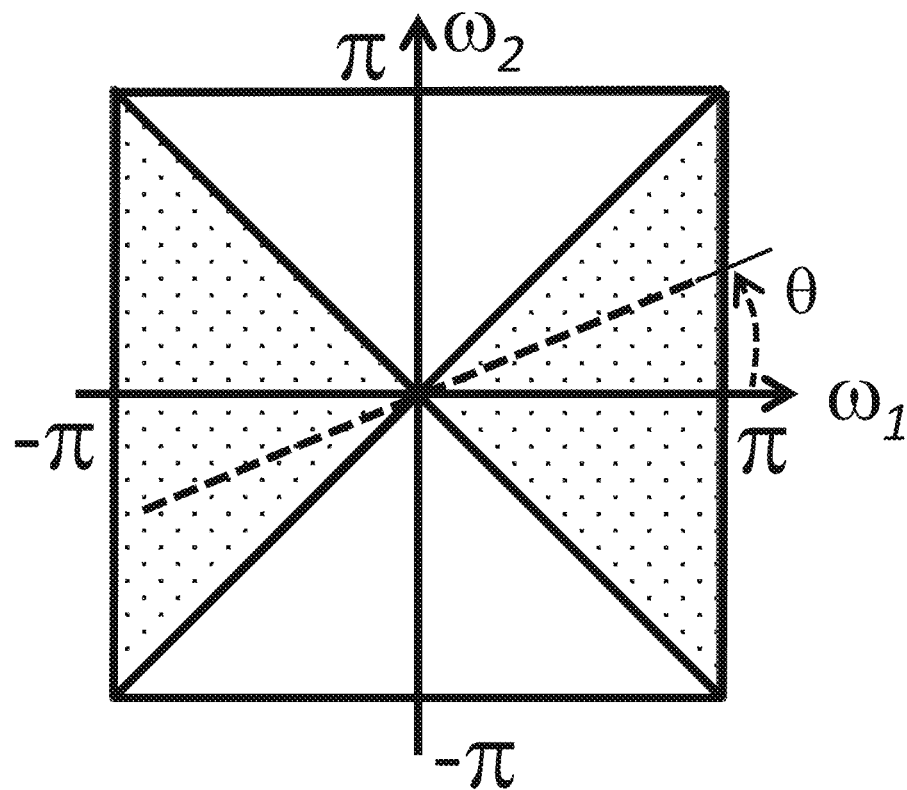
FIGS. 10A-10B illustrate the Fourier-domain partitioning scheme as explained in Section 1.3.1 FIG. 10A Spectral support of input image is divided into two "half-planes": horizontally and vertically oriented half-planes FIG. 10B The partitioning of the DTFT domain after L levels of recursive hierarchical partitioning. The $m^{th}$ wedge corresponds to the kernel-stage input image $I_{L,m}^d$ in FIG. 7.
Figure 10B:
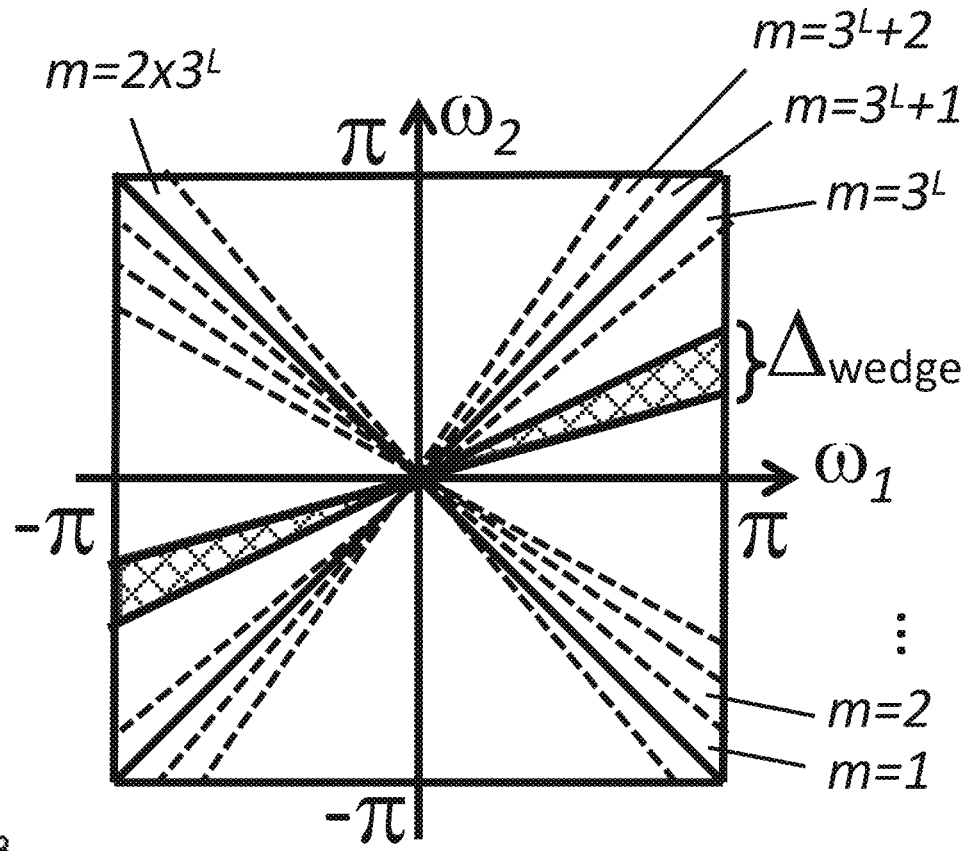

We choose the same Fourier domain partitioning scheme described in the previous section on the parallel-beam geometry (Section 1.2 and FIG. 7). So after level l=L, the DTFT domain has been recursively partitioned into $2 \cdot 3^L$ wedges (use l=L in Equation (35)). This is shown in FIGS. 10A-10B. Let the region in the 2D DTFT domain corresponding to parallel-beam view angle $\theta \in [-\pi/4, +\pi/4)$ be defined as the zeroeth (or horizontally oriented) half-plane denoted by the speckled region in FIG. 10A. And let the region in the 2D DTFT domain corresponding to parallel-beam view angle $\theta \in [\pi/4, +3\pi/4)$ be defined as the first (or vertically oriented) half-plane: the remaining non-speckled region in FIG. 10A.

Let the half-plane be divided into $3^L$ wedges $\{W_{L,m}\}$ as shown in FIG. 10B. The wedges indexed by $m=1, 2, \ldots, 3^L$ lie in the horizontally-oriented half-plane and the wedges indexed by $m=3^L+1, 3^L+2, \ldots, 2 \cdot 3^L$ lie in the vertically-oriented half-plane. The length of the edge of a wedge along the square boundary of the DTFT support is equal to $\Delta_{wedge}=2\pi/3^L$. For the wedges in the horizontally-oriented half plane the corners, on the right hand side, of the $m^{th}$ wedge are at:

$$(\pi, -\pi + \Delta_{wedge}(m-1)) \text{ and } (\pi, -\pi + \Delta_{wedge} m) \quad (36)$$

The wedges in the vertically-oriented half-plane are obtained by applying a counter-clockwise $\pi/2$-rotation to the wedges in the horizontally-oriented half-plane.

Any ray in the 2D tomographic geometry can be parameterized by $(\theta, t)$ such that $\theta \in [-\pi/4, +3\pi/4)$. Recall, from Sec 1.1.1, that a ray is the line upon which the tomographic line-integral of the object is computed. So the line-integral along a ray parameterized by $(\theta, t)$ is a sample of the continuous-domain parallel-beam projection at view-angle $\theta$. Conversely a continuous-domain parallel-beam projection parameterized by view-angle $\theta$ is the set of line-integrals along all rays $(\sigma, t)$: $\forall t \in \mathbb{R}$. By the Fourier slice theorem (17-18) the 1D Fourier transform of this parallel-beam projection $\mathcal{P}_\theta f$ is equal to a radial cut through the 2D Fourier transform of the (continuous-domain) image y oriented at an angle $\theta$. Consequently the information necessary to compute the line integral along the ray $(\theta, t)$ is contained in a radial cut, oriented at angle $\theta$, through the 2D Fourier transform of y.

Assuming that the continuous-domain image y is bandlimited to a disc and a sufficient sampling rate is used to sample the image to produce $y^d$, we can state the discrete-domain equivalent of the Fourier slice theorem as follows. The 1D DTFT of the parallel-beam projection $\mathcal{P}_\theta y^d$ (which is defined as interpolating $y^d$ onto the continuous domain using the sinc interpolator, computing the continuous-domain parallel-beam projection, and resampling the projection) is equal to a radial cut through the 2D DTFT of the image $y^d$ oriented at an angle $\theta$. The notion of a ray still holds in the discrete domain. Specifically, the line integral of $y^d$ along ray $(\theta, t)$ is defined as interpolating $y^d$ onto the continuous domain using the sinc interpolator, and then computing the continuous domain line integral along ray $(\theta, t)$.

So given a radial cut, at an angle $\theta$, through the 2D DTFT of the image $y^d$, (a "$\theta$-cut") we can compute the parallel-beam projection of $y^d$ at view-angle $\theta$. More explicitly, given this $\theta$-cut, we can compute the projection along any ray whose parameterization is $(\theta, t)$. Conversely in order to compute the projection along a ray $(\theta, t)$ all we need is the $\theta$-cut through 2D DTFT of the image $y^d$. Note that any $\theta$-cut will be fully contained within one of the $2 \cdot 3^L$ wedges shown in FIG. 10B. So the information necessary to compute the projection of the image $y^d$ along ray $(\theta, t)$ will be fully contained in one of the $2 \cdot 3^L$ wedges shown in FIG. 10B. For brevity we say that the ray with view-angle $\theta$ "is contained" in one of the $2 \cdot 3^L$ wedges.

For a ray with parallel-beam view-angle $\theta \in [-\pi/4, +\pi/4)$, it can be shown, by examining FIG. 10B, that the wedge index $m_{KER}(\theta)$ of the wedge that contains this ray is $$m_{KER}(\theta) = 1 + \left\lfloor \frac{\pi \tan\theta - (-\pi)}{\Delta_{wedge}} \right\rfloor$$

where $\lfloor \ \rfloor$ is the usual floor function

For a ray with view-angles $\theta \in [\pi/4, +\pi/4)$, this formula needs to be modified to take into account the rotation by $\pi/2$. So the full expression for the mapping function $m_{KER}$ is:

$$m_{KER}(\theta) = \begin{cases} 1 + \left\lfloor \frac{\pi \tan\theta - (-\pi)}{\Delta_{wedge}} \right\rfloor & \text{if } \theta \in [-\pi/4, +\pi/4) \\ 3^L + 1 + \left\lfloor \frac{\pi \tan(\theta - \frac{\pi}{2}) - (-\pi)}{\Delta_{wedge}} \right\rfloor & \text{if } \theta \in [\pi/4, +3\pi/4) \end{cases} \quad (37)$$

Furthermore this means that the line integral along a ray with view-angle $\theta \in [-\pi/4, +\pi/4)$ can be computed from the kernel-stage image $I_{L,m_{KER}(\theta)}^d$.

More generally, for an arbitrary intermediate level l in the decomposition tree, the line integral along the ray with view-angle $\theta$ could be computed from the image $I_{l,m(\theta,l)}$ where $$m(\theta, l) = \begin{cases} 1 + \left\lfloor \frac{\pi \tan\theta - (-\pi)}{\Delta_l} \right\rfloor & \text{if } \theta \in [-\pi/4, +\pi/4) \\ 3^l + 1 + \left\lfloor \frac{\pi \tan(\theta - \frac{\pi}{2}) - (-\pi)}{\Delta_l} \right\rfloor & \text{if } \theta \in [\pi/4, +3\pi/4) \end{cases} \quad (38)$$

Here $\Delta_l=2\pi/3^l$. Conversely, given an arbitrary intermediate image $I_{l,m}$, the set of rays whose line-integrals can be computed from it are those with view-angle $\theta \in [\theta_{min}^{l,m}, \theta_{max}^{l,m}]$ where $$\theta_{min}^{l,m} = \begin{cases} \arctan\left(\frac{-\pi + (m-1)\Delta_l}{\pi}\right) & \text{if } m \in \{1, 2, \ldots, 3^l\} \\ \frac{\pi}{2} + \arctan\left(\frac{-\pi + (m-3^l)\Delta_l}{\pi}\right) & \text{if } m \in \{3^l+1, 3^l+2, \ldots, 2 \cdot 3^l\} \end{cases} \quad (39)$$

and $$\theta_{max}^{l,m} = \qquad (40)$$

$$\begin{cases} \arctan\left(\dfrac{-\pi + m\Delta_l}{\pi}\right) & \text{if } m \in \{1, 2, \ldots, 3^l\} \\ \dfrac{\pi}{2} + \arctan\left(\dfrac{-\pi + (m - 3^l + 1)\Delta_l}{\pi}\right) & \text{if } m \in \{3^l + 1, 3^l + 2, \ldots, 2 \cdot 3^l\} \end{cases}$$

1.3.2 Oversampling

In order to control the tradeoff between accuracy and computational cost of the overall algorithm an oversampling by factors of $\gamma_s$ and $\gamma_f$ in the slow and fast directions, respectively, is used. Thus the intermediate images in algorithm will be oversampled by $(\gamma_s, \gamma_f)$.

Figure 11:
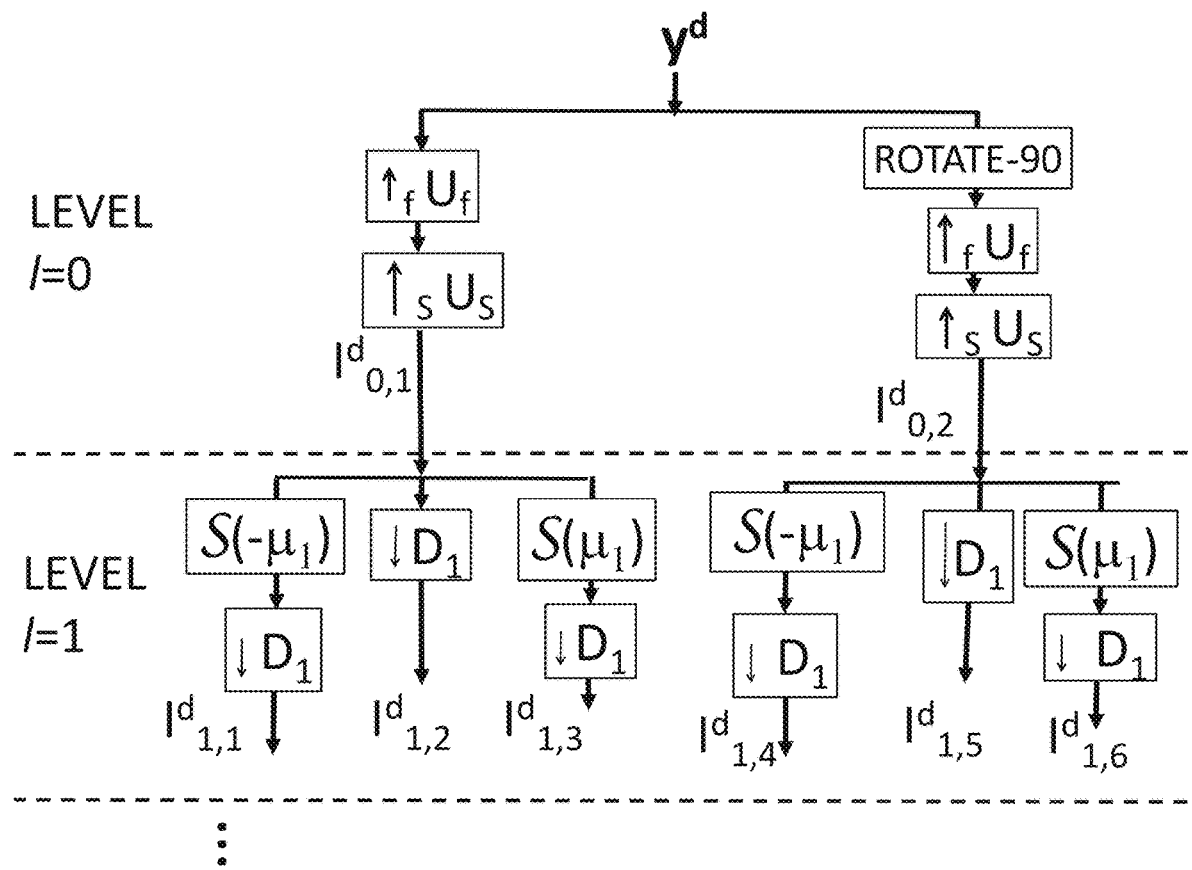
FIG. 11 illustrates the oversampling of the intermediate images by introducing up-interpolation blocks ($U_f$ and $U_s$) in level l=0 of the method.

The previously described block diagram in FIG. 7 is modified in order to incorporate oversampling. As shown in FIG. 11, prior to the start of the decomposition level an up-interpolation along each coordinate direction: $\uparrow_s U_s$ and $\uparrow_f U_f$ is applied.

Recall the definition of a discrete-domain image transformation operator from B.1 in Section 1.2.4. The fast-direction up-interpolation operator by a factor $U_f$ denoted by $\uparrow_f U_f$ (and respectively the slow direction up-interpolation by factor $U_s$ denoted by $\uparrow_s U_s$) is defined as a discrete-domain image transformation operator in which the spatial domain transformation matrix is $$V = \begin{bmatrix} 1/U_f & 0 \\ 0 & 1 \end{bmatrix}$$

(and respectively $$V = \begin{bmatrix} 1 & 0 \\ 0 & 1/U_s \end{bmatrix})$$

1.3.3 Pre-Decomposition Stage

Figure 12A:
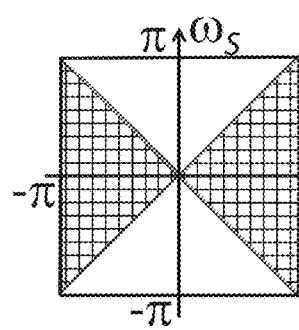
FIGS. 12A-12D illustrate the frequency manipulations in the pre-decomposition stage of the hierarchy corresponding to the block-diagram in FIG. 11 and explained in Section 1.3.3. Because of the periodicty of the DTFT the parts extending beyond the $\pm\pi$ boundaries are wrapped in the $[-\pi, \pi]$ interval along $\omega_c$ but this is not shown in subfigures C-D for simplicity.

Here we outline how the shear, decimation and up-interpolation parameters are modified to incorporate the chosen oversampling factors $(\gamma_s, \gamma_f)$. The frequency domain manipulations in the top level of the algorithm are depicted in FIGS. 12A-12D. FIG. 12A shows the input image in the Fourier domain.

Figure 12B:
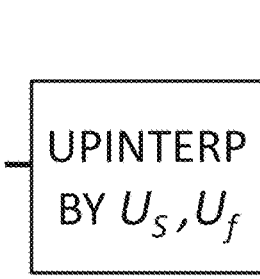
Figure 12B:
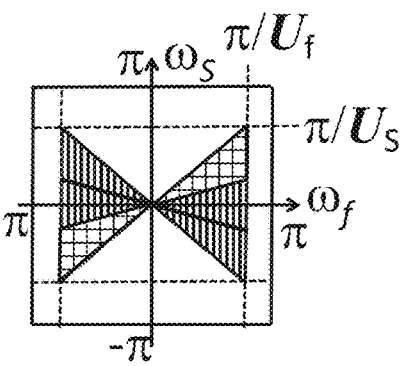

The first image transformation is an up interpolation in each coordinate direction by $U_s$ and $U_f$ (shown in the left branch of the block diagram in FIG. 11 and the top row of FIGS. 12A-12B). Consider what happens to the cross-hatched wedge in FIG. 11A upon this image transformation: the bandwidth of the cross-hatched wedge is now $(\pi/U_s, \pi/U_f)$ as shown in FIG. 12B.

Figure 12C:
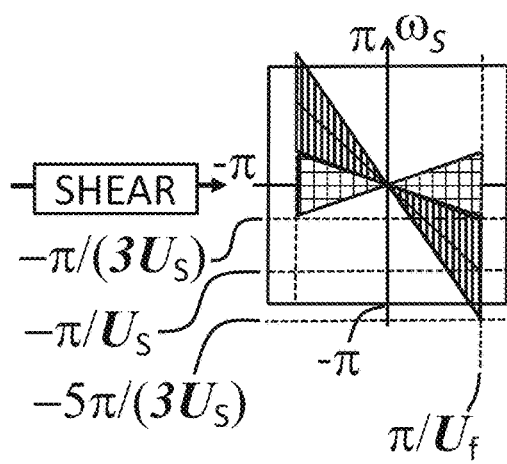
Figure 12D:
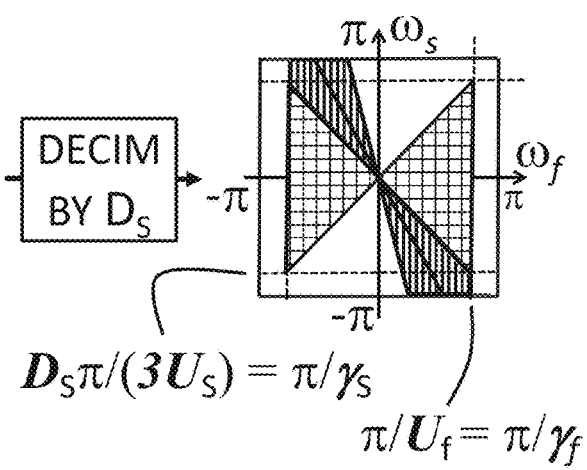

Now we have traversed one level of the block diagram in FIG. 11 to the image $I_{0,1}^d$. Let us follow one child branch of this ternary node (the left of the two ternary nodes in level l=1). The child wedge of interest is cross-hatched, in FIG. 12B, while the other two wedges are striped. Following the shear, the child wedge is centered about the $\omega_f$ axis, as shown in FIG. 12C. The slow bandwidth of the child wedge is $\pi/(3U_s)$ and the slow bandwidth of the parent wedge increases to $5\pi/(3U_s)$ due to the shearing. Because of the periodicity of the DTFT the parts extending beyond the $\pm\pi$ boundaries are wrapped in the $[-\pi, \pi]$ interval along $\omega_s$ but this is not shown for simplicity. Finally after decimation by the integer factor $D_s$ the slow bandwidth of the child wedge is at $D_s\pi/(3U_s)$ as shown in FIG. 12D. The other two wedges are similarly stretched (due to the downsampling) and clipped along $\omega_s$ (due to the low pass filtering).

We choose $U_f$ such that the images following up-interpolation are oversampled by a factor of $\gamma_f$ i.e. $\pi/U_f = \pi/\gamma_f$. So $U_f = \gamma_f$.

We choose the integer $D_s$ such that that slow bandwidth of the child wedge after decimation is $\pi/\gamma_s$ i.e.

$$\frac{D_s \pi}{3 U_s} = \frac{\pi}{\gamma_s} \Longleftrightarrow D_s = \frac{3U_s}{\gamma_s}$$

Furthermore we want $\pi/U_s \leq \pi/\gamma_s$ in order to enforce the prescribed oversampling so $U_s \geq \gamma_s$. Consequently we choose $D_s \geq (3U_s/\gamma_s) \geq 3$. A larger $D_s$ will improve image quality (since the slow bandwidth of the parent wedge after the shear, as seen in FIG. 12C, is inversely proportional to $D_s$), but will increase the size of the up-interpolated image (since $U_s$ is proportional to $D_s$).

1.3.4 Decomposition Stage: Decimation

In level l=1, the decimation factor is chosen as described in Section 1.3.3 to accommodate the up-interpolation. But in all other levels the decimation factor is set to 3.

1.3.5 Decomposition Stage: Shear-Parameters

Figure 13A:
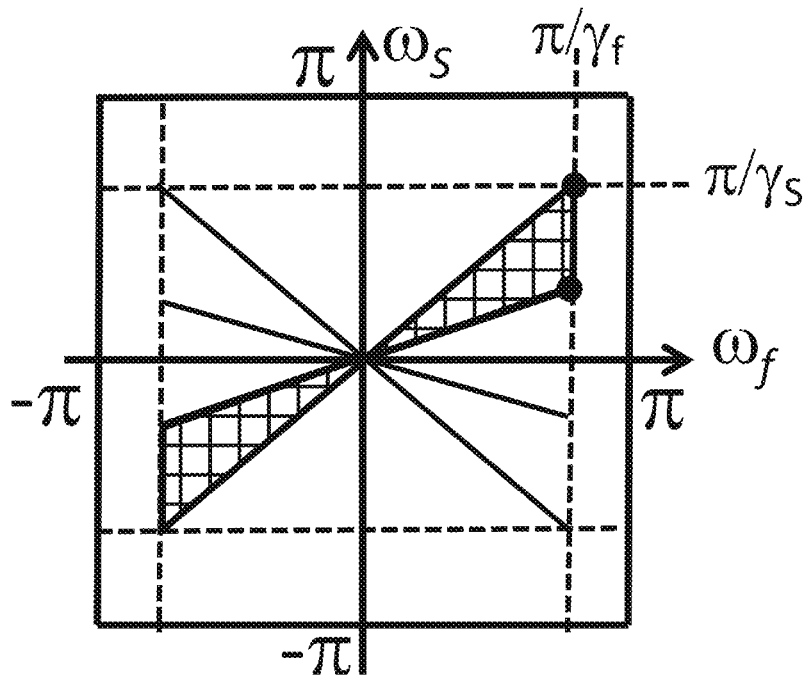
FIGS. 13A-13B illustrate the transformation between the DTFT of the parent and child image, which as explained in Section 1.3.5, can be used to determine the shear parameters in the decomposition stage.

FIG. 13A depicts the partition of the Fourier-plane at the input to a decomposition level. The three wedges correspond to the spectral support regions that we want to preserve intact in each of the three child images indexed by m=0, 1, 2.

Since the three child images are produced by shearing the parent image by three different shear factors $(-\mu_l, 0, \mu_l)$, the shear-factor $\mu_l$ is computed by figuring out the shear along the slow direction that can be applied to the parent image to center the m=2 child wedge about the $\omega_f$ axis.

Recall from Section 1.1.3, that if a spatial domain image is sheared by $\mu_l$ i.e. $g(\vec{x}) = y(V\vec{x})$ where $$V = \begin{bmatrix} 1 & \mu_l \\ 0 & 1 \end{bmatrix},$$

then the spectral support undergoes the following transformation:

$$W_g = V^T W_f = \begin{bmatrix} 1 & 0 \\ \mu_l & 1 \end{bmatrix} W_f.$$

Figure 13B:
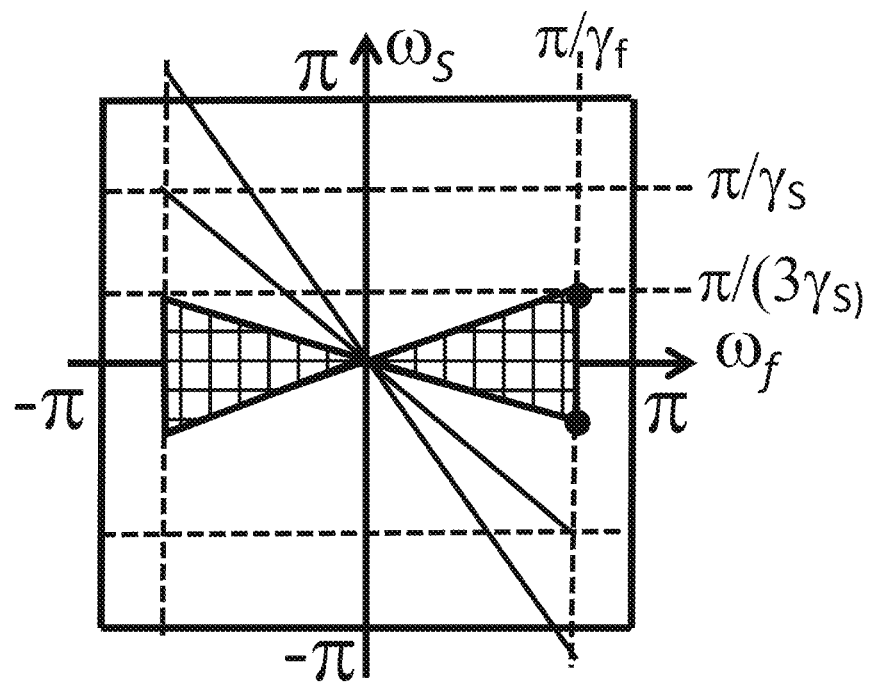

Examining FIGS. 13A-13B, we want to find the $\mu_l$ such that the spectral support denoted by the cross-hatched wedge in FIG. 13A is transformed to the cross-hatched wedge in FIG. 13B. Consider, for example, the right corner points of the wedge marked by the dots. We know that $(\pi/\gamma_f, \pi/\gamma_s)$ will be transformed to $(\pi/\gamma_f, \pi/(3\gamma_s))$ so:

$$\begin{bmatrix} \pi/\gamma_f \\ \pi/(3\gamma_s) \end{bmatrix} = \begin{bmatrix} 1 & 0 \\ \mu_l & 1 \end{bmatrix} \begin{bmatrix} \pi/\gamma_f \\ \pi/\gamma_s \end{bmatrix} \Longrightarrow \frac{1}{3\gamma_s} = \qquad (41)$$

$$\frac{\mu_l}{\gamma_f} + \frac{1}{\gamma_s} \Longrightarrow \frac{\mu_l}{\gamma_f} = -\frac{2}{3\gamma_s} \Longrightarrow \mu_l = -\frac{2\gamma_f}{3\gamma_s}$$

This equation specifies a preferred choice for the shear factor $\mu_l$.

1.3.6 Kernel Stage

Figure 14A:
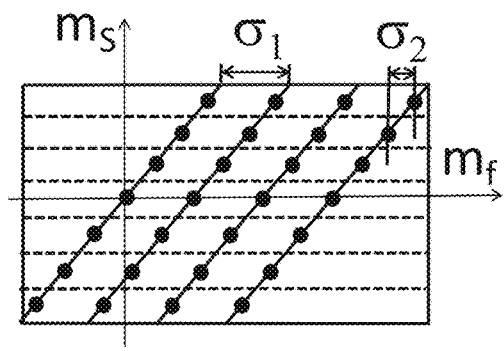
FIGS. 14A-14D illustrate the kernel-stage operations in parallel-beam (FIG. 14A-B) vs fan-beam (FIG. 14C-D) geometries as explained in Section 1.3.6.
Figure 14B:
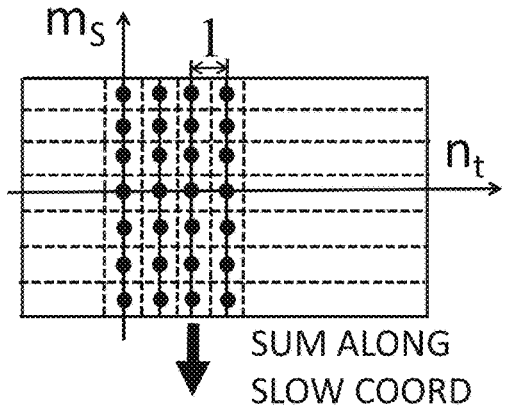

Recall that in the case of the parallel-beam geometry (FIG. 7), a single parallel-beam projection at angle $\theta$ is computed from a kernel-stage image by performing a shear-scale image transformation followed by a zero-angle projection i.e. $p_q = \mathcal{P}_0 \mathcal{C}(\overline{\sigma}_q)$. This two step operation is illustrated in FIGS. 14A-B.

Let $I^d[m_f, m_s]$ be the input image to the kernel-stage in this branch (denoted by "(iv)" in FIG. 7), where $m_f = -N_f, -N_f+1, \ldots, +N_f$ and $m_s = -N_s, -N_s+1, \ldots, +N_s$, and let the output after the shear-scale operation be $g^d = \mathcal{C}(\sigma_1, \sigma_2) I^d$ (denoted by "(v)" in FIG. 7). Then, by the definition of the discrete-domain shear-scale (21), $$g^d[n_t, m_s] = \sum_{m_f} I^d[m_f, m_s] \psi(\sigma_1 n_t + \sigma_2 m_s - m_f) \quad (42)$$

where $n_t$ is the detector index of the output projections.

This can be interpreted as interpolating the input image $I^d$ along the fast direction (i.e. along index $m_f$) onto a set of lines indexed by $n_t$, and where the $n_t^{th}$ line is the set of points $\{(\sigma_1 n_t + \sigma_2 m_s, m_s) | m_2 = -N_s, -N_s+1, \ldots, +N_s\}$. This set of points, shown by the large black dots in FIG. 14A, lies on a set of parallel lines with a slope $\sigma_2$ relative to the slow coordinate axis and separated by $\sigma_1$ along the fast coordinate axis. The output of the shear-scale operation is an image $g^d[n_t, m_s]$ which is then subject to the zero-view projection operator $\mathcal{P}_0$, which is a summation along the slow coordinate as explained in B.3 i.e. $p[n_\theta, n_t] = \sum_{m_s} g^d[n_t, m_s]$. This is illustrated in FIG. 14B, where the black dots represent the pixels of the image $g^d[n_t, m_s]$.

It follows that the parallel-beam kernel-stage operation can be rephrased as a sequence of two operations: (i) a fast-direction 1D interpolation of the 2D kernel-stage input image onto a set of parallel lines, and (ii) summation along the slow direction (i.e., over $m_s$) in order to produce a full parallel-beam projection at a single view-angle $\theta$. The reason that the lines are parallel is that all the rays share the same PB view-angle $\theta$.

Figure 14C:
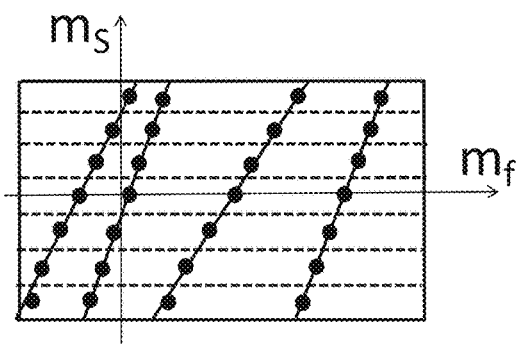
Figure 14D:
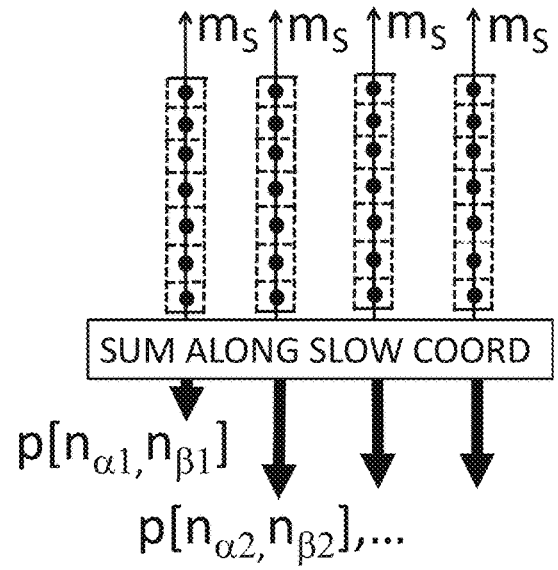

In the case of the fan-beam geometry, typically no two rays share the same parallel-beam view-angle $\theta$. So the fan-beam kernel-stage operation, shown in FIG. 14C-D, is exactly the same as the parallel-beam kernel-stage operation except that the fast-direction 1D interpolation is onto a set of non-parallel lines. Each line corresponds to a ray with fan-beam parameters $(\beta, \alpha)$, and is the set of points $\{(a_{\beta,\alpha} + b_{\beta,\alpha} m_s, m_s) | m_s = -N_s, -N_s+1, \ldots, +N_s\}$ shown by the black dots in FIG. 14C. The parameters of the fast direction interpolation $(a_{\alpha,\beta}, b_{\beta,\alpha})$ are a function of the fan-beam view-angle and fan-angle of the particular ray. So the equation for the fast-direction interpolation in the case of the fan-beam geometry can be restated as follows, using the interpolation shorthand defined in 1.1.5:

$$g_{\beta,\alpha}^d[m_s] = I^d[h^{\beta,\alpha}[m_s], m_s] \quad (43)$$

where $h^{\beta,\alpha}[m_s] = a_{\beta,\alpha} + b_{\beta,\alpha} m_s$ is the equation of the line onto which the interpolation is performed. We refer to $\{h^{\beta,\alpha}[m_s] | m_s \in \mathbb{Z}\}$ as the kernel-stage interpolation coordinates for this ray.

The output $\{g_{\beta,\alpha}^d[m_s], m_s = -N_s, \ldots, N_s\}$ of the interpolation for a particular ray parameterized by $(\beta, \alpha)$ is represented as a column in FIG. 14D. Different columns in FIG. 14D correspond to different rays $(\beta_k, \alpha_k)$. Summing over $m_s$ produces the corresponding line integral along the ray parameterized by $(\beta, \alpha)$. Each such line integral corresponds to a sample (i.e., entry) in the output array $p[n_\alpha, n_\beta]$.

Consider instead the whole kernel-stage interpolation operation as a single operator that takes as input a 2D discrete-domain image $I^d$ and produces as output the 2D discrete-domain data set constructed by stacking all the columns of FIG. 14D side-by-side. There is no obvious ordering of these columns, but assume that the output data set consists of columns representing all the rays that would be computed from this kernel-stage input image. Then this operator can be seen as performing several 1D interpolations, as defined in (3)—one for each row of $I^d$.

The rest of this section explains how the kernel-stage interpolation coordinates $h^{\beta,\alpha}[m_s]$ are computed. In short, the ray coordinates are first transformed from the fan-beam geometry to the parallel-beam geometry. Then the cumulative image transformation from the input of the decomposition stage to the appropriate kernel-stage image from which the ray is synthesized is computed. This image transformation is used to compute the coordinates of the ray in the kernel-stage image i.e., the interpolation coordinates.

(a) Mapping Between Fan-Beam and Parallel-Beam Geometries

Figure 15:
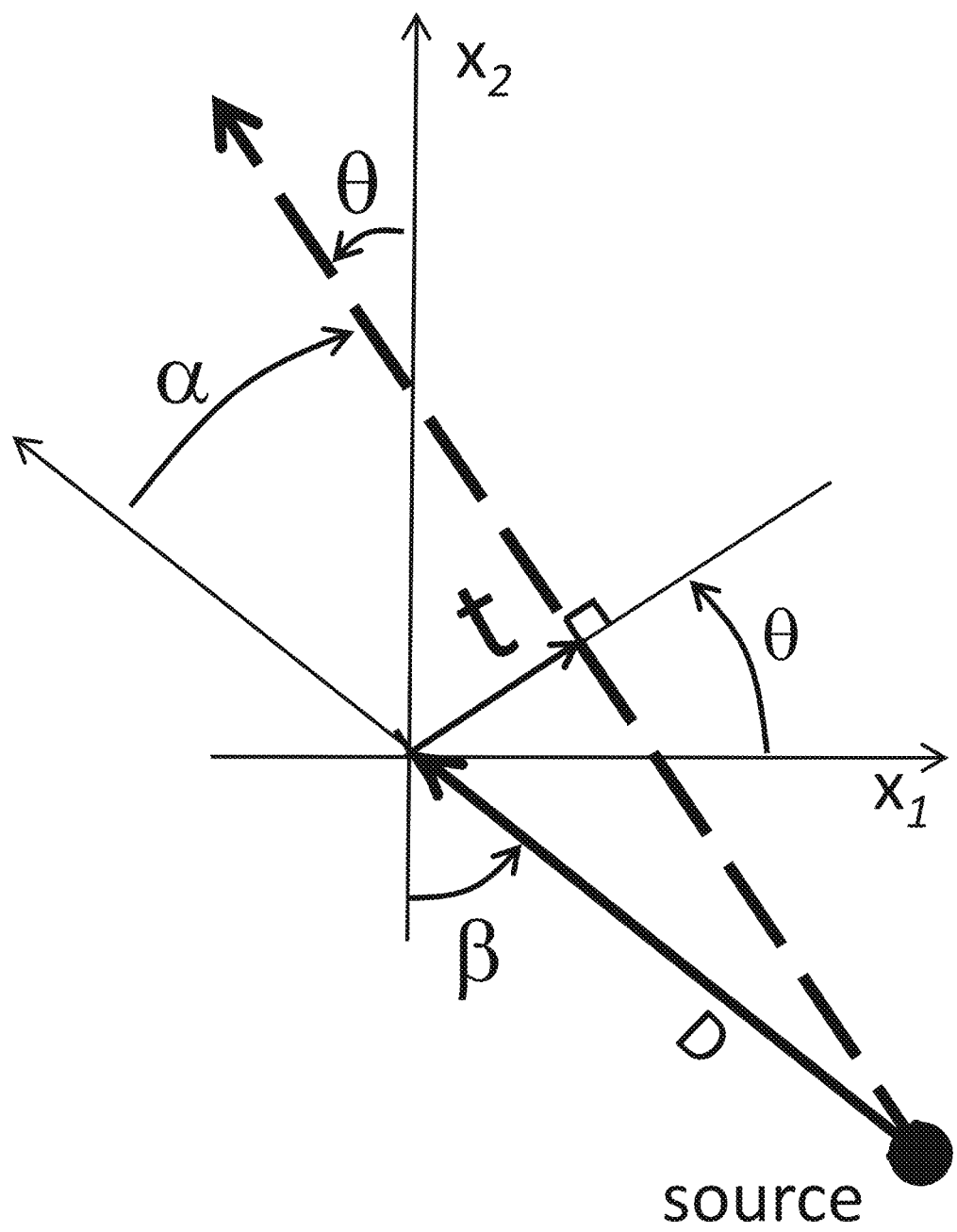
FIG. 15 illustrates the transformation between fan-beam and parallel-beam geometries. A ray in the fan-beam geometry parameterized by $(\beta,\alpha)$ is equivalent to a parallel-beam parameterization of $(\theta, t)$ as specified in (44)

Consider a single output ray in the fanbeam geometry with view-angle $\beta$ and fan-angle $\alpha$. First it is mapped to the parallel-beam geometry, using the standard fan-to-parallel transformation, as illustrated in FIG. 15. Here the source, depicted by the large dot in the lower right corner, is located at a distance D from the origin and the ray of interest is shown by the dashed arrow emanating from the source. The coordinates of the ray in the parallel-beam and fan-beam geometries are $(\theta, t)$ and $(\beta, \alpha)$ respectively. The fan-to-parallel transformation equations are as follows:

$$\theta = (\beta - \alpha) \text{ and } t = D \sin \alpha \quad (44)$$

We modify the parallel-beam parameters given by (44) in two ways.

(i) Restrict $\theta$ to $$\left[-\frac{\pi}{4}, \frac{3\pi}{4}\right):$$

Recall that while (44) returns a view-angle $\theta \in \mathbb{R}$, the Fourier partition scheme (FIGS. 10A-10B) and Equation (37) that identifies the kernel-stage image from which a given ray should be synthesized, assume that $$\theta \in \left[-\frac{\pi}{4}, \frac{3\pi}{4}\right).$$

So we find the equivalent parameterization $(\theta', t')$ of (44) such that $$\theta' \in \left[-\frac{\pi}{4}, \frac{3\pi}{4}\right)$$

(which is always possible for any ray in the 2D tomographic geometry).

(ii) Exploit symmetry due to $$\frac{\pi}{2}$$

rotation: In order to simplify and unify the kernel-stage parameter equations we can exploit the symmetry introduced by $$\frac{\pi}{2}$$

rotation in the right branch of the top level hierarchy (FIG. 11).

From the Fourier-domain partitioning description (Section 1.3.1, FIG. 10 and Equation (37)) we know that rays that lie in the horizontally-oriented half-plane are computed from the left half of the hierarchy (i.e. one of the images $I_{L,1}^d, \ldots, I_{L,3}^{L^d}$) and the rays that lie in the vertically-oriented half-plane are computed from the right half of the hierarchy (i.e. one of the images $I_{L,3^L+1}^d, \ldots, I_{L,2\cdot 3^L}^d$).

Furthermore, consider what happens to the vertically-oriented half-plane after the $$\frac{\pi}{2}$$

rotation—the vertically-oriented half-plane (the non-shaded region in FIG. 10A) gets rotated clockwise by $$\frac{\pi}{2}$$

and is therefore now in the original location of the horizontally-oriented half-plane. Similarly every wedge $W_{L,m}$ in the vertically-oriented half-plane gets rotated to the location of the wedge $W_{L,m-3^L}$ in the horizontally-oriented half-plane (ref FIG. 10B). Therefore the kernel-stage parameter computations should only depend on the value of the view-angle relative to the half-plane, not the original absolute value.

Considering the modifications (i) and (ii) above, given the fan-beam parameters of a ray ($\beta$, $\alpha$) we want to be able to (a) identify in which half-plane it is contained; and (b) compute the parameterization of that ray relative to that half-plane i.e. ($\theta'$, $t'$) where $$\theta' \in [-\frac{\pi}{4}, \frac{\pi}{4}).$$

The equations that compute the index of the half-plane $n_{HP}$ and the relative PB parameterization within that half-plane ($\Theta_{HP}$, $T_{HP}$) are as follows. Here % denotes modulo. Given ($\theta$, $t$) as defined in (44), we compute the index of the half-plane $n_{HP}(\theta)$ in which the ray with view-angle $\theta$ lies, and the corresponding relative view-angle $\Theta_{HP}(\theta)$ and detector coordinate $T_{HP}(\theta, t)$ within that half-plane as follows:

$$n_{HP}(\theta) \triangleq \tilde{n}_{HP}(\theta) \% 2 \text{ for } \theta \in \mathbb{R} \quad (45)$$

$$\text{where } \tilde{n}_{HP}(\theta) \triangleq \lfloor (\theta - (-\frac{\pi}{4}))/\frac{\pi}{2} \rfloor \quad (46)$$

$$\Theta_{HP}(\theta) \triangleq (-\frac{\pi}{4}) + ((\theta - (-\frac{\pi}{4})) \% \frac{\pi}{2}) \quad (47)$$

$$T_{HP}(\theta, t) = \begin{cases} t & \text{if } \tilde{n}_{HP}(\theta) \in \ldots, 0, 1, 4, 5, \ldots \\ -t & \text{if } \tilde{n}_{HP}(\theta) \in \ldots, 2, 3, 6, 7, \ldots \end{cases} \quad (48)$$

Equation (46) take as input any angle $\theta \in \mathbb{R}$ and identifies which of the following intervals it lies in:

$$\left\{ \ldots, [-\frac{\pi}{4}, \frac{\pi}{4}), [\frac{\pi}{4}, \frac{3\pi}{4}), \ldots \right\} = \{ [\tilde{n}_{HP}\frac{\pi}{2} - \frac{\pi}{4}, \tilde{n}_{HP}\frac{\pi}{2} + \frac{\pi}{4}) : \forall \tilde{n}_{HP} \in \mathbb{Z} \}.$$

These length $$\frac{\pi}{2}$$

intervals partition the whole real line. The intervals are indexed by an integer $\tilde{n}_{HP}$ such that the $\tilde{n}_{HP}=0$ interval is $$[-\frac{\pi}{4}, \frac{\pi}{4}).$$

$\Theta_{HP}(\theta)$ is the relative angle within that interval i.e. if $\theta$ lies in the interval [a, b) then $\Theta_{HP}(\theta)=\theta-(a+b)/2$. Note that $\tilde{n}_{HP}$ can be any integer, but we want to assign it to either the horizontally or vertically-oriented half-planes so we simply apply modulo-2 in order to map all the even (and respectively odd $\tilde{n}_{HP}$) to the horizontally-oriented half-plane (and, respectively, the vertically-oriented half-plane) as specified in (45). The equation for detector coordinate (48) simply applies the well-known identity for the parallel-beam tomographic geometry that the ray ($\theta$, $t$) is equivalent to the ray ($\theta+\pi$, $-t$).

To summarize: given a ray with fan-beam parameters ($\beta$, $\alpha$) we first apply the fan-to-parallel transformation as specified in (44), to get ($\theta$, $t$). We then apply (45) to determine the half-plane ($n_{HP} \in \{0, 1\}$)) in which the ray lies. Then we apply (47) and (48) to determine the relative parallel-beam parameterization ($\theta'$, $t'$) of that ray within the halfplane where $\theta'=\Theta_{HP}(\theta)$ and $t'=T_{HP}(\theta, t)$.

(b) Cumulative Image Transformation in Decomposition Stage

Figure 16A:
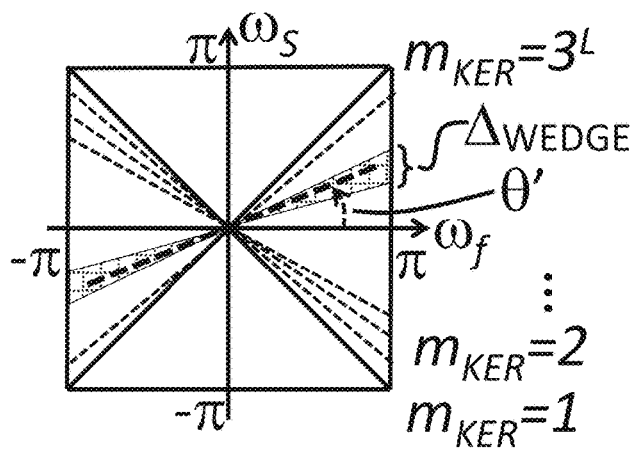
FIGS. 16A-16D illustrate the computation of the kernel-stage interpolation coordinates as explained in Section 1.3.6.

The computation of the kernel-stage interpolation coordinates is illustrated in FIGS. 16A-16D. FIG. 16A shows the spectral support of the image at the input of the algorithm (image $y^d$ in FIG. 11).

Consider the ray whose parallel beam view-angle relative to the horizontally-oriented half-plane is $\theta'$. We want to determine the spectral support of this ray, i.e., a subset of the spectral support of the image from which the ray can be computed. Recall, from (44), that this is the ray whose fan-beam parameterization is ($\beta$, $\alpha$). The spectral support of this ray does not depend on the geometry of the output projections. So in order to understand its spectral support it helps to totally ignore the fan-beam geometry and only focus on the parallel-beam projection in which it is contained in i.e., the PB projection with view-angle $\theta'$. Now, from the Fourier Slice Theorem, we know that the spectral support of this ray within the DTFT of image $y^d$ (from FIG. 11) is a radial line oriented at an angle $\theta'$ relative to the $\omega_f$ axis, i.e. the dashed radial line in FIG. 16A.

From (37), we can compute the index of the kernel-stage input image $m_{KER}(\theta')$ from which this projection is computed. From Section 1.3.1 recall that every kernel-stage input image corresponds to one of the $2 \cdot 3^L$ wedges that partition the frequency plane. The wedge, whose index is $m_{KER}(\theta')$, corresponding to the projection with PB view angle $\theta'$ is shown in FIGS. 16A-16D as the cross-hatched region containing the dashed radial line. We know, from (36), that the right side corner points of this wedge are $(\pi, -\pi + \Delta_{wedge}(m_{KER}(\theta')-1))$, $(\pi, -\pi + \Delta_{wedge} m_{KER}(\theta'))$.

Figure 16B:
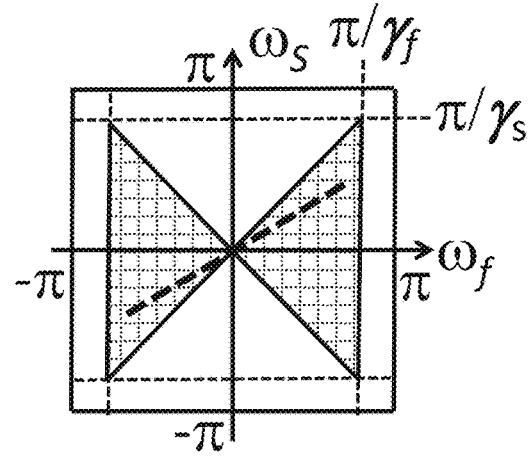

FIG. 16B shows the spectral support of the kernel-stage image $I_{L,m_{KER}(\theta')}^d$. We can then compute the cumulative image transformation from the input image $y^d$ in FIG. 11 to $I_{L,m_{KER}(\theta')}^d$, the kernel-stage input image from which projection $\theta'$ is computed. The wedge, in the frequency domain, that "contains this projection", $W_{L,m_{KER}(\theta')}$ is denoted by the cross-hatched region in FIGS. 16A-B. The image transformation consists of the following operations:

(i) A shear by $\alpha_{eff}$ along $\omega_s$ that when applied to $W_{L,m_{KER}(\theta')}$ in FIG. 16A, centers it about the $\omega_f$ axis, as shown in FIG. 16B. It follows that the shear parameter $\alpha_{eff}$ is determined using the following expression:

$$\begin{bmatrix} \pi \\ -\Delta_{wedge}/2 \end{bmatrix} = \begin{bmatrix} 1 & 0 \\ \alpha_{eff} & 1 \end{bmatrix} \begin{bmatrix} \pi \\ -\pi + \Delta_{wedge} m_{KER}(\theta') \end{bmatrix} \quad (49)$$

$$\Longrightarrow \alpha_{eff} = 1 - \frac{\Delta_{wedge}}{\pi}(m_{KER}(\theta') + 0.5) \quad (50)$$

(ii) Up-interpolation by a factor of $(\gamma_f, \gamma_s)$, and (iii) Decimation by a factor of $3^L$ in the slow direction. So the cumulative or effective transformation, in the frequency domain, from the start of the algorithm to the input to the kernel-stage is as follows $$\begin{bmatrix} 1/\gamma_f & 0 \\ 0 & 3^L/\gamma_s \end{bmatrix} \begin{bmatrix} 1 & 0 \\ \alpha_{eff} & 1 \end{bmatrix} = \begin{bmatrix} 1/\gamma_f & 0 \\ \alpha_{eff} 3^L/\gamma_s & 3^L/\gamma_s \end{bmatrix} \triangleq A_{eff} \quad (51)$$

(c) Fast-Direction Interpolation

In order to compute the kernel-stage fast-direction interpolation coordinates for a particular ray $(\beta, \alpha)$, we start with the location of two points along the ray in the original continuous-domain object $y(\vec{x})$, then compute the location of those two points in the discrete-domain image $y^d(\vec{m})$, and then use the knowledge of the cumulative image transformation in the decomposition stage, $A_{eff}$, to transform those two points to the kernel-stage image.

Consider a ray whose parallel-beam parameterization is $(\theta', t')$ in the domain of the object $y(\vec{x})$. Consider the two points at which the ray that intersects the coordinate axes $x_1$ and $x_2$. From FIG. 2B it is easy to see that these two points are $[t'/\cos \theta', 0]$ and $[0, t'/\sin \theta']$. Assuming that the pixel size of the input image is T then the discrete-domain image: $y^d[m_1, m_2] = y(m_1 T, m_2 T)$.

Figure 16C:
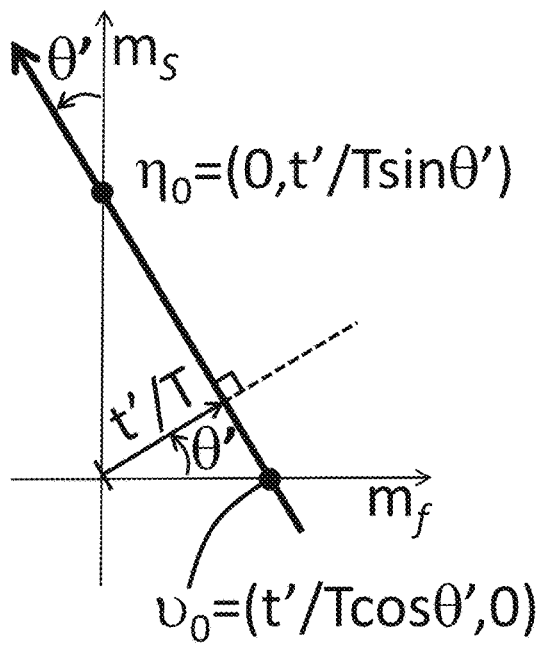

Let $$\theta' \in \left[-\frac{\pi}{4}, \frac{\pi}{4}\right),$$

so that we consider the non-rotated branch of the hierarchy in FIG. 11 in which $I_{0,1}^d = y^d$. So the coordinates of the two points in the domain of $I_{0,1}^d$ (in FIG. 11), denoted $v_0$ and $\eta_0$, and shown in FIG. 16C are as follows:

$$\vec{v}_0 = \begin{bmatrix} t'/(T\cos\theta') \\ 0 \end{bmatrix} \text{ and } \vec{\eta}_0 = \begin{bmatrix} 0 \\ t'/(T\sin\theta') \end{bmatrix} \quad (52)$$

Note that even though $I_{0,1}^d$ is a discrete domain image the vectors $\vec{u}_0$ and $\vec{v}_0$ could have non-integer, fractional values.

From Section 1.1.3 we know that if the Fourier transform of an image is subject to the transformation $V^T$ then any point in the spatial domain will be subject to the transformation $V^{-1}$. Since we know that the Fourier domain coordinate transformation between image $I_{1,0}^d$ and $I_{L,m_{KER}(\theta')}^d$ is $A_{eff}$, it follows that in order to find the location of points $\vec{u}_0$ and $\vec{v}_0$ when transformed to the kernel-stage image, we need to apply a coordinate transformation by $A_{eff}^{-T}$. Denote the two matrices on the LHS of (51) as $A_1$ and $A_2$, i.e. $A_{eff} = A_1 A_2$. Then $A_{eff}^T = A_2^T A_1^T$ and $A_{eff}^{-T} = A_1^{-T} A_2^{-T}$, by the usual linear algebra identities. So $$A_{eff}^{-T} = \begin{bmatrix} 1/\gamma_f & 0 \\ 0 & 3^L/\gamma_s \end{bmatrix}^{-1} \begin{bmatrix} 1 & \alpha_{eff} \\ 0 & 1 \end{bmatrix}^{-1} \quad (53)$$

$$= \begin{bmatrix} \gamma_f & 0 \\ 0 & \gamma_s/3^L \end{bmatrix} \begin{bmatrix} 1 & -\alpha_{eff} \\ 0 & 1 \end{bmatrix} \quad (54)$$

$$= \begin{bmatrix} \gamma_f & -\alpha_{eff}\gamma_f \\ 0 & \gamma_s/3^L \end{bmatrix}$$

Denoting the transformed points as $\vec{v}_L$ and $\vec{\eta}_L$, then $$\vec{v}_L = A_{eff}^{-T} \vec{v}_0 \quad (55)$$

$$= \begin{bmatrix} \gamma_f & -\alpha_{eff}/\gamma_f \\ 0 & \gamma_s/3^L \end{bmatrix} \begin{bmatrix} t'/(T\cos\theta') \\ 0 \end{bmatrix}$$

$$= \frac{t'}{T} \begin{bmatrix} \gamma_f/\cos\theta' \\ 0 \end{bmatrix}$$

$$\vec{\eta}_L = A_{eff}^{-T} \vec{\eta}_0 \quad (56)$$

$$= \begin{bmatrix} \gamma_f & -\alpha_{eff}/\gamma_f \\ 0 & \gamma_s/3^L \end{bmatrix} \begin{bmatrix} 0 \\ t'/(T\sin\theta') \end{bmatrix}$$

$$= \frac{t'}{T} \begin{bmatrix} -\alpha_{eff}\gamma_f/\sin\theta' \\ -\gamma_s/(3^L \sin\theta') \end{bmatrix}$$

Figure 16D:
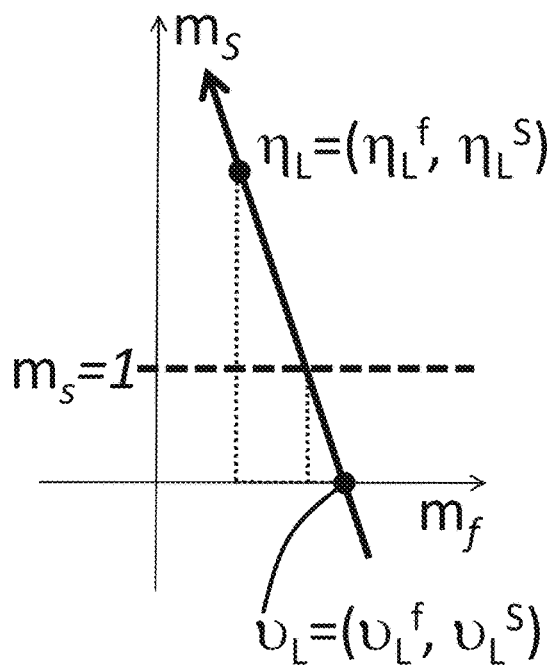

Recall from FIG. 14C that we perform a fast-direction interpolation onto a set of non-parallel lines, where each line corresponds to a ray. Equations (55)-(56), which specify the coordinates of two points on that line for a ray with PB parameterization $(\theta', t')$, are sufficient to figure out the coordinates of the resampled points. Recall from (43) that the equation of the line in FIG. 16D is denoted by $m_f = h^{\beta,\alpha}$

[$m_s$]. Applying similarity of triangles to the two triangles indicated by the dotted black lines in FIG. 16D, it is easy to see that $$h^{\beta,\alpha}[m_s] = v_L^f + m_s \frac{\eta_L^f - v_L^f}{\eta_L^s - v_L^s} \tag{57}$$

$$\stackrel{(55)=(56)}{=} \frac{t'\gamma_f}{T\cos\theta'} + m_s \frac{-\alpha_{\textit{eff}} \gamma_f / \sin\theta' - \gamma_f / \cos\theta'}{-\gamma_s / (3^L \sin\theta')} \tag{58}$$

$$= \frac{t'\gamma_f}{T\cos\theta'} + m_s \frac{-\gamma_f 3^L \sin\theta'}{\gamma_s} \left( \frac{\alpha_{\textit{eff}}}{\sin\theta'} + \frac{1}{\cos\theta'} \right) \tag{59}$$

$$= \frac{t'\gamma_f}{T\cos\theta'} - m_s \frac{\gamma_f 3^L}{\gamma_s} (\alpha_{\textit{eff}} + \tan\theta') \tag{60}$$

where (44)-(48) specifies the transformation from ($\beta$, $\alpha$) to ($\theta'$, $t'$), and (50) specifies $\alpha_{\textit{eff}}$.

It is easy to see from FIG. 16B that the spectral support of the ray will lie within the cross-hatched wedge i.e. it will never lie on the $\omega_s$ axis, or equivalently, it will never be oriented in the direction of the $m_f$ axis in the space domain. Consequently the parameterization $h^{\beta,\alpha}[m_s]$ that depends on $m_s$ will always be possible.

1.4 Hybrid Space-Fourier Domain

We say an image $y^d[m_f, m_s]$ is in the space domain if $m_f$, $m_s \in \mathbb{Z}$ are spatial coordinate indices. It turns out that the implementation of the reprojection can be made more efficient, in terms of computational cost, memory usage and parallelizability, if the intermediate images are represented in a hybrid space-Fourier domain [1] instead.

If the 1D discrete Fourier transform (DFT) of $y^d$ is performed along the $m_f$ coordinate then we get an image $y[k_f, m_s]$ that is in the space-Fourier domain, i.e. it is a function of one Fourier coordinate $k_f$ and one spatial coordinate $m_s$ i.e. $Y[k_f, m_s] = \sum_{m_f=0}^{N_f-1}[m_f, m_s]e^{-i2\pi m_f k_f/N_f}$. Without loss of generality, here we are assuming that the range of the image indices are $m_f \in \{0, 1, \ldots, N_f-1\}$ and $m_s \{0, 1, 1, \ldots, N_s-1\}$ to conform to standard DFT notation even though we previously used the ranges $\{-N_f, -N_f+1, \ldots, +N_f\}$ and $\{-N_s, -N_s+1, \ldots, +N_s\}$ Recall, from Section 1.3.5, that in the decomposition stages the intermediate images are sheared along the fast coordinate direction. From (27), we know that this operation reduces to a convolution with a fractional delay filter along the fast direction i.e. $g^d[\bullet, m_s] = y^d[\bullet, m_s] * h_d^{\alpha m_s}$, where "*" denotes the 1D convolution with respect to the variable represented by [.]. Consider transforming the input and output images ($y^d$ and $g^d$) to the space-Fourier domain. Then by the well known property that a (circular) convolution between two signals in the spatial domain is equivalent to the multiplication of those two signals in the DFT domain, we get:

$$G[k_f, m_s] = Y[k_f, m_s] \cdot H^{\alpha m_s}[k_f] \text{ where} \tag{61}$$

$$H^\tau[k_f] = \sum_{m_f=0}^{N_f-1} h_d^\tau[m_f]e^{-i2\pi m_f k_f/N_f} \stackrel{(27)}{=} \sum_{m_f=0}^{N_f-1} \psi(m_f+\tau)e^{-i2\pi m_f k_f/N_f} \tag{62}$$

The interpolator $\psi$ we use is the periodic sinc interpolator (a.k.a dirichlet kernel) with period $N_f$ because, as shown in Section C, when using the periodic sinc interpolator the expression for $H^\tau[k_f]$ simplifies to $H^\tau[k_f] = e^{i\tau 2\pi k_f/N_f}$. Therefore for hybrid space-Fourier domain images the shear operation (81) reduces to this pixel-wise multiplication:

$$G[k_f, m_s] = Y[k_f, m_s]e^{i\alpha m_s 2\pi k_f/N_f} \tag{63}$$

Consequently the computational cost (per output pixel) of shearing is reduced from M multiply-adds, where M is the length of the FIR interpolator, to a single complex multiplication. Furthermore the columns of the input and output image (i.e. where a single column corresponds to a single frequency index $k_f$) do not interact with each other and therefore operations across the frequency indices (channels) are parallelizable.

Since the image transformation in the kernel-stage is not a pure shear it cannot be performed in the hybrid space-Fourier domain. So the transformation back to the space-domain is performed prior to the fast-direction interpolation in the kernel-stage (Section 1.3.6).

The length of the DFT, i.e. the amount of zero-padding, needs to be chosen larger enough relative to the $m_f$-extent of the input image $y^d$ to avoid circular shifts and to ensure that the kernel-stage input image is linearly, rather than circularly, convolved as is standard practice in signal processing.

While the voxels of y are real-valued, the voxels of Y will be complex-valued. That might suggest that y will require twice as much memory as Y but that is not the case because the DFT of a real signal is symmetric i.e. $Y[k_f, m_s,] = \overline{Y[N_f-k_f, m_s]}$, where $\overline{\phantom{a}}$ denotes the complex conjugate ($\overline{a+bi}=a-bi$). Because of the symmetry only a little more that half the voxels (for $k_f=0, \ldots, N_f/2$) need to be stored and processed. We assume that $N_f$ is even.

The description of the RP method for the 2D fan-beam geometry that operates in the hybrid space-Fourier domain is presented later, in Section 2.2.4.

2 3D Cone-Beam Geometry

The RP/BP method for the cone-beam geometries for arbitrary source trajectories (circular, helical etc.) is the main component of this invention. It consists of two variants: first the method for geometries with a narrow cone-angle that is simpler to describe; and second the method for an arbitrarily wide cone-angle that is more complicated.

Both methods take a 3D image volume as input and produce a set of 3D cone-beam projections as output. Let the discrete-domain image volume $y^d[\vec{m}]|_{\vec{m} \subset \mathbb{Z}^3}$ be the input to the 3D cone-beam reprojection operator. Without loss of generality we assume, in this description, that the origin of the physical coordinate system coincides with the center of rotation and origin of the coordinate system of the tomographic equipment, and the voxel side lengths T are exactly 1 physical unit. Consequently the discrete-domain and continuous domain image volumes are related as $y^d[m_1, m_2, m_3]=y(m_1, m_2, m_3)$. The treatment of the case $T \neq 1$ would be similar to that described in Sections 1.2 and 1.3 for the parallel beam and fan beam cases.

If we were operating in the continuous-domain then the output projections would also be a 3D function $p(\beta, \alpha, v)$. Every point in $p(\beta, \alpha, v)$ corresponds to a 1D line-integral through the input image y. Specifically this line passes through the source and detector positions parameterized by $\beta$, $\alpha$, v. The output of the discrete-domain RP operator is a 3D volume of samples $p_d[n_\beta, n_\alpha, n_v]$ where $p_d[n_\beta, n_\alpha, n_v]=p(T_\beta n_\beta, T_\alpha n_\alpha, T_v n_v)$, where $T_\beta$, $T_\alpha$ and $T_v$ are the appropriate sample spacings.

Figure 17A:
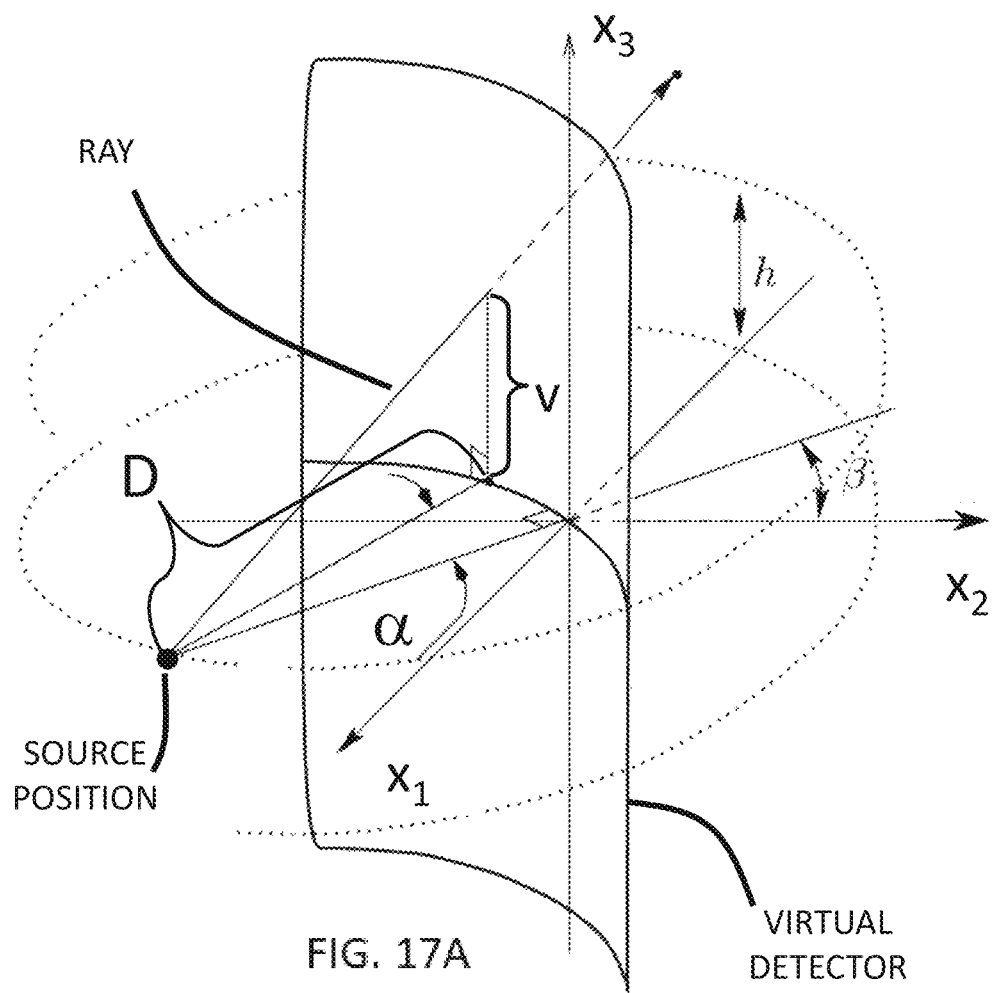
FIGS. 17A-17B illustrate the geometry of 3D curved-panel cone-beam geometry to accompany equations (64)-(65).

The tomographic geometry is illustrated in FIG. 17A. It shows the helical cone-beam geometry for a curved detector panel. The dotted curve shows the helical trajectory of the source around the object. The radius of the helix is D and the pitch is h i.e., for every full turn of the helix, the change in the $x_3$ coordinate is h. For a source position (labeled "source position" in FIG. 17A), the source-angle β is as shown. Consider a ray emanating from the source (labeled "ray") the fan-angle cα is as shown in FIG. 17A). Here β and α are the source angle and fan-angle familiar from the 2D fan-beam geometry. In addition the parameter v is the detector row coordinate that defines the elevation angle of the ray. For convenience the detector coordinates are defined on a virtual detector that passes through the origin of the coordinate system (labeled "virtual detector").

The locations in the 3D coordinate system $(x_1, x_2, x_3)$ of the source $\vec{x}^{src}(β, α, v)$ and detector $\vec{x}^{det}(β, α, v)$ for the ray parameterized by (β, α, v) are given as follows. Here $s_0$ is the $x_3$-coordinate of the source corresponding to the view for which β=0.

$$\vec{x}^{src}(\beta, \alpha, v) = \begin{bmatrix} D\sin(\beta) \\ -D\cos(\beta) \\ s_0 + \frac{h}{2\pi}\beta \end{bmatrix} \quad (64)$$

$$\vec{x}^{det}(\beta, \alpha, v) = \vec{x}^{src}(\beta, \alpha, v) + \begin{bmatrix} \cos(\beta) & -\sin(\beta) & 0 \\ \sin(\beta) & \cos(\beta) & 0 \\ 0 & 0 & 1 \end{bmatrix} \begin{bmatrix} D\sin\alpha \\ D(-1+\cos\alpha) \\ v \end{bmatrix} \quad (65)$$

Let $\vec{x}^{ray}$ be the normalized direction vector from the source to the detector:

$$\vec{x}^{ray}(\beta, \alpha, v) = \frac{\vec{x}^{det}(\beta, \alpha, v) - \vec{x}^{src}(\beta, \alpha, v)}{\|\vec{x}^{det}(\beta, \alpha, v) - \vec{x}^{src}(\beta, \alpha, v)\|} \quad (66)$$

Figure 17B:
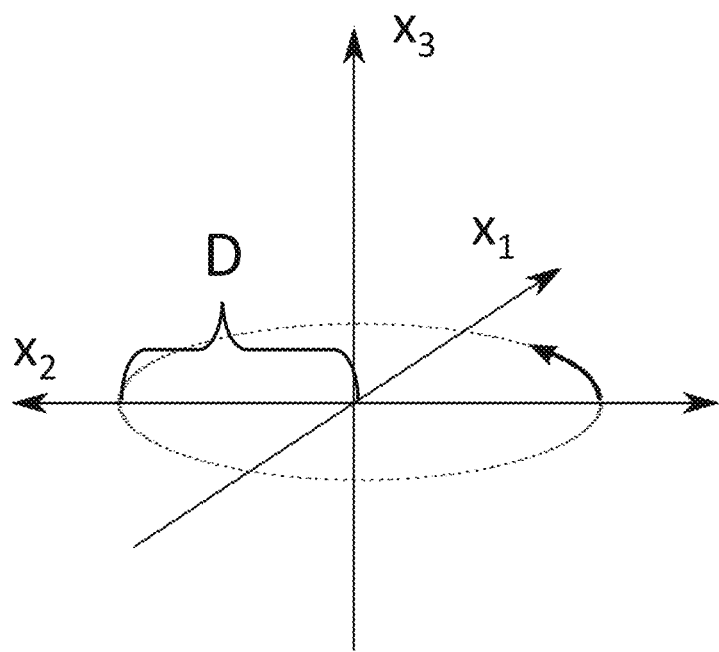

Then $p(\beta, \alpha, v) = \int_{s=-\infty}^{\infty} (\vec{x}^{src}(\beta, \alpha, v) + s \cdot \vec{x}^{ray}(\beta, \alpha, v)) ds. \quad (67)$ FIG. 17B shows another common configuration for the trajectory of the source—circular (where the helical pitch h=0), rather than helical.

2.1 3D Fourier Slice Theorem

Let us state the Fourier Slice Theorem for 3D tomographic geometries, i.e., the 3D equivalent of equations (17)-(18). First define three orthonormal vectors $(\vec{v}_1^{\theta,\xi}, \vec{d}^{\theta,\xi}, \vec{v}_2^{\theta,\xi})$ by rotating the cardinal basis vectors, by the elevation angle ξ followed by the azimuthal angle θ as follows:

$$\left[\vec{v}_1^{\theta,\xi} | \vec{d}^{\theta,\xi} | \vec{v}_s^{\theta,\xi}\right] = \begin{bmatrix} \cos\theta & -\sin\theta & 0 \\ \sin\theta & \cos\theta & 0 \\ 0 & 0 & 1 \end{bmatrix} \begin{bmatrix} 1 & 0 & 0 \\ 0 & \cos\xi & -\sin\xi \\ 0 & \sin\xi & \cos\xi \end{bmatrix} \begin{bmatrix} 1 & 0 & 0 \\ 0 & 1 & 0 \\ 0 & 0 & 1 \end{bmatrix}$$

Figure 18A:
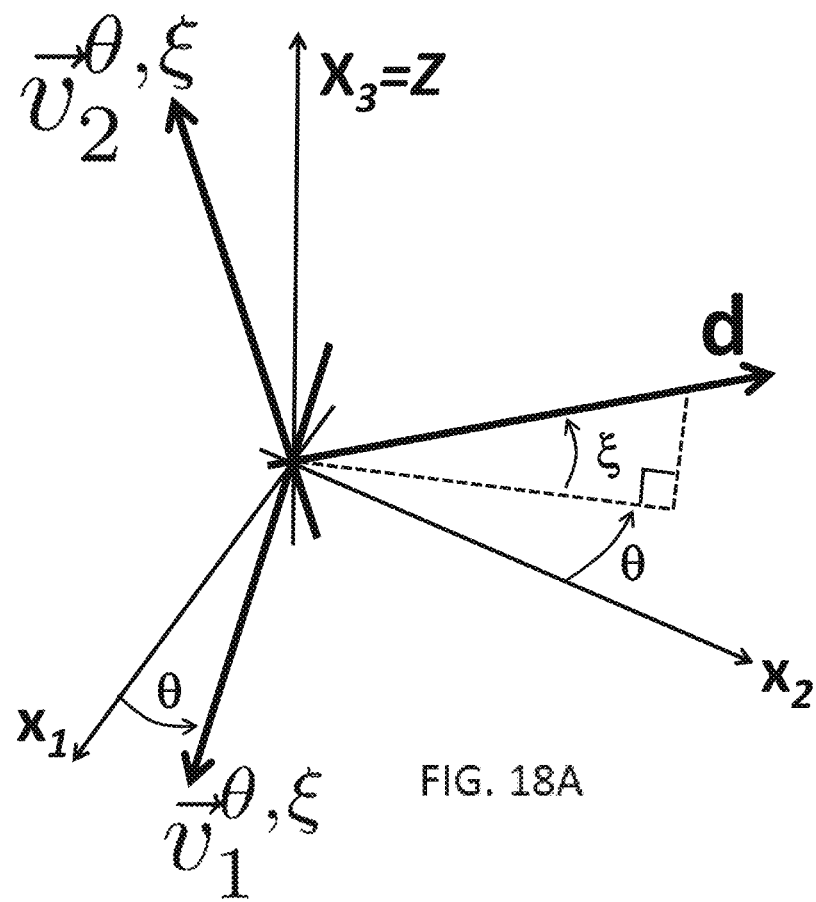
FIGS. 18A-18B are illustrations of the Fourier Slice Theorem in 3D.

The rotated basis vectors are illustrated in FIG. 18A.

Then define the 3D X-ray transform of a 3D function y($\vec{x}$) as the set of all line integrals in the direction $\vec{d}^{\theta,\xi}$. A single 3D X-ray transform projection at angle (θ, ξ) is defined as follows:

$$(\mathcal{P}_{\theta,\xi}f)(t_1,t_2) = \int_s f(t_1 \vec{v}_1^{\theta,\xi} + t_2 \vec{v}_2^{\theta,\xi} + s\vec{d})ds \quad (68)$$

The Fourier Slice Theorem says that the (3D) Fourier transform (denoted $\mathcal{F}_3$) of the function y is related to the 2D Fourier transform (denoted $\mathcal{F}_2$) of its projection $\mathcal{P}_{\theta,\xi}f$ as follows:

$$(\mathcal{F}_2 \mathcal{P}_{\theta,\xi}f)(\omega_1,\omega_2) = (\mathcal{F}_3 f)(\omega_1 \vec{v}_1^{\theta,\xi} + \omega_2 \vec{v}_2^{\theta,\xi}) \quad (69)$$

Figure 18B:
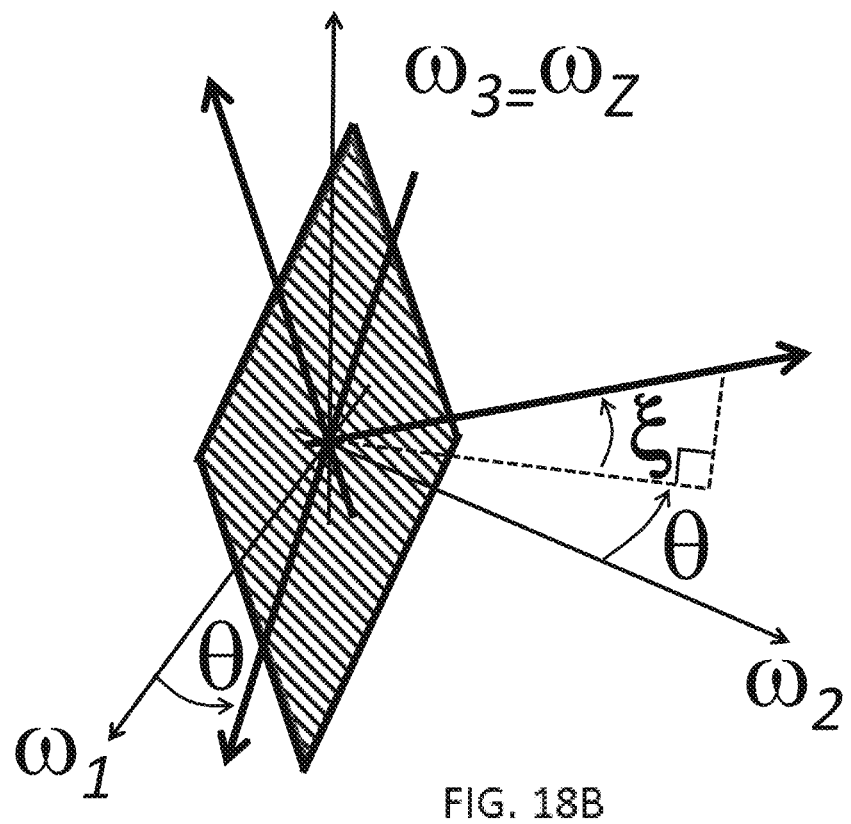

The right hand side of equation (69) describes the Fourier Transform of the image y evaluated on a plane that is constructed by applying two rotations to the $\omega_2=0$ plane: rotation by ξ about $\omega_1$ followed by rotation by θ about $\omega_3$. This plane is illustrated in FIG. 18B by the striped planar region. The 3D Fourier Slice Theorem says that the Fourier content needed to compute the projection $\mathcal{P}_{\theta,\xi}f$ lies on the rotated plane shown in FIG. 18B.

Note that any line integral in any direction can be represented by (68), by the appropriate choice of θ, ξ, $t_1$ and $t_2$. So it is easy to see that the line integral along any ray produced by the RP operator is contained inside an X-ray transform projection $\mathcal{P}_{\theta,\xi}$ for some θ and ξ. It can be shown, from the equation for the ray direction $\vec{x}^{ray}(\beta, \alpha, v)$ (66), that a ray with parameters (β, α, v) is contained in the projection $\mathcal{P}_{\theta,\xi}$, where θ and ξ are as follows:

$$\theta = \beta - \alpha \text{ and } \xi = \arctan(v/D) \quad (70)$$

2.2 3D Cone-Beam Geometry: Narrow Cone-Angle

The RP methods for the fan-beam geometry, described in Section 1.3, can be fairly easily modified to the cone-beam geometries in which the maximum cone-angle of the rays is small. In this narrow-cone-angle method, the fan-beam RP method can be applied to each 2D z-slice individually for the majority of the method. For this reason we call it the 2.5D method.

2.2.1 Decomposition Stage

Consider what happens in the Fourier domain during the decomposition stage of the 2.5D method where the fan-beam RP method is applied identically to each 2D-slice of the input image $y^d$ i.e., $y^d[\bullet,\cdot,m_3]$. Without loss of generality, for simplicity assume that the up-interpolation factors in level l=0 (FIG. 11) are $U_s=U_f=1$. The two main operations in the decomposition stage are (a) the image transformation operators and (b) the slow direction decimation operators.

In the case of image transformation, recall from Section 1.1.3 that when the image is subject to a transformation by a matrix V its spectral support is transformed by $V^T$. Consider a 2D image transformation $V_{2D} \in \mathbb{R}^{2 \times 2}$. In the case when the operator is extended to 3D such that every slice is identically operated on, we get the following simple relationship between the 2D and 3D transformation matrices:

$$V_{2D} = \begin{bmatrix} a_{11} & a_{12} \\ a_{21} & a_{22} \end{bmatrix} \quad V_{3D} = \begin{bmatrix} a_{11} & a_{12} & 0 \\ a_{21} & a_{22} & 0 \\ 0 & 0 & 1 \end{bmatrix} \quad (71)$$

So if the 3D transformation $g(\vec{x}) = y(V_{3D}\vec{x})$ is applied, then a point that in the $\vec{\omega}_f$ spectral support of y is transformed as follows:

$$\vec{\omega}_g = V_{3D}^T \vec{\omega}_f = \begin{bmatrix} a_{11} & a_{21} & 0 \\ a_{12} & a_{22} & 0 \\ 0 & 0 & 1 \end{bmatrix} \vec{\omega}_f \quad (72)$$

-continued i.e., $\begin{bmatrix} \omega_g^1 \\ \omega_g^2 \end{bmatrix} = \begin{bmatrix} a_{11} & a_{21} \\ a_{12} & a_{22} \end{bmatrix} \begin{bmatrix} \omega_f^1 \\ \omega_f^2 \end{bmatrix}$ and $\omega_g^3 = \omega_f^3$ In other words every $\omega_3$-plane of the spectral support of y is subject to an identical in-plane transformation.

In the case of decimation by D (recall B.2) the decimation operator scales the frequency content, expanding it by a factor D along the slow coordinate i.e. $G(\omega_f, \omega_s, \omega_z) = y(\omega_f, \omega_s/D, \omega_z)$.

With this knowledge we can track the evolution of the spectral support of the input 3D volume during the decomposition levels of the 2.5D RP algorithm, just as was done in the 2D case. Recall from FIGS. 10A-10B and Section 1.3.1, that if the DTFT domain of the input image is partitioned into $2 \cdot 3^L$ bow-tie like wedges $W_{L,1}, W_{L,2}, \ldots, W_{L,2\cdot 3^L}$, then the spectral support of the kernel-stage image $I_{L,n}^d$ contains the wedge $W_{L,n}$.

Figure 19A:
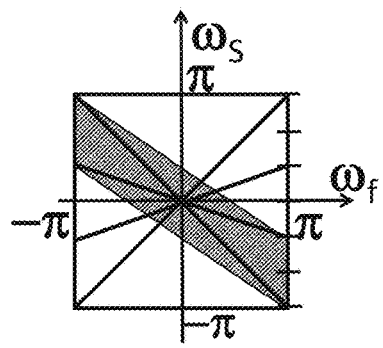
FIGS. 19A-19G illustrate the Fourier analysis of decomposition stages of the 2.5D method as explained in Section 2.2.1.
Figure 19B:
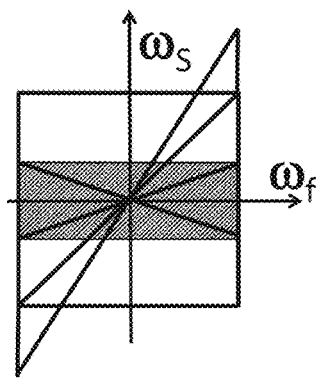
Figure 19C:
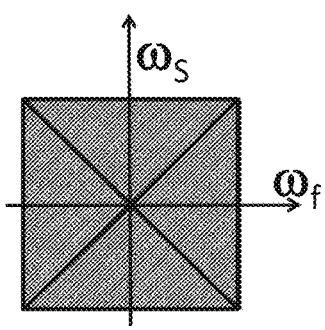

But note that the spectral support of $I_{L,n}^d$ contains not just wedge $W_{L,n}$ but the parallelogram-shaped bounding box that contains the wedge. To see this consider a single child branch of one of the nodes of the algorithm i.e. a shear followed by a decimation. As shown in FIG. 19A-C, every $\omega_z$ slice of the Fourier transform of the parent image gets sheared along $\omega_s$, and then stretched along $\omega_s$. FIGS. 19A-C are almost the same as FIG. 8 (i-iii) but depict both the wedge of interest and the parallelogram-shaped bounding box containing the wedge (denoted by the striped region). This is a more accurate description of the spectral support of the intermediate images in the algorithm. Prior to the shear the bounding box is parallelogram-shaped as shown by the striped region in FIG. 19A. After the shear it is a rectangle that straddles the $\omega_f$ axis as shown in FIG. 19B, and after stretching it is a rectangle that fills the DTFT domain $[-\pi, \pi) \times [-\pi, \pi)$ as shown in FIG. 19C.

Figure 19D:
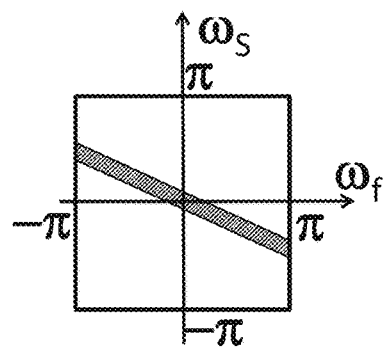
Figure 19E:
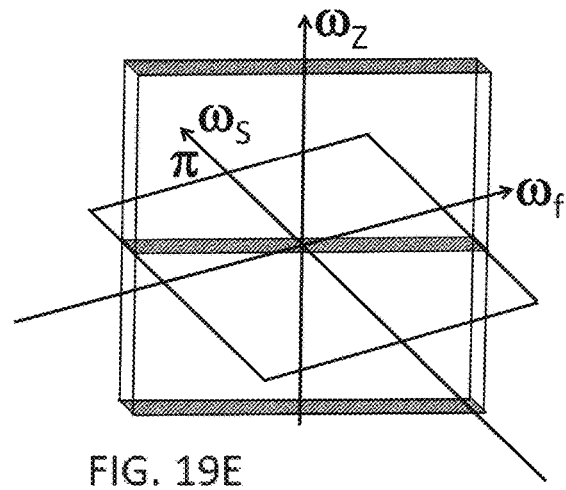

Recursively applying the shearing and stretching of the spectral support at every stage of the decomposition, in every $\omega_2$-slice of the parent image, to the parallelogram-shaped bounding box instead of the wedge, we see that spectral support of the kernel-stage image $I_{L,n}^d$ contains the parallelogram-shaped bounding box containing wedge $W_{L,n}$ (indicated by the striped region shown in FIG. 19D). When considering the whole 3D spectral support it is easy to see that the subset of the spectral support of the input image that is preserved in $I_{L,n}^d$ is a parellelepiped as shown in FIG. 19E—simply the parallelogram-shaped strip from FIG. 19D extended by replication along $\omega_z$.

While our 2D strategy only considered the partitioning of the spectral support into bowtie-like wedges, we are now considering a more accurate description of the spectral support—the trapezoidal bounding box that contains each wedge. This is because in 3D we are using the spectral support of the intermediate images more fully to accommodate the additional degree of freedom of elevation-angle ($\xi$).

Combining the 3D Fourier Slice Theorem with the knowledge of the spectral support of the kernel-stage images, it is shown next that a ray whose cone angle $\xi$ is large in absolute value can not be synthesized from the 2.5D RP method. Recall from the cone-beam to 3D PB mapping equations (70) that any ray in the cone-beam geometry can be parameterized in the 3D parallel-beam geometry as belonging to a parallel beam projection with parameters ($\theta$, $\xi$) given by (70).

Consider a ray whose 3D X-ray-transform parallel-beam parameters are ($\theta$, $\xi$). If $\xi=0$ then recall, from Section 2.1 and FIG. 18B, that its spectral support is a plane that contains the $\omega_z$ axis. Consequently this plane and hence the spectral support of the ray in question is fully contained in one of the $2 \cdot 3^L$ sheared slabs, one of which is depicted in FIG. 19E. On the other hand if the angle $\xi$ is large enough in absolute value, then the spectral support plane (of the 3D parallel beam projection that contains the ray) will be tilted in such a way that the spectral support of the ray falls partially outside the spectral support of the kernel-stage image.

Figure 19F:
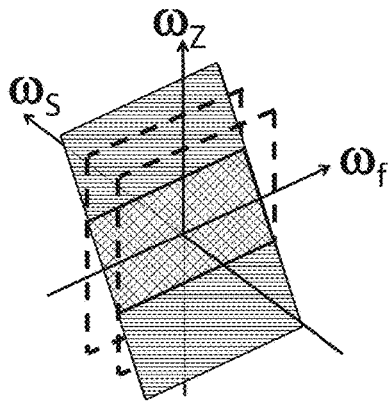
Figure 19G:
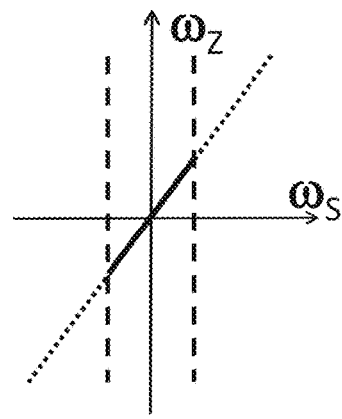

FIGS. 19F-G show such a scenario where $|\xi|$ is large. For simplicity of visualization we show the case where $\theta=0$. The region of the plane in FIG. 19F that is cross hatched falls inside the slab, which is shown by the dashed lines, but the region that is striped falls outside the slab. FIG. 19G shows a side view of the same scenario. Here the regions inside, and outside, the slab are indicated by the solid, and dotted lines, respectively. Consequently the 2.5D method can only be used to compute rays with small cone-angle. We leave further discussion of this cone-angle restriction to Section 2.3 where we describe a preferred method for wide cone-angle geometries.

2.2.2 Kernel Stage

The most significant difference between the fan-beam and cone-beam algorithms is in the kernel-stage. Similar to the case of the fan-beam algorithm explained in Section 1.3.6, the kernel-stage is a sequence of two operations (i) interpolation from an image onto a set of non-parallel lines, each corresponding to a single output ray parameterized by ($\beta$, $\alpha$, v), and (ii) summation along the slow direction.

The differences are as follows. While in the fan-beam case the input to the interpolation is a 2D kernel-stage image $I_{L,n}^d[m_f, m_s]$ and the interpolation is 1D and along the fast direction $m_f$, in the cone-beam case, the input to the interpolation is a 3D kernel-stage image $I_{L,n}^d[m_f, m_s, m_z]$ and the interpolation is performed in a separable way using 1D interpolation along the fast direction ($m_f$) followed by 1D interpolation along the z direction ($m_z$).

Given an input image in the kernel-stage the following are the steps performed.

(a) Determine Set of Output Ray Indices

For a given kernel-stage input image $I_{L,n}^d$ we first construct the set of $\mathcal{I}_n$ the indices of all the rays that will be computed from this image. Recall that the output of the reprojection is a 3D volume of samples. $p_d[n_\beta, n_\alpha, n_v]$. So $\mathcal{I}_n$ is a set of triplet indices. The number of these sets is equal to the number of kernel-stage input images, i.e., $2 \cdot 3^L$. And the size of one set is not necessarily the same as the size of another, i.e., the number of rays synthesized from different kernel stage images can be different.

The preferred way of determining these sets is to precompute them prior to the kernel stage and look them up during the execution of the kernel-stage. The set construction precomputation is as follows:

Step 1: iterate through all the indices of the output volume.

Step 2: For each index triplet ($m_\beta$, $m_\alpha$, $m_v$) determine the ray parameterization ($\beta$, $\alpha$, v) from the geometry specification. The geometry specification has equations mapping the ray indices to the cone-beam parameters. For example in a geometry in which the parameters are uniformly spaced the equations are as follows:

$$\beta(m_\beta)=\beta_0+\Delta_\beta m_\beta \quad \alpha(m_\alpha)=\alpha_0+\Delta_\alpha m_\alpha \quad v(m_v)=v_0+\Delta_v m_v \qquad (73)$$

So this step would be a direct application of these equations.

Step 3: Determine the set to which the triplet index belongs by the following formula:

$$n = m_{KER}(\theta) \quad (74)$$

where $\theta = (-\frac{\pi}{4} + (\beta - \alpha - (-\frac{\pi}{4})) \% \pi)$ where $m_{KER}$ is specified in (37). In (74) the modulo by $\pi$ maps $\theta$ to the range $[-\pi/4, +3\pi/4]$ similarly to (46), since the domain of $m_{KER}$ is $[-\pi/4, +3\pi/4]$.

Step 4: Append/insert the triplet index $(m_\beta, m_\alpha, m_\nu)$ to the set $\mathcal{I}_n$.

(b) Computing Interpolation Coordinates

During the execution of the kernel stage, given a kernel-stage input image $I_{L,n}{}^d$ first the set of output ray indices $\mathcal{I}_n$ is determined as explained in (a). And then these rays are computed from the input kernel-stage image by interpolation. For each triplet index $(m_\beta, m_\alpha, m_\nu)$ in the set $\mathcal{I}_n$, interpolation from the 3D input image $I_{L,n}{}^d$ onto a 1D set of samples along the ray corresponding to the index.

In this section we explain how to compute the interpolation coordinates, so the equations in the section relate to coordinate computation and not image operations. And in the next section we show how the interpolation coordinates computed here are used to perform the interpolation from the input image onto a set of 1D output signals.

Similar to the fan-beam case (Section 1.3.6) the kernel-stage interpolation coordinates for a ray are computed by first transforming the ray from the cone-beam geometry to the coordinate system of the discrete domain input image $y^d$, and then applying the cumulative image transformation that transforms the ray to the appropriate kernel-stage input image.

Consider a ray whose cone-beam parameterization is $(\beta, \alpha, v)$. Equations (64) and (65) give the coordinates of two points on this ray: the source location $\vec{x}^{scr}(\beta, \alpha, v)$ and the detector location $\vec{x}^{det}(\beta, \alpha, v)$. We want to transform these two points to the coordinate system of the appropriate kernel-stage image. For simplicity of notation let us denote the transformed versions of $\vec{x}^{src}$ (and respectively $\vec{x}^{det}$) to the coordinate system of the appropriate image in level l as $\vec{v}_l$ (and respectively $\vec{\eta}_l$).

So in order to compute $\vec{v}_0$ and $\vec{\eta}_0$, for the initial decomposition-stage l=0, we apply the transformations shown in level 0 of the block diagram in FIG. 11 to each slice independently. These transformations, stated in (75), are (i) rescaling of the coordinates by the respective sampling intervals to transform the coordinates from the continuous to discrete image domains, (ii) optional rotation by 90, and (iii) up-interpolation by $U_s$ and $U_f$. So:

$$\vec{v}_0 = \begin{bmatrix} U_f & 0 & 0 \\ 0 & U_s & 0 \\ 0 & 0 & 1 \end{bmatrix} \begin{bmatrix} \cos\frac{d\pi}{2} & \sin\frac{d\pi}{2} & 0 \\ \sin\frac{-d\pi}{2} & \cos\frac{d\pi}{2} & 0 \\ 0 & 0 & 1 \end{bmatrix} \begin{bmatrix} \frac{1}{T} & 0 & 0 \\ 0 & \frac{1}{T} & 0 \\ 0 & 0 & \frac{1}{T_3} \end{bmatrix} \vec{x}^{src} \quad (75)$$

where $d = \begin{cases} 0 & \text{if } n_{\beta,\alpha} \le 3^L \\ 1 & \text{if } n_{\beta,\alpha} > 3^L \end{cases}$ We then transform $v_0$ and $\eta_0$, from the start of the decomposition stage to the start of the kernel-stage using the appropriate cumulative image transformation. Recalling the equivalent fan-beam (frequency-domain) transformation matrix $A_{eff}$ as specified in (51), then the 2.5D (frequency-domain) transformation matrix $A_{eff}{}^{2.5D}$ is constructed by leaving the $\omega_z$ coordinate unchanged:

$$A_{eff}^{2.5D} = \begin{bmatrix} 1/\gamma_f & 0 & 0 \\ \alpha_{eff} 3^L/\gamma_s & 3^L/\gamma_s & 0 \\ 0 & 0 & 1 \end{bmatrix} \quad (76)$$

Just as in the fan-beam case, described in (53), in order to compute the coordinates of the points $v_0$ and $\eta_0$ in the kernel-stage, we multiply each point by the matrix $(A_{eff}^{2.5D})^{-T}$ Now that we know two points on the ray in the coordinate system of the kernel-stage input image, we determine the parameterization of that ray just as it was done in the fan-beam case (FIGS. 16A-16D) and Section 1.3.6) using similarity of triangles. Denoting the coordinates of the two points $v_0$ and $\eta_0$ when transformed to the coordinate system of the kernel-stage input image by $v_L \triangleq (v_f, v_s, v_z)$ and $\eta_L \triangleq (\eta_f, \eta_s, \eta_z)$ respectively, the parameterization of the line is $(m_f, m_s, m_v) = (h_f^{\beta,\alpha,v}[m_s], h_z^{\beta,\alpha,v}[m_s])$ where $$h_f^{\beta,\alpha,v}[m_s] = v_f + (m_s - v_s)\frac{\eta_f - v_f}{\eta_s - v_s} \text{ and} \quad (77)$$

$$h_z^{\beta,\alpha,v}[m_s] = v_z + (m_s - v_s)\frac{\eta_z - v_z}{\eta_s - v_s}$$

Figure 20:
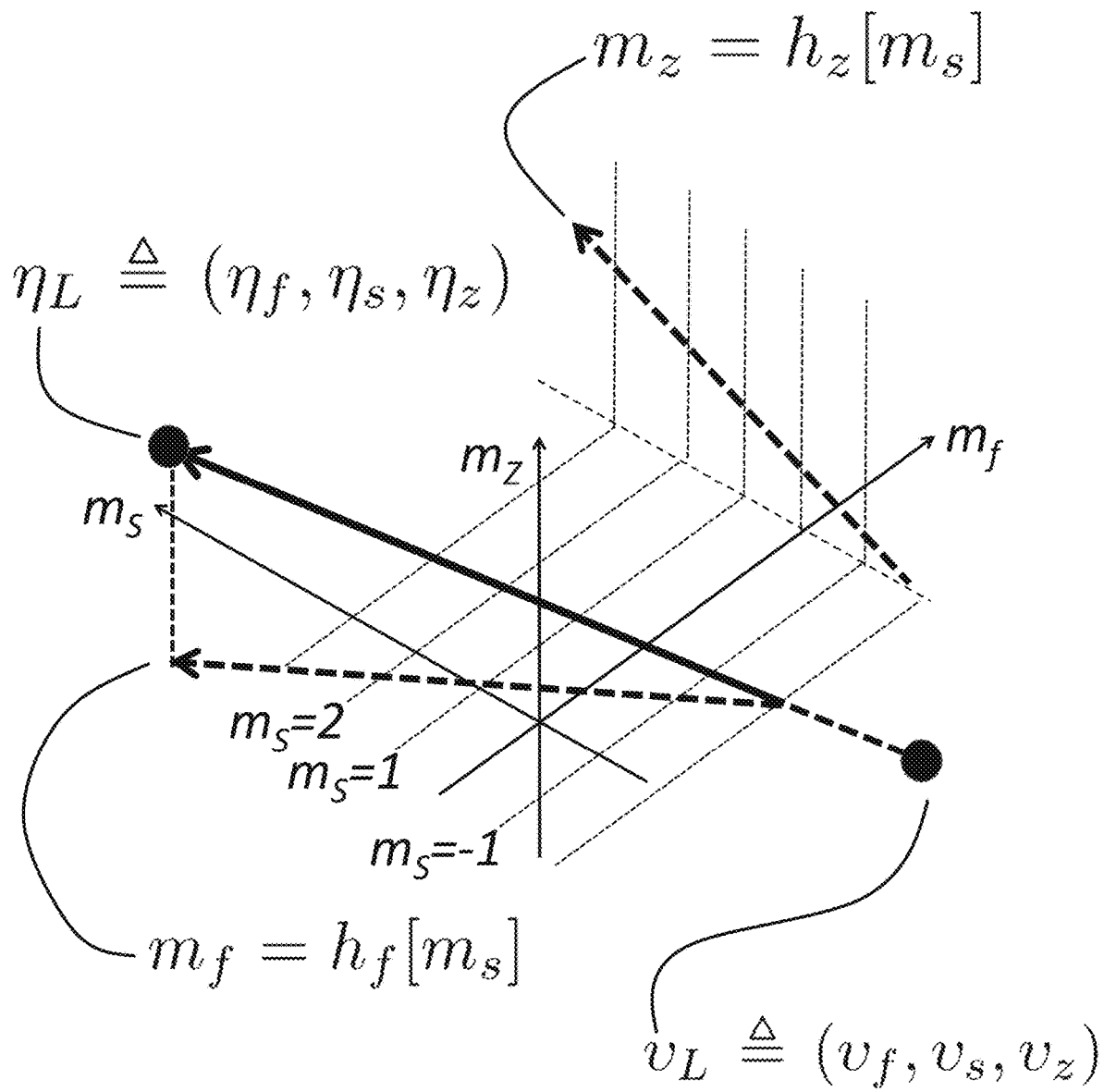
FIG. 20 illustrates separable resampling in the kernel-stage as explained in Section 2.2.2(d): The interpolation of the ray (solid line) that passes through the points $v_L$ and $\eta_L$ from the underlying 3D volume $y[m_f, m_s, m_z]$, can be computed with a sequence of two 1D interpolations onto the line $h_f$ (the dashed gray) followed by onto the line $h_z$ (the dashed gray line) as stated in (77)

This is illustrated in FIG. 20. It is the 3D version of FIGS. 16A-16D. The ray in question is represented by the thick arrow connecting the two heavy dots, which represent the points $v_L$ and $\eta_L$. The parameterizations of the fast-direction and z-direction coordinates, $m_f = h_f[m_s]$ and $m_z = h_z[m_s]$, can be visualized as projections of the ray onto an $m_s$-$m_f$ plane and $m_s$-$m_z$ plane respectively. These projections are denoted in FIG. 20 by the dashed arrows.

For the same reason as in the fan-beam case (Section 1.3.6) we know that the ray will never be oriented in the direction of the $m_f$ axis (i.e. since the spectral support lies within a wedge that straddles the $\omega_f$ axis), and because $|\xi|$ is small we know the ray will never be oriented in the direction of the $m_s$ axis. So such a parameterization that depends on $m_s$ will always be possible.

(c) Computing Output Projections: Interpolation+Weighting

Now that we have determined the interpolation coordinates $h_f^{\beta,\alpha,v}[m_s]$ and $h_z^{\beta,\alpha,v}[m_s]$, we describe the kernel-stage operations in terms of interpolation of the input image. First the interpolation of the a 1D signal g from the 3D input image $I_{L,n}{}^d$ is performed:

$$g[m_s] = I_{L,n}{}^d[h_f^{\beta,\alpha,v}[m_s], m_s, h_z^{\beta,\alpha,v}[m_s]] \quad (78)$$

Here we use the interpolation shorthand defined in 1.1.5.

Second we perform a summation of g along $m_s$ followed by multiplication by a weight $w_{\beta,\alpha,v}$ i.e., $p(\beta, \alpha, v) = w_{\beta,\alpha,v} \Sigma_{m_s} g[m_s]$. The weight $w_{\beta,\alpha,v}$ similar to the sec $\theta$ weighting in in (16), accounts for the spacing of samples in $g[m_s]$ when transformed to the coordinates of the input image.

(d) Separable Interpolation

For typical CT geometries this interpolation can be performed in a separable way. The 3D-to-1D interpolation in (78) can be done separably in two steps as follows:

$$g_1[m_s,m_z]=I_{L,n}{}^d[h_f^{\beta,\alpha,\nu}[m_s],m_s,m_z] \quad \text{[Step 1](79)}$$

$$g[m_s]=g_1[m_s,h_z^{\beta,\alpha,\nu}[m_s]] \quad \text{[Step 2](80)}$$

Here Step 1 describes 1D interpolation along the $m_f$ coordinate, which is identical for every slice $m_z$. The output of Step 1 is a 2D image $g_1$. Step 2 describes 1D interpolation along the second coordinate of $g_1$ to produce the 1D signal g. Combining the two equations we can show that the output is as desired in (78):

$$g[m_s]=g_1[m_s,h_z^{\beta,\alpha,\nu}[m_s]]=I_{L,n}{}^d[h_f^{\beta,\alpha,\nu}[m_s],m_s,h_z^{\beta,\alpha,\nu}[m_s]]$$

2.2.3 Block Diagram

Figure 21:
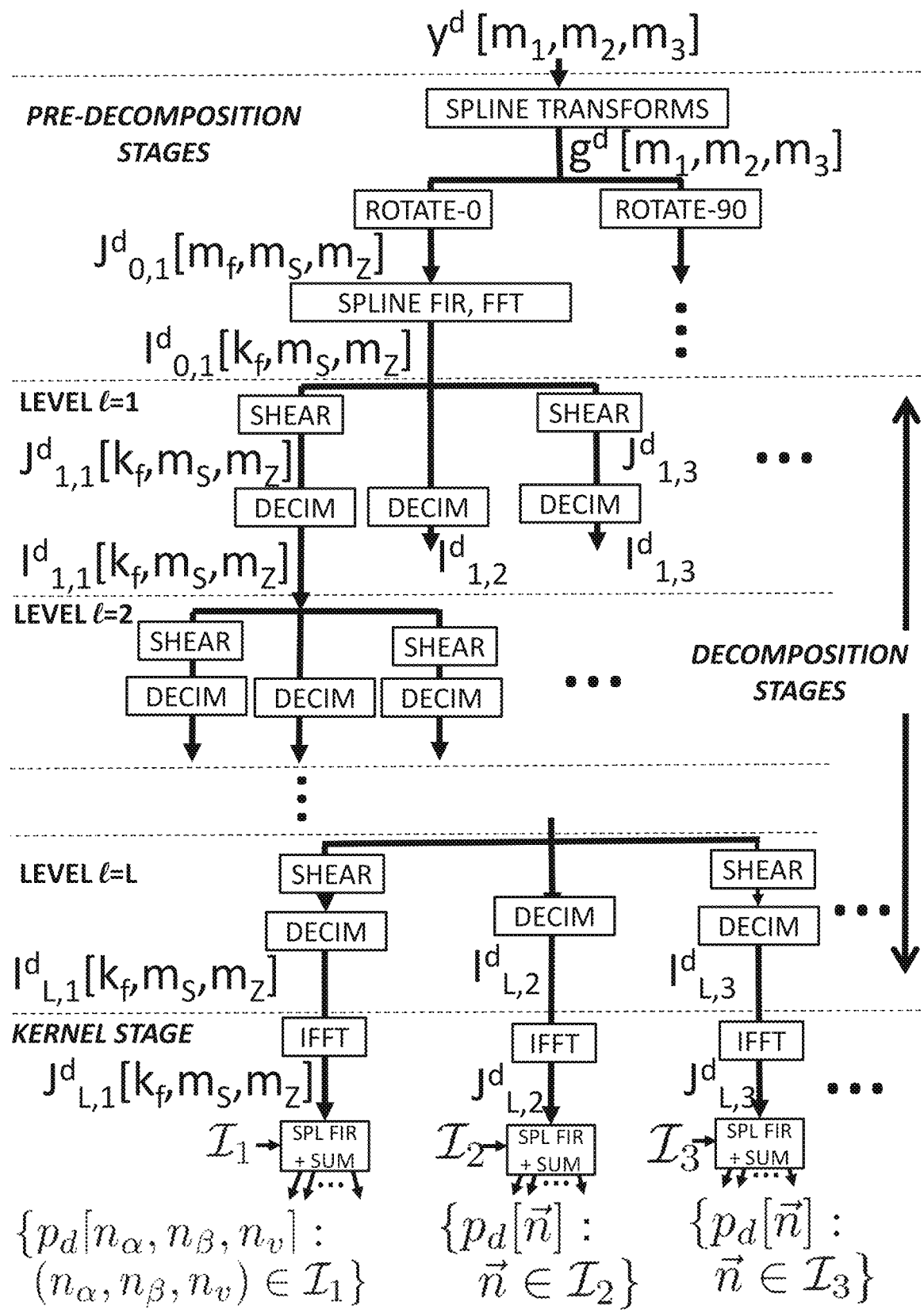
FIG. 21 is a block diagram of DIA reprojection algorithm for narrow cone-angle geometries as explained in Section 2.2.3. The input is the 3D image volume $y^d$, at the top of the block-diagram, and the output is the 3D projections volume $P[m_\beta, m_\alpha, m_v]$ at the bottom of the block-diagram.

FIG. 21 shows a block diagram of a preferred embodiment of the RP method. The input is the discrete-domain 3D image volume $y^d[\vec{m}]$ and the output are the projections of the volume—a 3D volume $p_d[m_\beta, m_\alpha, m_\nu]$.

The overall structure is exactly as in the fan-beam method described previously. In the pre-decomposition stage there is a binary split (just as in FIG. 11), followed by a rotation of 0 or 90 degrees depending on the branch, and up-interpolation along the f and s coordinate directions. In the L levels of the decomposition stage each node is ternary (just as in FIG. 7), resulting in $2 \cdot 3^L$ input images at the kernel-stage. The intermediate images are denoted $I_{l,m}{}^d$ to reflect their correspondence to the block-diagrams for the 2D geometries (FIGS. 7 and 11). As previewed in Section 1.4, the decomposition stage operates in the hybrid space-Fourier domain. Let us take a closer look at the constituent blocks of the block diagram in FIG. 21:

SPLINE TRANSFORMS: This block at the start of the pre-decomposition stage does preparatory work for spline interpolations that are performed downstream in the block diagram. In the algorithm 1D interpolation is performed in a few different modules (such as at the end of the pre-decomposition stage and in the kernel-stage). As explained in Section 1.1.4, when using spline-based interpolation, the 1D interpolation operation can be split into a sequence of an IIR spline-transform followed by a spline-FIR. It turns out that the linearity and separability our method allows for the spline-transform to be performed at the start of the pre-decomposition stage of the RP rather than just prior to the spline-FIR part. Lifting the spline transforms to the start of the pre-decomposition stage allows for fewer arithmetic operations and a more favorable memory access pattern.

In the block labeled SPLINE TRANSFORMS, three 1D spline transforms are performed—one along each coordinate axis of the input image. The corresponding spline FIR parts are carried out later in the RP (in the blocks labeled "SPLINE FIR, FFT", at the end of the pre-decomposition stage, and "SPL FIR+SUM" in the kernel-stage).

ROTATE-0 and ROTATE-90: Exactly as in the fan-beam algorithm (FIG. 11 and B.1, there is a binary split in the pre-decomposition stage, with the child branches rotated clockwise about the $m_m$ axis, by 0 (a no-op) and by $\pi/2$ radians respectively:

$$I_{0,1}{}^d[m_f,m_s,m_z]=g^d[m_f,m_s,m_z] \text{ and } I_{0,2}{}^d[m_f,m_s,m_z]=g^d[-m_s,m_f,m_z]$$

SPLINE FIR, FFT: This is a sequence of the following three operations.
1. Spline FIR along the fast coordinate, as defined in Section 1.1.4: Here the output coordinates are uniformly spaced set of output coordinates with (fractional) spacing $1/\gamma_f$ i.e., $$g_{out}[m_f, m_s, m_z] = \sum_m \psi_{1D}(m_f/\gamma_f - m) g_{in}[m, m_s, m_z]$$

Here $\psi_{1D}$ is the appropriate 1D spline basis function. Note that the accompanying spline transform for this spline FIR operation has been previously performed in the block labeled "Spline transforms".

2. FFT along the fast coordinate: In order that the decomposition stage images be in the hybrid space-Fourier domain, an FFT is performed along the fast direction coordinate:

$$g_{out}[\bullet,m_s,m_z]=\text{DFT}(g_{in}[\bullet,m_s,m_z])$$

The coordinates of $g_{out}$ are $k_f, m_s, m_z$. Because $g_{out}$ has conjugate symmetry along $k_f$, we can truncate the frequency axis from $\{0, 1, \ldots, N-1\}$ to $$\left\{0, 1, \ldots, \frac{N}{2}\right\}$$

to keep only about half the frequency channels. Here N, the FFT length, is chosen to be large enough to provide sufficient zero padding to ensure linear convolution, and avoid circular shifting, of all the images in the hierarchy.

3. Spline FIR along the slow coordinate onto uniformly spaced output coordinates with (fractional) spacing $1/\gamma_s$: $g_{out}[k_f, m_s, m_z]=\Sigma_m\psi(m_s/\gamma_s-m)g_{in}[k_f, m, m_z]$ Some of these three operations commute with each other so there are alternate orders in which they can be performed $\gamma_s$ and $\gamma_f$ depend on the oversampling factor chosen and are set as described in Section 1.3.3.

SHEAR: Just as in the fanbeam algorithm, in every node of the decomposition stage the input image is diverted into three branches. In each branch the image is subject to a shear along the fast coordinate by a different parameter. We use the periodic sinc (a.k.a Dirichlet kernel) interpolator and perform the shear in the hybrid space-Fourier domain as described in (63). As specified in Section 1.3.5 the shear factors are $$\frac{2\gamma_f}{3\gamma_s},$$

0, and $$-\frac{2\gamma_f}{3\gamma_s}$$

in the three branches. So the shear operation on the $i^{th}$ child (i=1, 2, 3) is the following pixel-wise complex multiplication:

$$J_{l+1,3m-2+i}[k_f, m_s, m_z] = I_{l,m}^d[k_f, m_s, m_z] e^{j\alpha_i p n_s 2\pi k_f/N_f}$$

where $$\alpha_i = -\frac{2\gamma_f}{3\gamma_s}(i-2) \tag{81}$$

Note that since the shearing is performed in-plane, every 2D slice of the image volume $I_{l,m}^d[\bullet, \bullet, m_z]$ is handled identically. The operation is equivalent to an in-plane spatial shear along the fast coordinate direction.

DECIM: This denotes 1D filtered decimation by a factor of 3 along the slow coordinate. As explained in B.2 it combines low-pass filtering and downsampling. For an input image that has $N_s$ pixels along the slow direction, the output image will have roughly $N_s/3$ pixels along the slow direction. The decimation operator, denoted Decim in the block diagram and $\mathcal{D}$ in the equations below, takes as input the 1D signal $J_{l,m}[k_f, \bullet, m_z]$, for every $k_f$, $m_z$ in the input image, and produces as output the 1D signal $I_{l,m}^d[k_f, \bullet, m_z]$ Since the input image is complex-valued, the decimation is performed on the real and imaginary parts and the two resulting images are combined to form an output complex-valued image i.e. $\mathcal{D}(J^d) = \mathcal{D}(\text{Re}(J^d) + i\text{Im}(J^d)) = \mathcal{D}(\text{Re}(J^d)) + i\mathcal{D}(\text{Im}(J^d))$.

We use a spline-based decimation that involves IIR and FIR filtering i.e. it is implemented as the adjoint of the spline interpolation described in Section 1.1.4.

IFFT: This block performs an inverse FFT along the fast coordinate. This is performed at the end of the decomposition levels to restore the image from the space-Fourier domain to the space domain: $J_{L,m}^d[\bullet, m_s, m_z] = \text{IFFT}(I_{L,m}^d[\bullet, m_s, m_z])$. During this IFFT we apply the conjugate symmetry to effectively expand the frequency channels from $$\left\{0, 1, \ldots, \frac{N}{2}\right\}$$

to $\{0, 1, \ldots, N-1\}$.

Just prior to performing the IFFT we also apply a spline transform along the fast coordinate. Rather than use a space-domain IIR as in normally done, we perform the equivalent operation in the FFT which is just a multiplication.

SPL FIR+SUM: As described in Section 2.2.2 in the kernel-stage we perform interpolation onto non-parallel lines followed by summation along the slow coordinate. The indices of the output rays that are synthesized from the kernel-stage image $I_{L,n}$ is specified in the precomputed set as $\mathcal{I}_n$ described in Section 2.2.2(a). So in FIG. 21 for the $n^{th}$ kernel-stage input image the set $\mathcal{I}_n$ is shown as an auxillary input to the block labeled "SPL FIR+SUM" via a horizontal arrow. The output of this block is depicted by multiple arrows, each denoting a single output voxel of the array $p_d$.

This interpolation is separably performed—first along the fast coordinate, and then along the z coordinate as described in (79)-(80). The spline transform part of each of the interpolations has been lifted up the hierarchical tree, so only the spline-FIR part is performed here. Specifically the spline transform for the z interpolation is performed in the pre-decomposition stage, and the spline transform for the fast-direction interpolation is performed in the IFFT block at the start of the kernel-stage.

2.2.4 2D Fan-Beam Geometry

Figure 22:
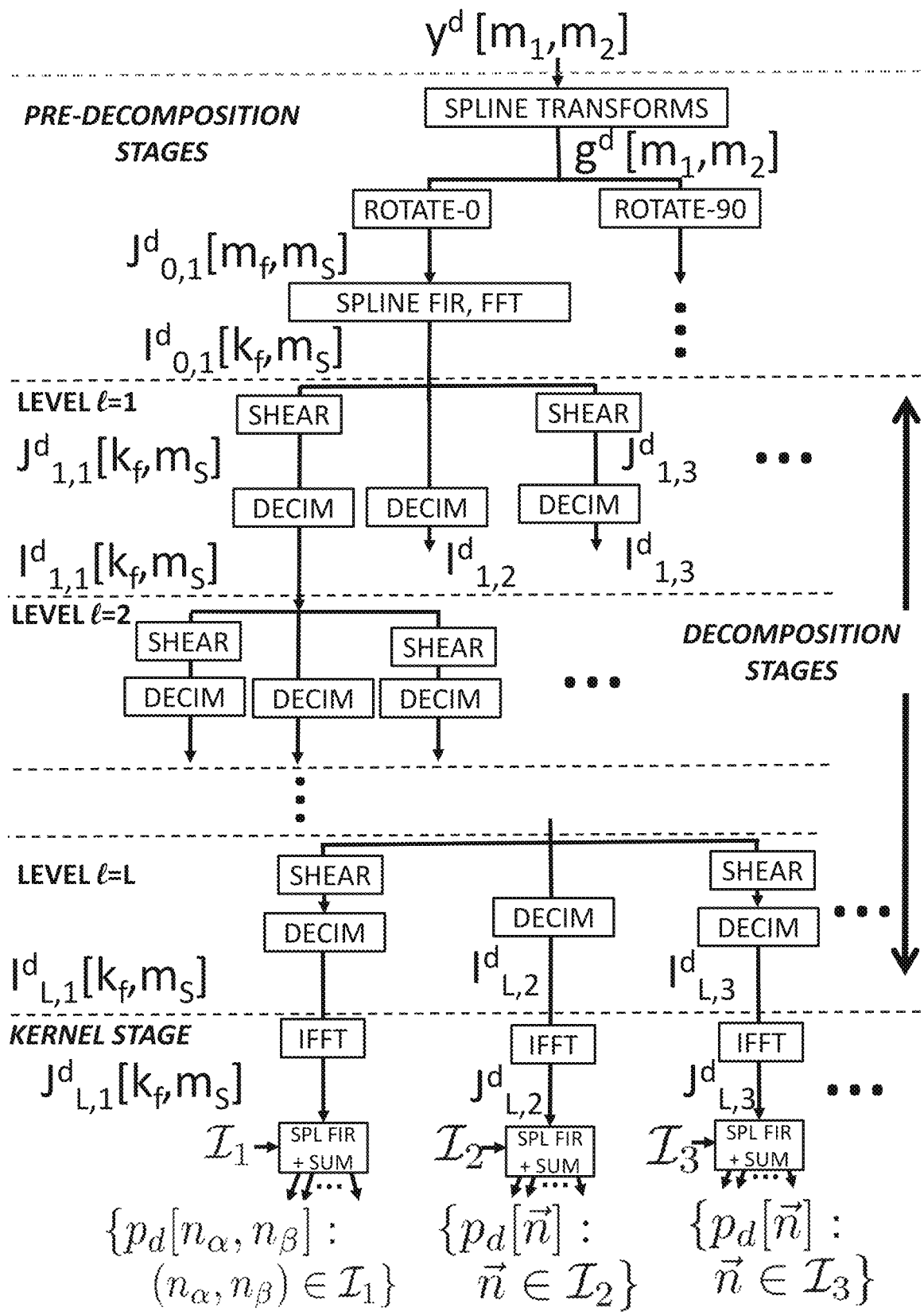
FIG. 22 is a block diagram of DIA reprojection algorithm for narrow cone-angle geometries that operates in the hybrid space-Fourier domain. The input is the 3D image volume $y^d$, at the top of the block-diagram, and the output is the 3D projections volume $P[m_\beta, m_\alpha, m_v]$ at the bottom of the block-diagram.
Figure 23A:
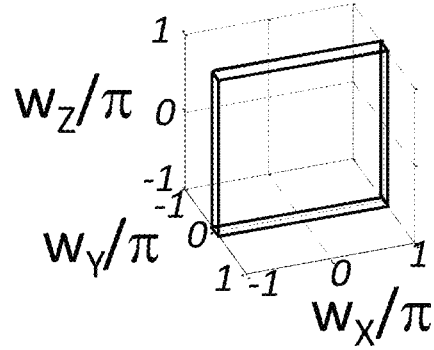
FIGS. 23A-23D illustrate the justification for the wide cone kernel-stage strategy as explained in Section 2.3.1.1 The union of the spectral supports of all the kernel-stage input images is the full 3D DTFT of the input image. This suggests that any cone-beam projection can be produced by manipulating and combining one or more kernel-stage images.
Figure 23B:
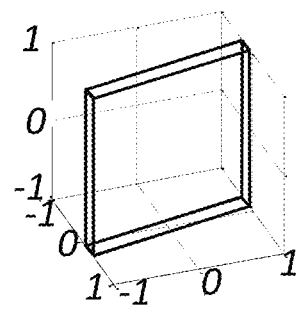
Figure 23C:
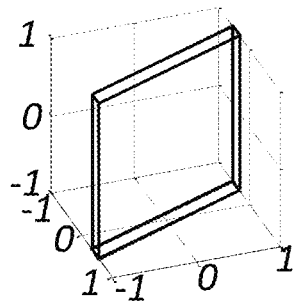
Figure 23D:
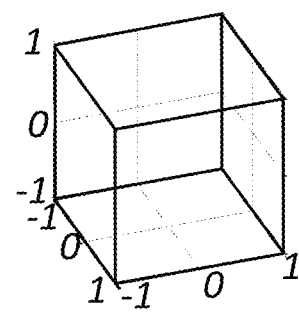

We now present the block diagram for the RP method for the 2D fan-beam geometry in FIG. 22. It is a simplification of FIG. 21, the block-diagram for the 3D narrow cone method. Unlike the 3D narrow cone method, it operates on two dimensions instead of three. So the image is not indexed along the z coordinate and the projections are not indexed along the v coordinate. In all but the kernel stage, the 3D and 2D methods are identical in that the operations of the 2D method are exactly that of the 3D method restricted to a single slice. In the kernel stage the block labeled "SPL FIR+SUM" performs interpolation and summation just like in the 3D method. Unlike in the 3D method in which two-pass separable interpolation is performed, in the 2D method a 1D fast direction interpolation is performed as described in Section 1.3.6 and FIG. 14C-D. The sets of indices corresponding to the kernel stage images $\mathcal{I}_n$ are computed as described in Section 2.2.2(a), but contain 2D index pairs ($n_\beta$, $n_\alpha$), as opposed to 3D index triplets ($n_\beta$, $n_\alpha$, $n_v$).

2.3 3D Cone-Beam Geometry: Wide Cone-Angle

The narrow-cone DIA method (Section 2.2) is attractive because it operates on 2D slices for the majority of the method and only performs 3D interpolations in the kernel-stage, but, as explained in Section 2.2.1, it is unable to compute rays whose inclination angle $\xi$ is large in absolute value because the Fourier-domain support of the kernel-stage images is insufficient (FIGS. 19F-G).

2.3.1 Decomposition Stage vs Kernel Stage Strategy

There are two possible strategies to compute rays with large cone angles.

1. Kernel Stage Strategy

In this strategy the main modification to the narrow-cone method is in the kernel-stage rather than the decomposition stage. This strategy is motivated by the observation that all the information necessary to compute any arbitrary ray already exists in the kernel-stage images of the narrow-cone method. The only problem is that components for a ray are distributed over multiple kernel-stage images. This idea is explained in more detail below and in FIGS. 23A-23D.

Recall from FIG. 19E that the Fourier support of each kernel-stage input image is a parallelepiped. The parallelepipeds corresponding all kernel-stage input images are denoted by $\{S_n: n=1, 2, \ldots, 2 \cdot 3^L\}$ in FIG. 23A-C. The union of the Fourier support of all the kernel-stage input images is the full DTFT spectral support of the input image, i.e. the cube $[-\pi, \pi]^3$ shown in FIG. 23D.

Consider the spectral support of a 3D PB projection with a large cone-angle $\xi$. As shown in FIGS. 18A-18B this spectral support is a 2D plane. Since $\xi$ is large this 2D-planar spectral support is not fully contained within the spectral support of any single kernel-stage image, but it is contained inside the cube $[-\pi, \pi]^3$. This means that different parts of this 2D-planar spectral support are contained within different sheared slabs representing the Fourier support of the kernel-stage input images.

So all the Fourier domain information necessary to construct a PB projection with a large cone-angle $\xi$ is available in the kernel-stage images. But the complication is that different regions of the spectrum of this projection need to be extracted from different kernel-stage images and need to be reassembled to synthesize the 2D-plane that is the spectral support of a single 3D PB projection. If this extraction and reassembly were possible, this would imply that any 3D PB projection can be computed by taking the inverse 2D FFT of this reassembled spectrum. This further implies that any 3D ray can be synthesized by combining spectra of the kernel-stage input images.

2. Decomposition Stage Strategy

In this strategy the main modification to the narrow-cone method is in the decomposition stage rather than the kernel-stage. The broad outline of the algorithm remains the same, namely:
1. The images in the decomposition stage are arranged in a hierarchical tree with the input image at the root. The hierarchy is more complicated than the narrow-cone case to accommodate the wide cone-angle. There are multiple ways of organizing this 3D hierarchy. We describe a preferred embodiment for the hierarchy in Section 2.3.2.
2. Just as in the narrow-cone case every child image is computed by performing an image transformation and decimation of the parent image.
3. The kernel-stage is very similar to the narrow-cone case i.e., every output ray would be computed from a single kernel-stage input image using interpolation and summation.

2.3.2 Hierarchical Decomposition

We now describe in detail a preferred embodiment of the decomposition stage strategy. It is constructed such that every ray can be synthesized from a kernel-stage input image. We take a bottom-up approach to partitioning the 3D spectral support of the image in a hierarchical manner. Here is an outline of the strategy.

(a) Every ray that we want to synthesize is parameterized by a parallel-beam view angle ($\theta$) and a cone-angle ($\xi$), as explained in Section 2.1. So considering the 2D $\theta$-$\xi$ plane, we know the limits of $\theta$ are (0°, 180°] and the limit of $\xi$ is the maximum cone-angle. We determine how to partition the $\theta$-$\xi$ plane such that every cell represents a single kernel-stage input image.

Figure 24A:
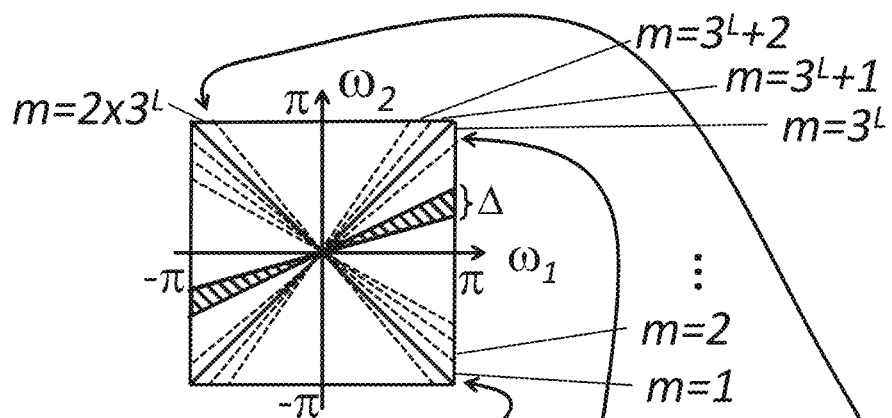
FIGS. 24A-24B illustrate the partitioning of $\theta$-$\xi$ plane for the low cone-angle method FIG. 24A Partition of 2D frequency plane for the 2D DIA method as shown in FIG. 10.
Figure 24B:
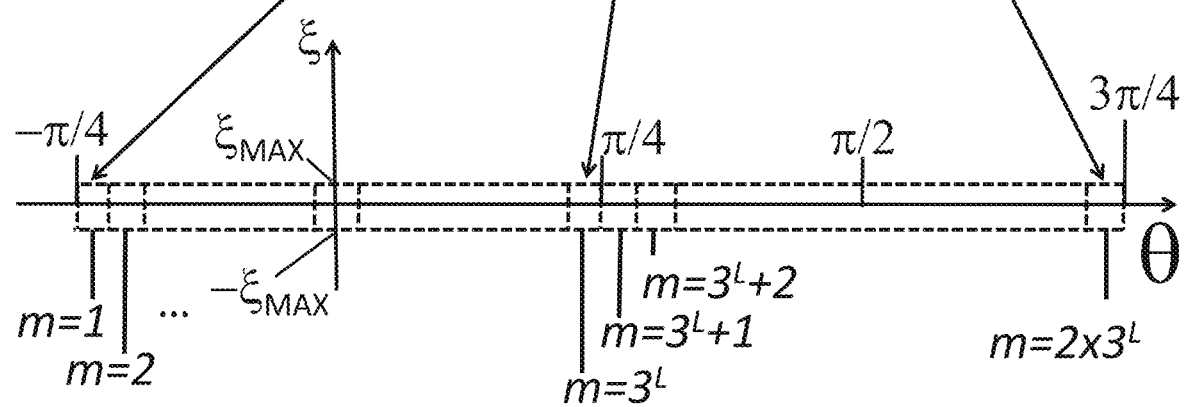

(b) FIGS. 24A-24B show the $\theta$-$\xi$ partitioning that is used, in effect, in the narrow-cone-angle method. Here the range of ($\theta$, $\xi$) of interest is [−π/4, 3π/4)×[−$\xi_{MAX}$, $\xi_{MAX}$], for some small $\xi_{MAX}$. FIG. 24A shows the partitioning of the 2D Frequency plane, reproduced from FIG. 10, and described in Section 1.3.1. FIG. 24B shows how that partitioning is represented on the $\theta$-$\xi$ plane. The $m^{th}$ wedge in FIG. 24A, which we know corresponds to the $m^{th}$ kernel-stage image, is responsible for synthesizing rays whose parallel-beam view angles $\theta$ is in some interval [$\theta_{min}^{L,m}$, $\theta_{max}^{L,m}$), which was specified earlier in equations (39)-(40).

Figure 25A:
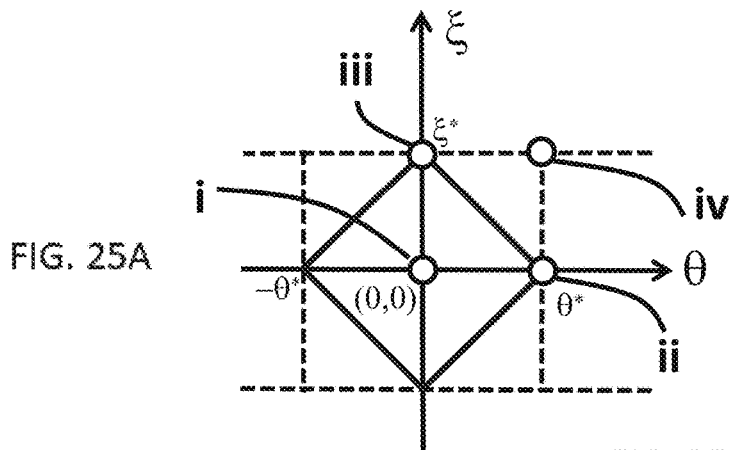
FIGS. 25A-25E are illustrations of the diamond shape of a cell in the $\theta$-$\xi$ plane as explained in Section 2.3.2(c).
Figure 25B:
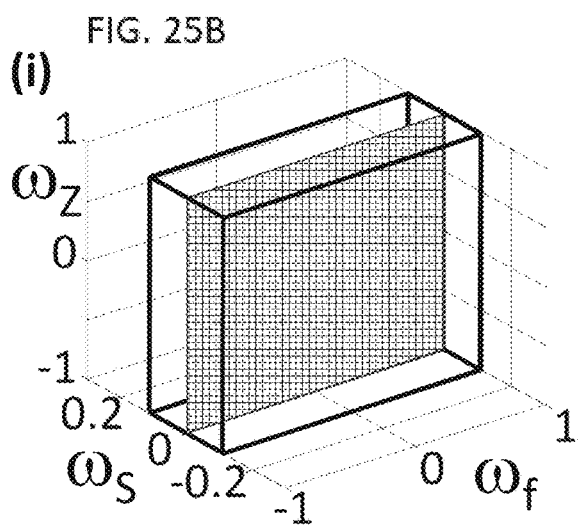
Figure 25C:
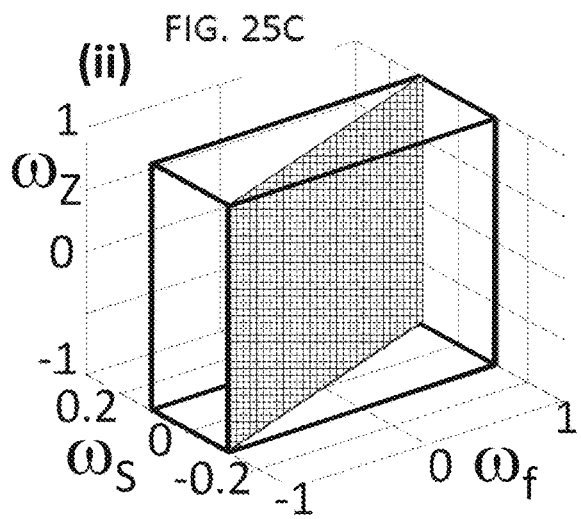
Figure 25D:
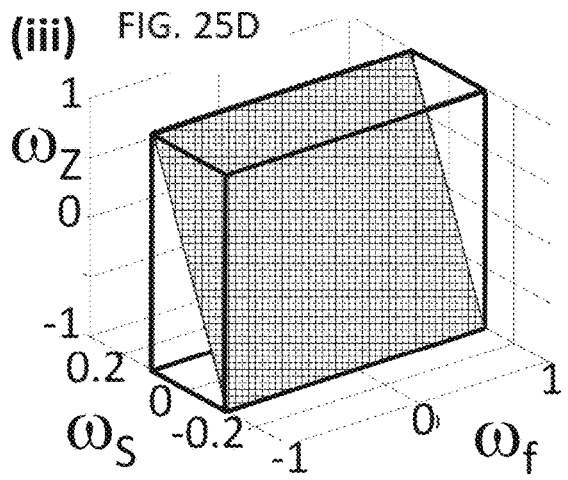
Figure 25E:
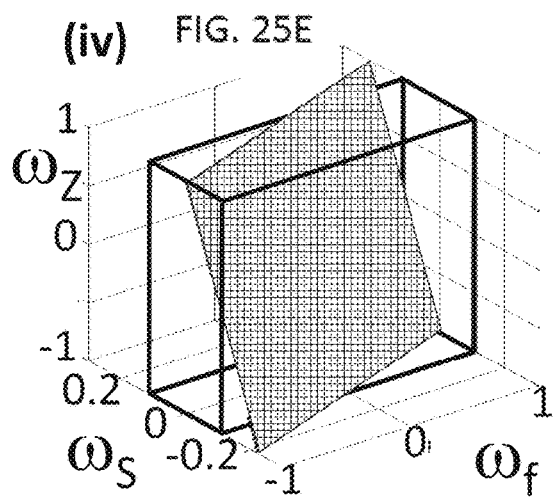

In the narrow-cone-angle method all rays that have the same $\theta$ are produced from the same kernel image. So all rays from the rectangle-shaped, 2D interval [$\theta_{min}^{L,m}$, $\theta_{max}^{L,m}$)×[$\xi_{min}$, $\xi_{MAX}$) are produced from the $m^{th}$ kernel-stage image (c) FIGS. 25A-25B demonstrates that the region of the $\theta$-$\xi$ plane corresponding to rays whose spectral support is fully contained in the kernel-stage image is shaped like a diamond. FIG. 25A shows a certain portion of the $\theta$-$\xi$ plane and FIG. 25B-E illustrates the 3D spectral support corresponding to four points in the $\theta$-$\xi$ plane For simplicity of visualization let us consider the central (i.e. m=($3^L$+1)/2) kernel-stage image which is concerned with $\theta$, $\xi$ close to (0, 0). In particular the $\theta$ range we are concerned with is [−$\theta^*$, +$\theta^*$) where $\theta^* = \theta_{max}^{L,m} = $arctan (0.5$\Delta$/π). For this special case of m=($3^L$+1)/2, $\theta_{min}^{L,m} = -\theta_{max}^{L,m} = -\theta^*$.

We know that the 3D spectral support of this kernel-stage image is a slab that is perpendicular to the $\omega_s$ axis. This slab is the rectangular cuboid illustrated in the subplots of FIG. 25B Now consider four different points in the $\theta$-$\xi$ plane: (i) ($\theta$=0, $\xi$=0), (ii) ($\theta$=$\theta^*$, $\xi$=0), (iii) ($\theta$=0, $\xi$=$\xi^*$), (iv) ($\theta$=$\theta^*$, =$\xi^*$). The 2D spectral supports of the 3D PB projections at each of these view-angles is shown in FIGS. 25B-E respectively. Note that the spectral supports (i-iii) do lie inside the spectral support of the kernel-stage image, but the spectral support (iv) does not.

Furthermore consider point (ii) ($\theta$=$\theta^*$, $\xi$=0). Keeping $\theta$ unchanged but making $\xi$ non-zero will cause the spectral support of the 3D PB projection to fall outside the spectral support of the kernel-stage image. Similarly consider point (iii) ($\theta$=0, $\xi$=$\xi^*$). Keeping $\xi$ unchanged but making $\theta$ non-zero will cause the spectral support of the 3D PB projection to fall outside the spectral support of the kernel-stage image.

Similarly, fixing $\theta$ for intermediate values in (−$\theta^*$, +$\theta^*$) and calculating the $\xi$ ranges for which the spectral support of the 3D PB projection stay inside the spectral support of the kernel-stage image, leads to the diamond-shaped cell shown in FIG. 25A.

This diamond-shape is seen to hold, empirically, for typical ranges of $\theta$ and $\xi$ assuming that the underlying spectral support of the object is the cube [−π, π]$^3$. Specifically, fix a point ($\theta_0$, $\xi_0$) in the $\theta$-$\xi$ plane and a $\theta$ range ($\theta_0$−$\theta^*$, $\theta_0$+$\theta^*$). Then the parellelepiped bounding slab that contains the spectral support of 3D PB projections in this range will resemble one of the parallelpipeds in FIG. 23A-C. Then fixing $\theta$ for intermediate values in the range ($\theta_0$−$\theta^*$, $\theta_0$+$\theta^*$) and calculating the $\xi$ ranges for which the spectral support of the 3D PB projection stay inside the parallelepiped bounding box, we find that the region in the $\theta$-$\xi$ plane is approximately diamond-shaped.

(d) Now that we have empirically established that the shape of the $\theta$-$\xi$ cell is a diamond, we determine a partition of the whole $\theta$-$\xi$ plane into diamond-shaped cells that results in an efficient implementation of the algorithm. One potential partitioning, illustrated in FIGS. 26A-26C, is to extend the low-cone-angle scheme in a greedy manner.

Figure 26A:
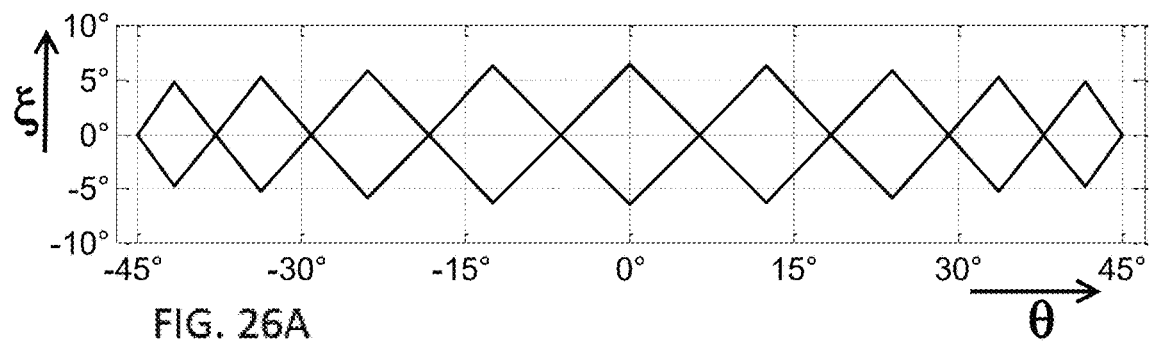
FIGS. 26A-26C illustrate the partitioning of the whole $\theta$-$\xi$ plane in a greedy manner as explained in Section 2.3.2(d) FIG. 26A First the whole $\theta$-axis is partitioned by a row of diamond-shaped cells, FIG. 26B After the row is complete the partitioning is extended to the adjacent row of cells in a greedy manner. For every cell in this row three of the four corners (solid circles) have already been determined. The fourth corner is determined by finding the point with the largest $\xi$ that can be contained in the spectral support of the relevant kernel-stage input image as shown in FIG. 26C.
Figure 26B:
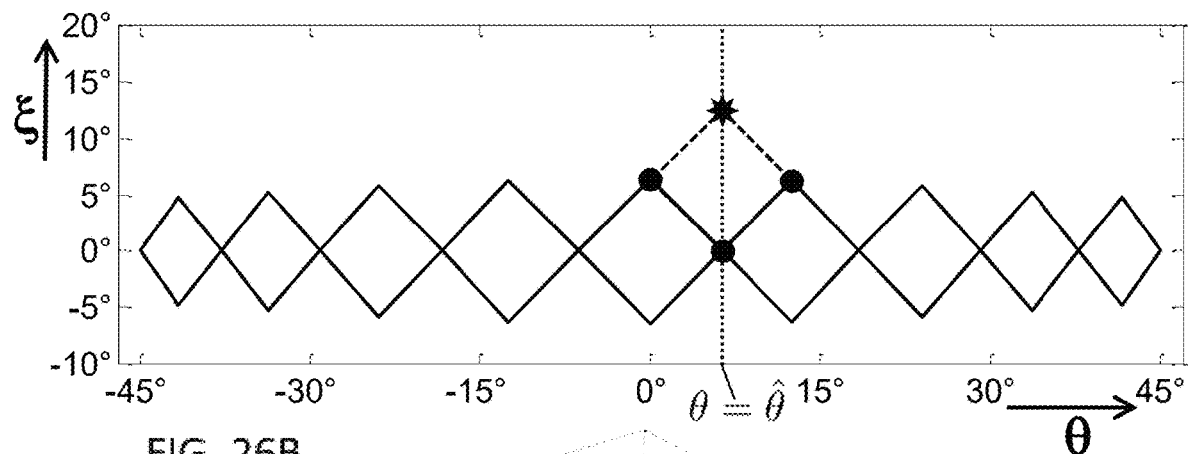
Figure 26C:
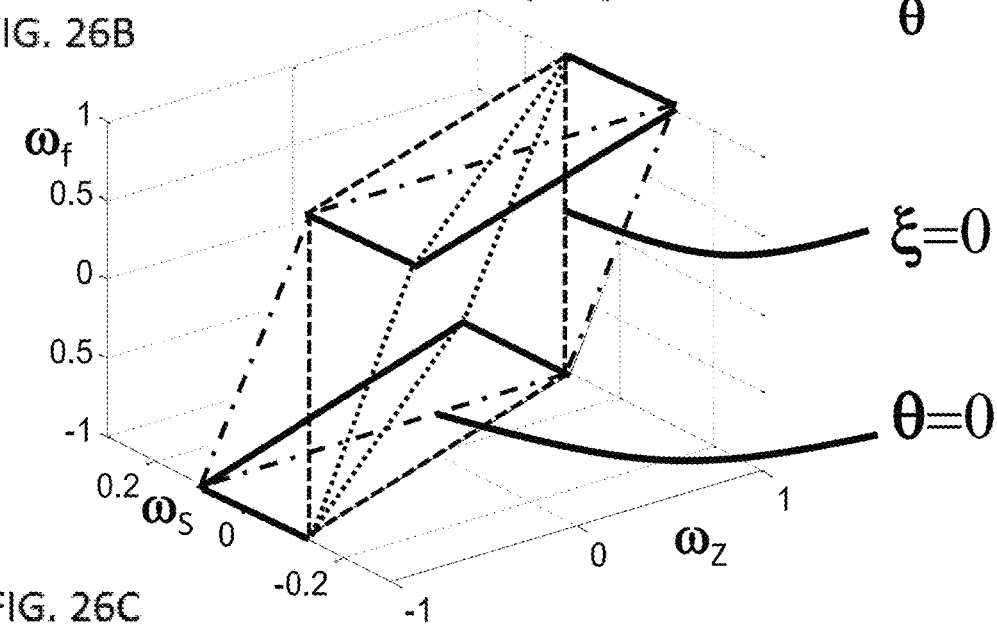

FIG. 26A shows the partitioning of the cone-angle cells that overlap the $\xi$=0 axis. We have determined empirically that the correct shape of the central cell, that contains the point ($\theta$=0, $\xi$=0), is a diamond. We then use the 2D DIA partitioning as the basis for partitioning the $\theta$ axis (ref equations (39)-(40)). And it follows from item (c) above that each of the cells that lies on the $\xi$=0 axis is diamond-shaped as shown in FIG. 26A.

Now consider a cell adjacent to and above any cell in the row we have constructed and shown in FIG. 26A i.e., cells for which the cone-angle $\xi$ is a little greater than zero. Three of the four corners of this cell, denoted by the three dots in FIG. 26B, have already been determined. So we only need to find the fourth corner of this new cell.

Each of these three ($\theta$,$\xi$) points corresponds to a spectral support that lies on a different plane. Specifically the normal to the plane has angles of azimuth and elevation equal to $\theta$ and $\xi$, respectively, relative to the $\omega_f$ axis. These three spectral support planes and their bounding box are shown in FIG. 26C. The planes are distinguished by the three distinct line styles of their edges: dashed ($\theta \neq 0$, $\xi=0$), dotted ($\theta \neq 0$, $\xi \neq 0$) and dot-dashed ($\theta=0$, $\xi \neq 0$). We determine the minimal parallelepiped bounding box containing these three planes. This parallelepiped-shaped bounding box is shown in the in FIG. 26C by the heavy lines. (Specifically, the edges of the bounding box that are not coincident with the edges of the three planes are denoted by the heavy lines). The fourth point in this $\theta$-$\xi$ cell is determined by considering the mid-point of the cell, denoted $\bar{\theta}$, in FIG. 26B. We determine the fourth corner of the diamond by fixing $\theta=\hat{\theta}$ and finding the largest $\xi$ such that the spectral support of ($\theta$, $\xi$) is still contained in the parallelepiped-shaped box containing the other three spectral support planes. The line $\theta=\hat{\theta}$ is show by the dotted vertical line in FIG. 26B and the fourth point of the boundary of the diamond-shaped cell is shown by the star in FIG. 26B.

(e) Next we show how to transform the parallelepiped-shaped box containing the spectral support of an intermediate image to baseband using a sequence of two shears in order that the transformed image has a small bandwidth along the slow coordinate direction.

Figure 27A:
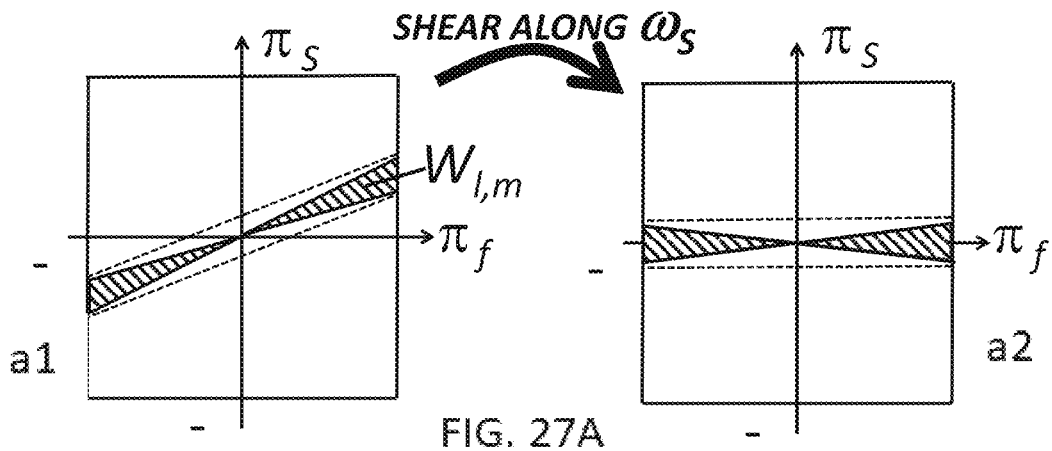
FIGS. 27A-27B illustrate how the spectral support of any intermediate image can be transformed to baseband by a sequence of 1D shears as explained in Section 2.3.2(e).

Recall that in the 2D case, the intermediate image $I_{l,m}$ corresponds to the wedge $w_{l,m}$ of the spectral support of the input image in FIG. 27A(a1). This wedge (shaded region) is contained in a parallelogram-shaped region that is symmetric about the origin ($\omega_s=0$, $\omega_f=0$), indicated by the dashed lines. This parallelogram-shaped region can be "transformed to baseband" by a single shear as shown in FIG. 27A(a2). This baseband transformation causes the spectral support of interest to have a low bandwidth along the slow coordinate and therefore allows for sparse sampling along the slow coordinate direction.

In the 3D case the intermediate image corresponds to a region of the spectral support of the input image that is a union of planes, as shown by the parallelepiped bounding box in FIG. 26C. The parallelepiped bounding box can be transformed to baseband by a sequence of two shears as shown in FIG. 27B.

Figure 27B:
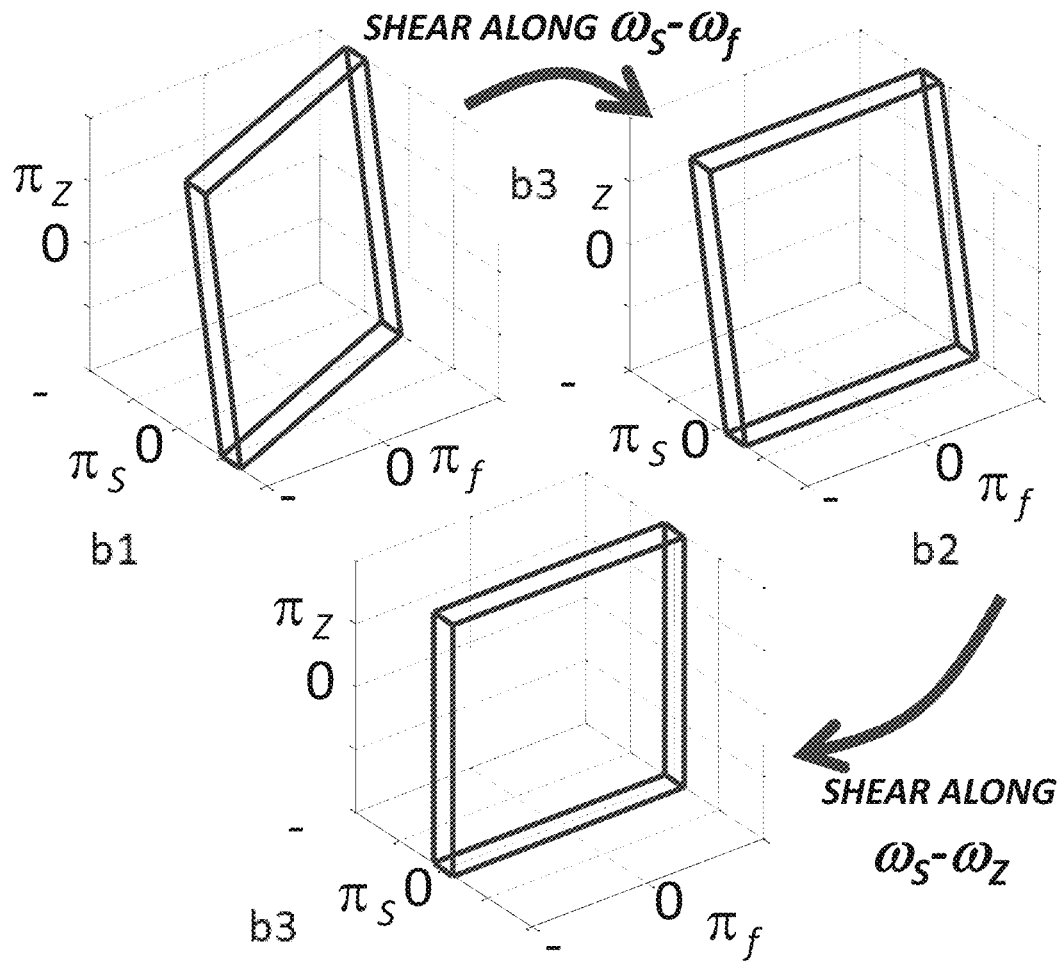

FIG. 27B(b1) shows a typical parallelepiped box containing the region of the spectral support of the input image that corresponds to a particular intermediate image. The first shear is in $\omega_s$-$\omega_f$, i.e. the shear is along the $\omega_s$ coordinate direction but the magnitude of each 1D shift is proportionate to the $\omega_f$ coordinate. After the first shear the spectral support is as shown in FIG. 27B(b2). The second shear is in $\omega_s$-$\omega_z$, i.e. i.e. the shear is along the $\omega_s$ coordinate direction but the magnitude of each 1D shift is proportionate to the $\omega_z$ coordinate. After the second shear the spectral support is as shown in FIG. 27B(b3) i.e., a cuboid that is aligned with the coordinate axes and is narrow along the $\omega_s$ coordinate. Just as in the 2D case, the small bandwidth along the w, coordinate direction allows for sparse sampling along the slow coordinate direction.

The transformation of an intermediate image to baseband using one or more shears implies that the intermediate-image is sampled in space on a sheared Cartesian grid; a Cartesian grid that has been subject to one or more shears.

Figure 28A:
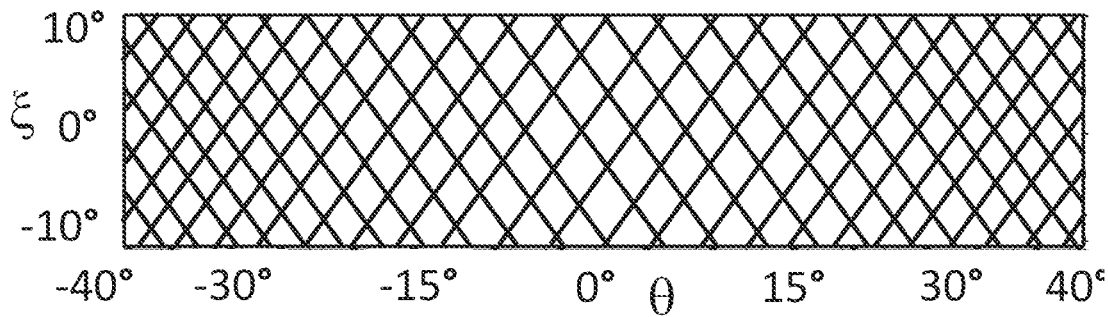
FIGS. 28A-28C illustrate the hierarchical relationship of $\theta$-$\xi$ cells in different levels of the decomposition stage FIG. 28A The partitioning of the $\theta$-$\xi$ plane for the lowest decomposition level is constructed by extending the greedy method of FIG. 26 to the relevant subset of the whole plane.

(f) Extending the greedy method of computing adjacent rows of diamond shaped cells, explained in item (d) above, to the whole $\theta$-$\xi$ plane, by applying it recursively row after row, we get what is shown in FIG. 28A. Every diamond shaped cell here corresponds to a single kernel-stage input image i.e. a leaf node of the decomposition stage hierarchy.

Figure 28B:
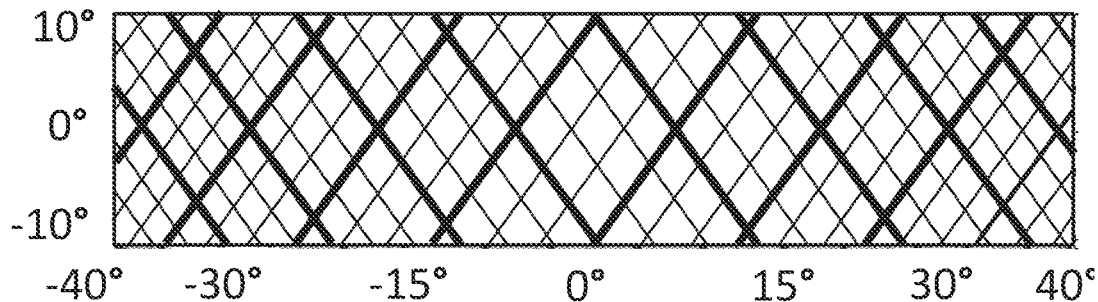

(g) In order to construct the diamond shaped cells of the parent level in the hierarchical decomposition tree we simply combine the cells from FIG. 28A in groups of 3×3. FIG. 28B shows this combination. Here the cells from FIG. 28A are reproduced as is and denoted by thin lines to indicate that they are child cells. The parent cells in this stage are denoted by thick lines. Note that every thick-bordered parent cell consists of 3×3 child cells.

(h) At every level of the hierarchy 3×3 child cells are combined to construct a parent cell.

(i) It is empirically seen that for typical geometries, this scheme results in the slow-bandwidth of every child image/cell, after the two shears, being roughly 3× smaller than the slow-bandwidth of the parent image/cell with this strategy.

Figure 28C:
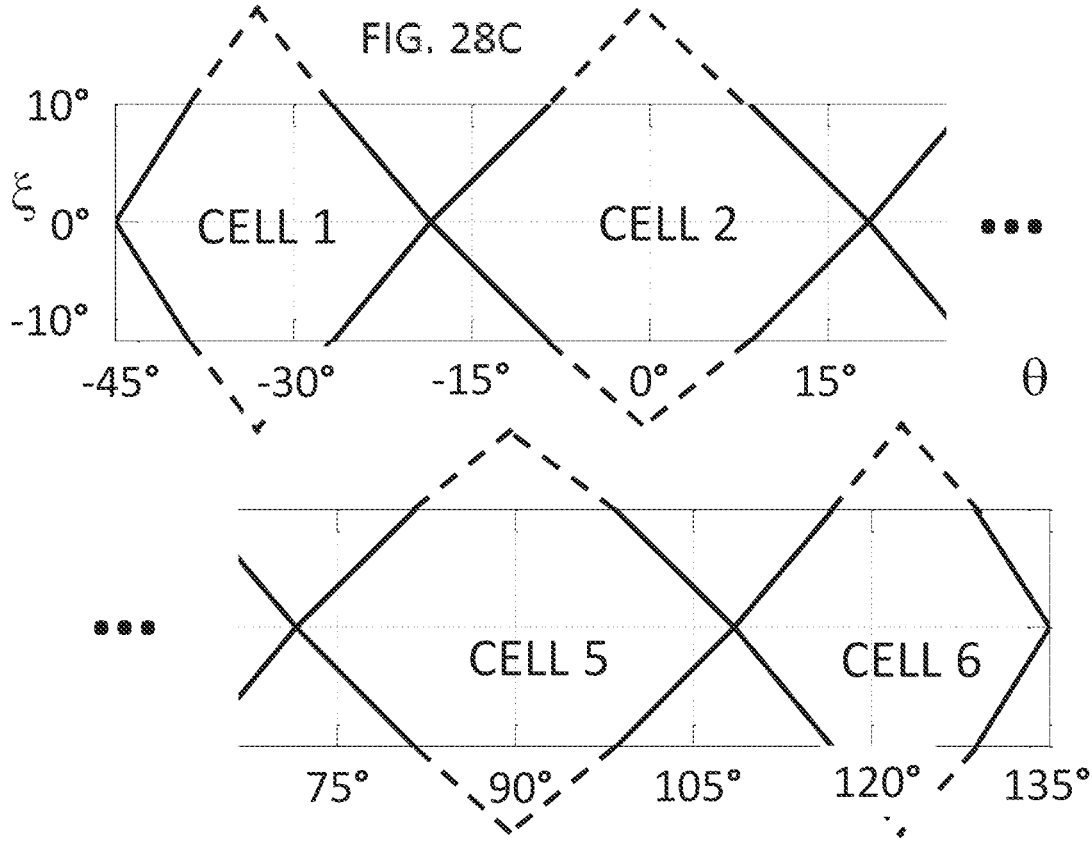

(j) FIG. 28C shows what the $\theta$-$\xi$ partitioning looks like at the top-most level. Here, as an example, consider a circular cone beam (CCB) geometry (FIG. 17B) where the maximum cone-angle is 10°. The procedure for a different cone angle is the same. So any ray to be computed can be parameterized by ($\theta$, $\xi$) where $\theta \in [-45°, +135°)$ and $\xi \in [-10°, +10°]$. At the top-most level we partition the rectangle $[-45°, +135°) \times [-10°, +10°]$. This rectangle is shown in FIG. 28C split in two parts in order to fit it on the page while maintaining the aspect ratio of the FIG. 28A-B. This rectangle is partitioned into the diamond shaped cells, truncated to $\xi \in [-10°, +100]$, shown in FIG. 28C. Each truncated-diamond shaped cell here is constructed by combining the thick-bordered parent cells from (c) in groups of 3×3.

(k) Recall the Fourier domain description of the hierarchy of the 2D algorithm as described in Section 1.3.1 and FIGS. 9A-9B. Every intermediate image in the hierarchy $I_{l,m}^d$ corresponds to the wedge $w_{l,m}$ in the Fourier domain, and can be used to compute 2D PB projections for some range of view-angles $[\theta_{min}^{l,m}, \theta_{max}^{l,m}]$ as specified by equations (39) and (39).

In the case of the wide cone-angle hierarchy described here, every intermediate image in the hierarchy corresponds to a diamond-shaped cell in the $\theta$-$\xi$ domain (such as shown in FIGS. 28A-28C), and can be used to compute a 3D PB projection parameterized by $\theta$, $\xi$ as long as ($\theta$, $\xi$) lies inside this diamond-shaped cell.

Furthermore the cell in the $\theta$, $\xi$ plane corresponds to a subset of the spectral support of the input image. Specifically this subset is the union of all spectral support planes, each of which corresponds to a 3D PB projection, whose angles of azimuth and elevation ($\theta$, $\xi$) lie within that diamond-shaped cell. Such a spectral support subset is illustrated in FIG. 26C.

(l) Compare the top-level partition for the 3D wide-cone-beam algorithm shown in FIG. 28C to its equivalent for the 2D fan-beam algorithms shown in FIG. 9A In the 2D case, at the top level, the input image has six children images. Each child corresponds to a wedge-shaped subset of the Fourier support, labeled $W_{1,1}, \ldots, W_{1,6}$ in FIG. 9A, and corresponds to a roughly 30° range of PB view-angles.

Correspondingly in the 3D wide-cone-beam case, as shown in FIG. 28C, there are six diamond-shaped cells, labeled "Cell 1" to "Cell 6", that sit on the $\theta$ axis. At its widest extent, i.e. at $\xi=0$, the $\theta$-range of each cell is exactly the same as in the 2D case. In addition to these six "on-axis" cells there are number of cells that do not lie on the $\theta$ axis that are responsible for rays that lies outside the domain of the on-axis cells.

(m) FIGS. 28C-A describe the hierarchical partitioning scheme of the $\theta$-$\xi$ plane used in the decomposition stages of the wide cone-angle RP method. To apply this method we translate this to a hierarchical block diagram, similar to the those for the previously described methods (such as FIG.

21), in which the parent-to-child branching mirrors the hierarchical partitioning of the θ-ξ plane shown in FIGS. 28A-28C.

Since FIG. 28C shows 6×3 cells—6 cells corresponding to the on-axis diamonds in FIG. 28C and 6×2 corresponding to off-axis diamonds, the number of children at the top level of the block diagram is 18=6×3. And since FIG. 28A-C shows that in lower levels of the hierarchy, every parent cell is divided into 3×3 children cells, the block diagram of the method will also have a 9-way partitioning of all but the top levels.

For the diamonds that are partial, i.e. truncated by the global limits of θ and ξ, there will be fewer than 9 children per parent since the children that fall outside the partial diamonds are ignored.

The aspects (a)-(m) enumerated above provide the outline of the strategy for partitioning the 3D spectral support of the image in a hierarchical manner.

In this section we have described the hierarchical partitioning of the ξ-θ plane that underlies the decomposition stage of the wide-cone-beam method. We will translate this hierarchical partitioning into a hierarchical block diagram, such as shown in FIG. 21. Before we do so we show that we are able to achieve our target computational cost.

2.3.3 Computational Cost

At first glance, it seems like we have a problem. Recall that in the narrow-cone-angle (RP) case, in every level the number of images increases by a factor of R=3 but the slow bandwidth, and consequently the number of samples in an image, decreases by a factor of R, thus maintaining the constancy of the total number of samples in every level. This results in the $O(N^2L)$ cost of the L decomposition levels.

In the wide-cone angle case depicted in FIG. 28, each parent cell is constructed by combining 9 child cells. But recall also that the slow bandwidth of each child image is 3× smaller than the slow bandwidth of the parent image. So in every level the number of images increases by a factor of $R^2$ but the slow bandwidth of each image decreases by a factor of R. This suggests that the number of samples in every successive level will increase by a factor of R. This would potentially severely negatively affect computational cost—even if only restricted to the lower levels of the decomposition tree.

If we were able to ensure that the number of samples in a child image was roughly $R^2$×less than the number of samples in the parent image, then we would be able to maintain the $O(N^2L)$ cost of the decomposition levels. Fortunately, we can achieve this by recognizing that rays for a particular (θ, ξ) cell are also spatially localized, and the intermediate images of the hierarchy can be spatially cropped along z to gain the desired additional factor of R in cost.

2.3.4 Incorporating Spatial Locality of Rays

Figure 29:
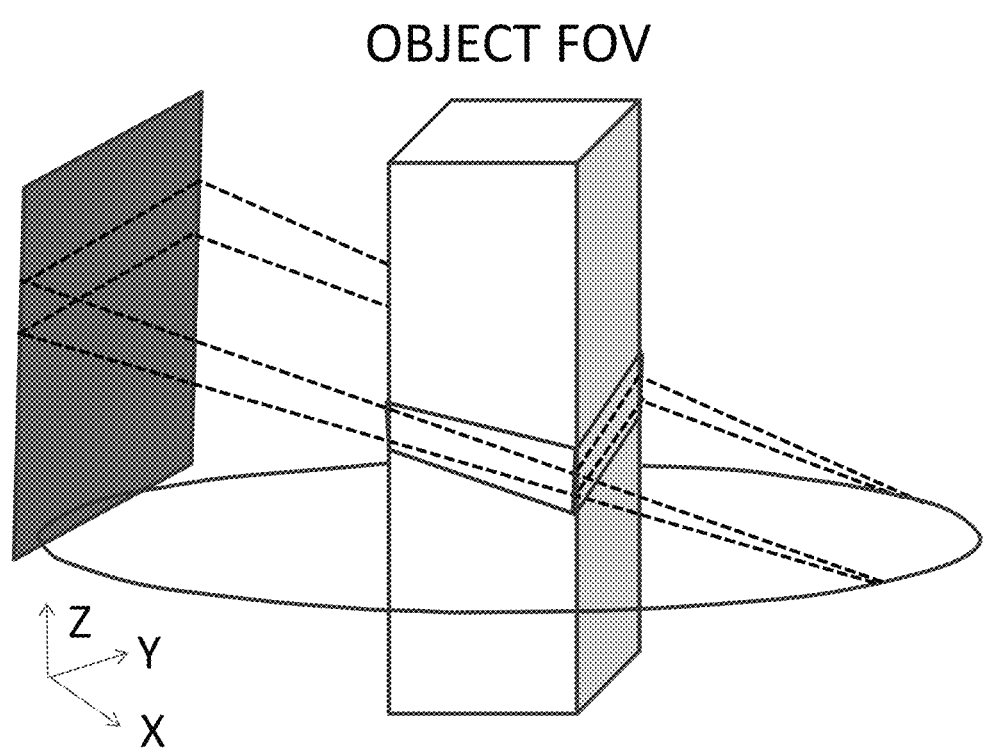
FIG. 29 is an illustration that rays that are close in θ, ξ are also spatially localized. The dashed lines represent the location of the rays that have a small range in ξ and θ. The solid lines surrounding the dashed lines denote a box that contains these rays and is inside the FOV. This box has a limited extent in z.

Without loss of generality, consider the circular cone-beam geometry shown in FIG. 29. Here the field of view is represented by the tall cuboid. Consider the set of all rays corresponding to a kernel-stage image i.e. within a small θ and ξ range. These rays are indicated by the dashed lines. It is easy to see that all these rays will also be spatially localized within the field of view i.e. they will be contained within some limited volume, denoted by the slanted box surrounding the dashed lines. Therefore the kernel-stage image from which these rays are synthesized can also be cropped to the region of the box. It is not hard to imagine that, upon a shearing along z, the box will have a limited extent in the z direction.

Once we have identified the cropped image volumes that correspond to the kernel-stage images, we want to build the images in upper levels by hierarchically combining the images in the lower levels in a manner that enforces the $R^2$× scaling of the number of samples in an image. We have already established that we get an Rx scaling in slow bandwidth from parent to child, and consequently an Rx reduction in the number of samples along the slow coordinate direction. So all that remains is to demonstrate the Rx scaling in z-extent from the parent to child image that will result in an Rx reduction in the number of samples along the z coordinate direction. Combining the two Rx scalings will result in a total $R^2$× scaling in the number of samples from parent to child.

FIGS. 30A-30C demonstrate the Rx scaling in z-extent. Here we assume that the FOV has a cylindrical shape. This both makes the analysis easier and is realistic for typical tomographic geometries. FIG. 30A shows a set of rays for a fixed ($\theta_0$, $\xi_0$). They are parallel to each other and share the same elevation angle. Consequently these rays form a plane whose intersection with the cylindrical shell is an ellipse in this plane. We say that this ellipse corresponds to the point ($\theta_0$, $\xi_0$) in the θ-ξ plane. Now consider four corners of a kernel-stage θ-ξ cell, i.e. a black diamond in FIG. 28A. FIG. 30B shows the four ellipses that correspond to the four corners of a kernel-stage cell. As expected they are spatially localized.

Now consider a volume containing the ellipses corresponding to all the points in this kernel-stage (θ, ξ)-cell. Let us call this the containing volume of that cell. This containing volume is determined by maximizing and minimizing z for each fixed (x, y) on the edge of the cylinder. The containing volume is therefore the subset of the cylinder that is in between two planes. And each of these planes when intersected with the cylindrical shell forms an ellipse in 3D. So the containing volume is defined by a pair of ellipses.

FIG. 30C shows three pairs of ellipses. The inner most pair is denoted by solid lines, the next outer pair is denoted by dashed lines, and the outer most pair is denoted by dotted lines. These three pairs of ellipses correspond to the containing volumes of a cell in the θ-ξ plane, its parent cell, and its grand parent cell respectively. Empirically it appears that, due to the convexity of the geometry, the borders of the region can be computed by considering the four corners of the θ-ξ cell only. It is also empirically seen that the volume of these containing volume regions scales by a factor of Rx from child to parent.

One caveat is that the containing volume of a given (θ, ξ) cell is not just a single volume as depicted in FIG. 29, but a union of multiple such volumes. For the CCB case for example, rays with FB view-angle β and β+π are no longer synthesized from the same volume. In addition to the red box shown in FIG. 29, there will be a similar volume (flipped about the origin in x, y, and z) that will contain the corresponding rays with FB view-angle β+π.

In the case of the helical cone beam (HCB) geometry (FIG. 17A), there will O(T) cropped volumes where T is the number of turns of the helix. Since the total number of samples summed across all the cropped sub-volumes will be similar to the number of samples in the whole image, the overhead of maintaining multiple volumes will only marginally increase the computational cost of the algorithm.

2.3.5 Image Transformations

We have so far established the hierarchical tree structure of the decomposition stage of the algorithm as promised in item 1(a) of Section 2.3.2. Now we can move on to item 1(b)

of Section 2.3.2, i.e., constructing the image transformation between the parent and child of every node in the hierarchy.

Similar to the 2D and narrow-cone methods, our general strategy here is two-fold. We choose image transformations that (i) allow for the intermediate image to have a small bandwidth along one coordinate direction i.e. the slow direction and (ii) can be efficiently implemented.

We have already shown, in Section 2.3.2 item (d) and the accompanying FIGS. 27(b1-b3), that a sequence of two shears can be applied to the input image in order that the spectral support of any intermediate image of interest has a small bandwidth in the slow coordinate direction. This is what we call a "transformation to baseband". Recall that Section 1.1.3 specifies the dual relationship between spatial domain and Fourier domain linear transformation operations. In particular, Section 1.1.3 implies that a shear in the 3D Fourier domain correspond to a shear in the spatial domain.

Figure 31A:
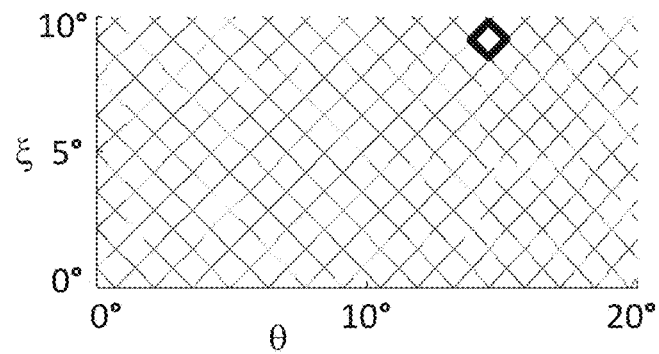
FIGS. 31A-31E are illustrations of transformation to baseband in the Fourier and spatial domains.

FIGS. 31A-31E depict the transformation to baseband in the Fourier and space domains. In FIG. 31A the θ-ξ cell corresponding to the intermediate image that we are considering is shown by the thick-lined diamond. We have picked a kernel-stage image here, i.e. a diamond-shaped cell from FIG. 28A.

Figure 31B:
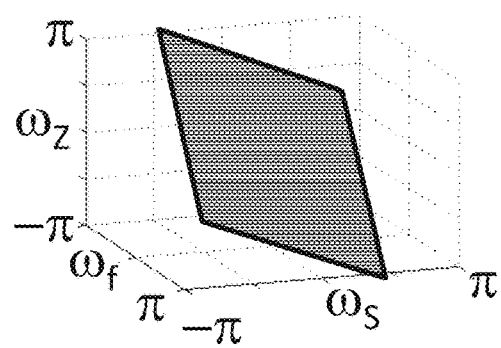

Recall from Section 2.3.2(k) that this intermediate image corresponds to a subset of the spectral support of the input image. FIG. 31B shows this subset of the spectral support of the input image. This figure is similar to FIGS. 25 and 26C, but because all the axes are of equal scaling, and the intermediate image corresponds to the lowest level of the hierarchy (i.e. a small θ-ξ cell), the spectral support is a very thin parallelepiped-shaped slab.

Figure 31C:
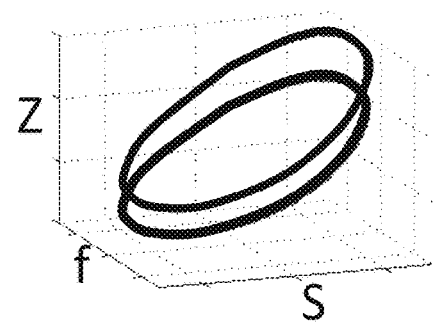
Figure 31D:
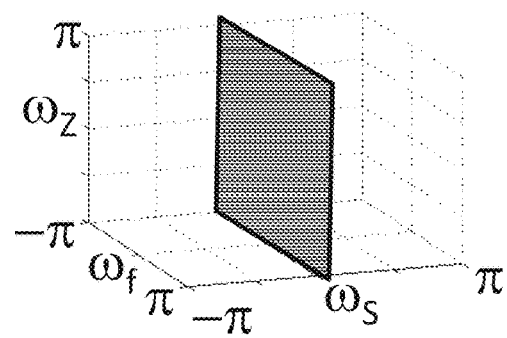

FIG. 31C shows the containing volume of this kernel-stage image, as explained in Section 2.3.4. FIG. 31D represents the spectral support of this kernel-stage image when transformed to baseband. The transformation matrix in the Fourier domain is a shear along $\omega_s$ i.e. $\vec{\omega}_g = V_{\theta,\xi}^T \vec{\omega}_f$ where $$V_{\theta,\xi}^T = \begin{bmatrix} 1 & 0 & 0 \\ -\tan\theta & 1 & 0 \\ 0 & 0 & 1 \end{bmatrix} \begin{bmatrix} 1 & 0 & 0 \\ 0 & 1 & \tan\xi\cos\theta \\ 0 & 0 & 1 \end{bmatrix} = \begin{bmatrix} 1 & 0 & 0 \\ -\tan\theta & 1 & \tan\xi\cos\theta \\ 0 & 0 & 1 \end{bmatrix}$$

Here the order of coordinates is $\omega_f$, $\omega_s$, $\omega_z$.

The transformation to go from the parent to a child image in a node is dependent on the central (θ, ξ) of the cells corresponding the parent and the child images. The transformation involves a shear along $\omega_s$ and a spatial cropping along z at least. Denoting by $V_p$ and $V_c$ the linear "baseband"-transformations of the parent and child, then the $\omega_s$-shear to go from the parent to the child involves undoing the parent baseband ("bb") transformation and applying the child baseband transformation. Let $\omega_0$ be any point in the spectral support of a kernel-stage image eg. a point in the spectral support slab shown in FIG. 31B. Define $$\vec{\omega}_{bb,p} \triangleq V_p^T \vec{\omega}_0 \text{ and } \vec{\omega}_{bb,c} \triangleq V_c^T \vec{\omega}_0$$

Then the parent to child transformation is still a $\omega_s$-shear $$V_{p \to c}^T \triangleq V_c^T V_p^{-T} = \begin{bmatrix} 1 & 0 & 0 \\ -\tan\theta_c & 1 & \tan\xi_c\cos\theta_c \\ 0 & 0 & 1 \end{bmatrix} \begin{bmatrix} 1 & 0 & 0 \\ -\tan\theta_p & 1 & \tan\xi_p\cos\theta_p \\ 0 & 0 & 1 \end{bmatrix}^{-1}$$

$$= \begin{bmatrix} 1 & 0 & 0 \\ -\tan\theta_c & 1 & \tan\xi_c\cos\theta_c \\ 0 & 0 & 1 \end{bmatrix} \begin{bmatrix} 1 & 0 & 0 \\ \tan\theta_p & 1 & -\tan\xi_p\cos\theta_p \\ 0 & 0 & 1 \end{bmatrix}$$

$$= \begin{bmatrix} 1 & 0 & 0 \\ -\tan\theta_c + \tan\theta_p & 1 & \tan\xi_c\cos\theta_c - \tan\xi_p\cos\theta_p \\ 0 & 0 & 1 \end{bmatrix}$$

Recall from Section 1.1.3 that when the transformation of a spectral support point is defined by $V^T$ (i.e., $\vec{\omega}_g = V^T \vec{\omega}_f$) then the corresponding spatial domain transformation is V (i.e. $y(\vec{x}) = g(V\vec{x})$). So the spatial domain transformation that corresponds to $V_{p \to c}^T$ is $V_{p \to c}$. It turns out that $V_{p \to c}$ can be separably decomposed into a shear along f (in the f-s plane) and a shear along z (in the z-s plane).

$$V_{p \to c} = \begin{bmatrix} 1 & -\tan\theta_c + \tan\theta_p & 0 \\ 0 & 1 & 0 \\ 0 & \tan\xi_c\cos\theta_c - \tan\xi_p\cos\theta_p & 1 \end{bmatrix}$$

$$= \begin{bmatrix} 1 & -\tan\theta_c + \tan\theta_p & 0 \\ 0 & 1 & 0 \\ 0 & 0 & 1 \end{bmatrix} \begin{bmatrix} 1 & 0 & 0 \\ 0 & 1 & 0 \\ 0 & \tan\xi_c\cos\theta_c - \tan\xi_p\cos\theta_p & 1 \end{bmatrix}$$

The shears can actually be performed in any order.

Figure 31E:
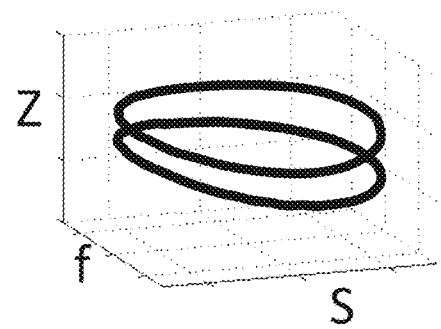

The spatial cropping can be computed from the FOV boundary of the parent and child images (such as shown in FIG. 31E).

2.3.6 Fourier or Spatial Domains

In the narrow-cone method we operate in the Fourier-space-space (fast-slow-z) hybrid domain, but the shearing along z suggests that it might be advantageous to let the z coordinate also be in the Fourier domain. Let us compare how various modules of the algorithm would be implemented if in a Fourier-space-Fourier domain or Fourier-space-space domain:

The case of Fourier-space-Fourier (fast-slow-z) hybrid domain would be as follows:

1(a) Shearing: It turns out that this operation can be performed, just as in the small cone-angle case, by a complex multiplication. It is, perhaps, easiest to see this as a f-s shear followed by a z-s shear. From the small cone-angle case we know that in the Fourier-space hybrid domain, when a spatial shear is performed along the Fourier coordinate direction, it is equivalent to a pixel-by-pixel complex multiplication. In our case, note that each of our two shears (f-s and z-s) conforms to this paradigm, and therefore each one can be performed by a pixel-by-pixel complex multiplication. We can then combine the two complex multiplications into a single pixel-by-pixel complex multiplication.

1(b) Decimation: Since the decimation is performed along the slow, spatial coordinate it is unchanged from the small cone-angle case.

1(c) Cropping along z: Cropping in a spatial coordinate direction is equivalent to filtering and decimation in the Fourier domain. So the wide-cone-angle method will require an extra filter-decimation along the $\omega_z$ coordinate. The case of Fourier-space-space (fast-slow-z) hybrid domain would be as follows:

2(a) Shearing: We want to perform a f-s shear followed by a z-s shear. The f-s shear being in a hybrid Fourier-space domain can be performed by complex multiplication. And the z-s shear being fully in the spatial domain will require an interpolation along z. If the IIR part of the z-interpolation is lifted to the top level this will require only an FIR filtering.

2(b) Decimation: Since the decimation is performed along the slow spatial coordinate it is unchanged from the small cone-angle case.

2(c) Cropping along z: Cropping along the spatial coordinate is a no-op.

The advantages and disadvantages of implementing specific operations/modules in the Fourier-space-Fourier vs the Fourier-space-space domain are as follows:

Z-shearing: lower cost and higher quality in FSF than in FSS. But (a) the poor quality in FSS can be improved by using a compensating pre/post filter, and (b) to reduce computations in FSS the IIR part of the z-shearing can be lifted to the top of the decomposition tree Cropping: will be a no-op in FSS but will be an expensive filter-decimation in FSF 2.3.7 Tight Spatial Cropping The image sizes we computed were based on a tight cropping of the intermediate images along the z-coordinate. But can we achieve this tight cropping in practice? As seen in FIG. 31D the transformation to baseband naturally reduces the extent of the FOV along the z coordinate but the extent is greater than assumed by the tight-cropping. If the naive approach is taken and the image is simply cropped according to the maximum z extent of the FOV the increase in image size in the best case is 1.0× (for ξ=0) and in the worst case is 7× (for θ=π/4 and ξ≈15°)

We can achieve a tighter cropping than this, but the strategy depends on whether the z coordinate is in the spatial or Fourier domain.

1. Fourier-Space-Fourier Domain

Because both f and z are in the Fourier domain, we can perform spatial shears in f-z by doing the equivalent operation in the Fourier domain. It turns out that the spatial transformation that best minimizes the z-extent of the FOV boundary is an additional shear in z-f (i.e., a shear along the z direction, where the magnitude of the 1D shift is a linear function of f). The equivalent Fourier domain operation is a shear along $\omega_f$.

Figure 32A:
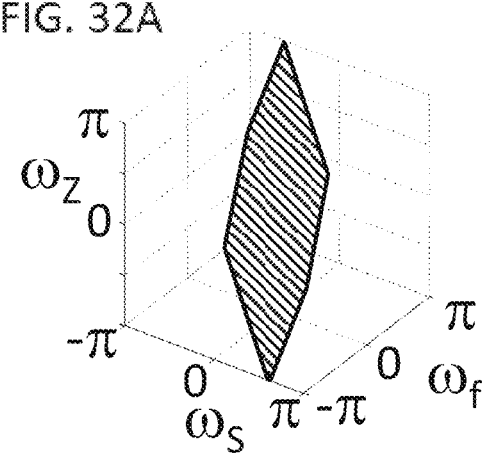
FIGS. 32A-32E illustrate how an additional shear along z allows for a tighter cropping of the FOV. Spectral (FIG. 32A) and spatial (FIG. 32B) support of an intermediate image in the frame of the RP input image. Spectral (FIG. 32C) and spatial (FIG. 32D) support of the intermediate image after transformation to baseband. Spectral (FIG. 32E) and spatial (FIG. 32F) support of the intermediate image after the additional z-f shear that results in a smaller z-extent and therefore allows for tighter cropping.
Figure 32B:
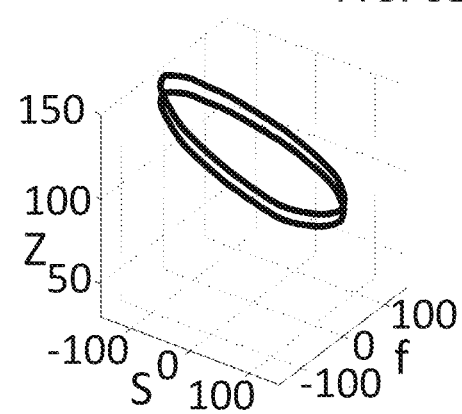
Figure 32C:
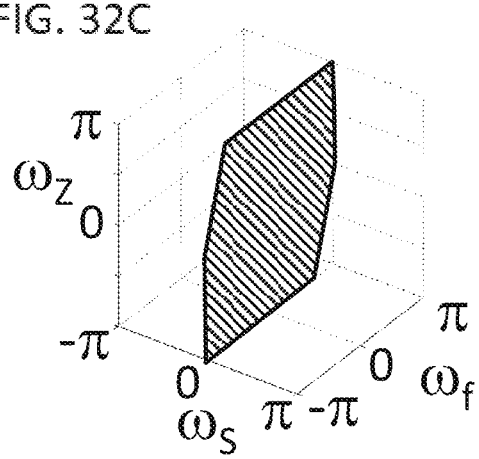
Figure 32D:
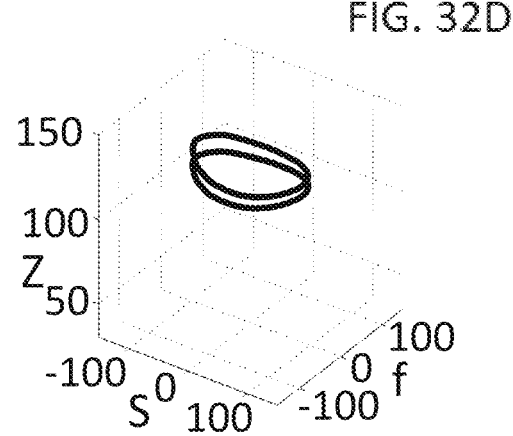
Figure 32E:
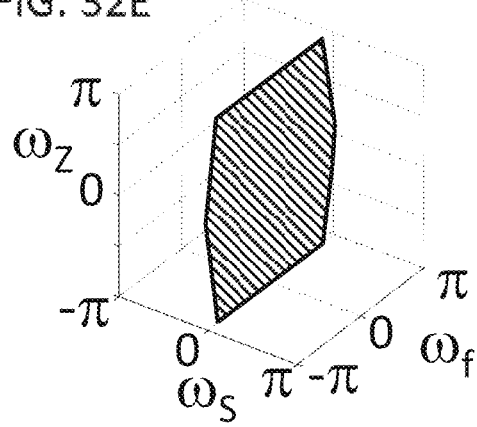
Figure 32F:
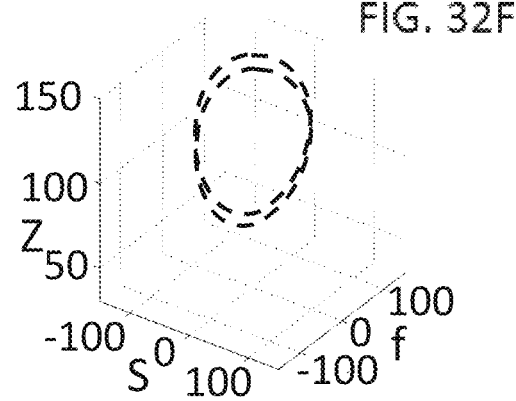
FIG. 32G Side view of the containing volumes of the intermediate image after the two transformations that show how the additional z-f transformation results in a reduction in the z-extent and therefore allows for tighter cropping.
Figure 32G:
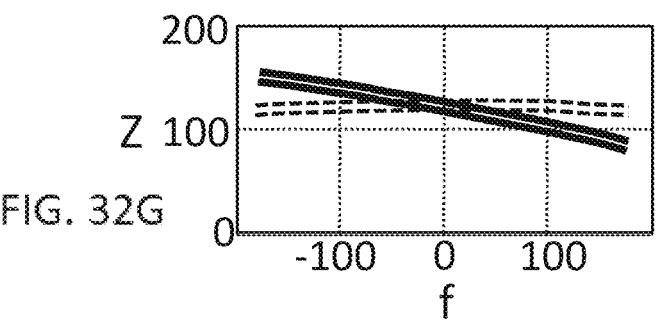

As shown in FIGS. 32A-32E, the additional z-f shear reduces the z-extent, without affecting the bandwidth requirements. The top most row (FIGS. 32A-B)) shows the spectral support (A) and spatial support (B) of a particular intermediate in the frame of the input image. After a transformation to baseband (a sequence of two shears as specified in FIG. 27B), the spectral support (FIG. 32C) has a narrow bandwidth along $\omega_s$, as desired, but the spatial support (FIG. 32D) does not have a limited enough extent in z. In order to achieve a limited extent in z, an additional shear (in z-f) can be applied to the image. This additional shear preserves the low $\omega_s$ bandwidth (FIG. 32E) but also reduces the z spatial extent (FIG. 32F). The reduction in z extent is more clearly seen in FIG. 32G.

The case shown in FIGS. 32A-32E is the worst-case (θ, ξ) which had a 7× tightness-ratio previously. With the additional z-f shear the tightness ratio reduces to 1.3×

Since the additional z-f shear will be implemented with 1D interpolation along the $\omega_f$ coordinate. We can use spline FIR filtering (in the Fourier domain) to perform this. If a shear such as this were applied at every level in the decomposition tree there would be a cascade of interpolations along the $\omega_f$ axis, one at every level. Since filtering in one domain is equivalent to multiplication by a window in the dual domain, this cascade of interpolations would be equivalent to a cascade of multiplications by a window along the f axis. This can be compensated by multiplying by the appropriate space domain window along f after the final IFFT.

2. Fourier-Space-Space Domain

If we were operating fully in the space domain (i.e. space-space-space), we could crop the image volume arbitrarily for any (f, s)-column. But because we are operating in Fourier-space-space we are constrained to crop all the columns that share the same s coordinate exactly the same, since the fast coordinate is in the Fourier domain. Unfortunately this constraint seems to limit the tightness of the potential cropping. For the same bad case with the 7× tightness-ratio previously, the additional z-s shear only reduces the tightness ratio to 5.4×. Fortunately, as explained below, there is a solution to this problem, which is to make the top level of the decomposition hierarchy operate in the fully spatial domain (space-space-space).

The images for which the cropping is not tight are those with large θ and ξ. i.e. cells in the θ-ξ plane for which |θ+ξ|>15°. Transforming these images to baseband involves the use of large shears along the fast and z coordinate directions. But the large shearing distorts the containing volumes of those cells in such a way that points that share the same s coordinate had greatly differing z-extents causing the z cropping to be inefficient.

So a solution to this is to avoid the need to use such large shears. We modify the top level in decomposition stage to operate in the fully spatial (space-space-space) domain, rather than the Fourier-space-space domain. Operating in the fully spatial domain frees us from using shears and allows the use of full 3D rotations. Rotations unlike shears allow for the Fourier spectrum of interest to be rotated to baseband without causing the containing volume to be distorted in a manner that prevents tight cropping.

One strategy is to partition the whole θ-ξ plane into identically-shaped diamond cells, each with a full θ range of 30°. At the top level we perform a separable 3D rotation of the input image that effectively centers each diamond at (θ=0, ξ=0). We then decimate along the slow direction and perform a Fourier transform along the fast direction to transform into the Fourier-space-space domain. In the lower decomposition levels we operate in the Fourier-space-space domain as previously suggested.

2.3.8 Kernel Stage

As mentioned in Sec 2.3.1 item 1(c) the kernel-stage of the wide-cone-beam method is very similar to the narrow-cone-beam method (Sec 2.2.2). Here too rays are synthesized from the kernel-stage input image by a two-part resampling operation (fast-direction and z-direction) followed by summation along the slow-direction and weighting. Here too the coordinates of the resampling are computed by transforming the ray from the real-world coordinate system to that of the kernel-stage input image.

This transformation is computed by accumulating all the parent-to-child transformations from the root of the decomposition tree, i.e. the input image of the RP operator, to the leaf, i.e. the kernel-stage input image.

The whole operation can be summarized by the following equation:

$$P_d[m_\beta, m_\upsilon, m_\alpha] = w_{\beta,\upsilon,\alpha} \sum_{m_s} I^d_{L,n_{\beta,\upsilon,\alpha}}[h_f^{\beta,\upsilon,\alpha}[m_s], m_s, h_z^{\beta,\upsilon,\alpha}[m_s]] \quad (82)$$

Here $n_{\beta,\upsilon,\alpha}$ denotes the mapping of a ray with conebeam parameters ($\beta$, $\upsilon$, $\alpha$) to a particular kernel-stage image as explained in Section 2.3.2. As explained in Section 2.2.2, $h_f$ and $h_z$ are the parameterizations of the 3D line onto which the interpolation is performed which allows for a separable implementation. $w_{\beta,\upsilon,\alpha}$ is a scaling factor that might be necessary to compensate for the sparse sample spacing of kernel-stage image.

2.3.9 Algorithm Outline

Figure 33:
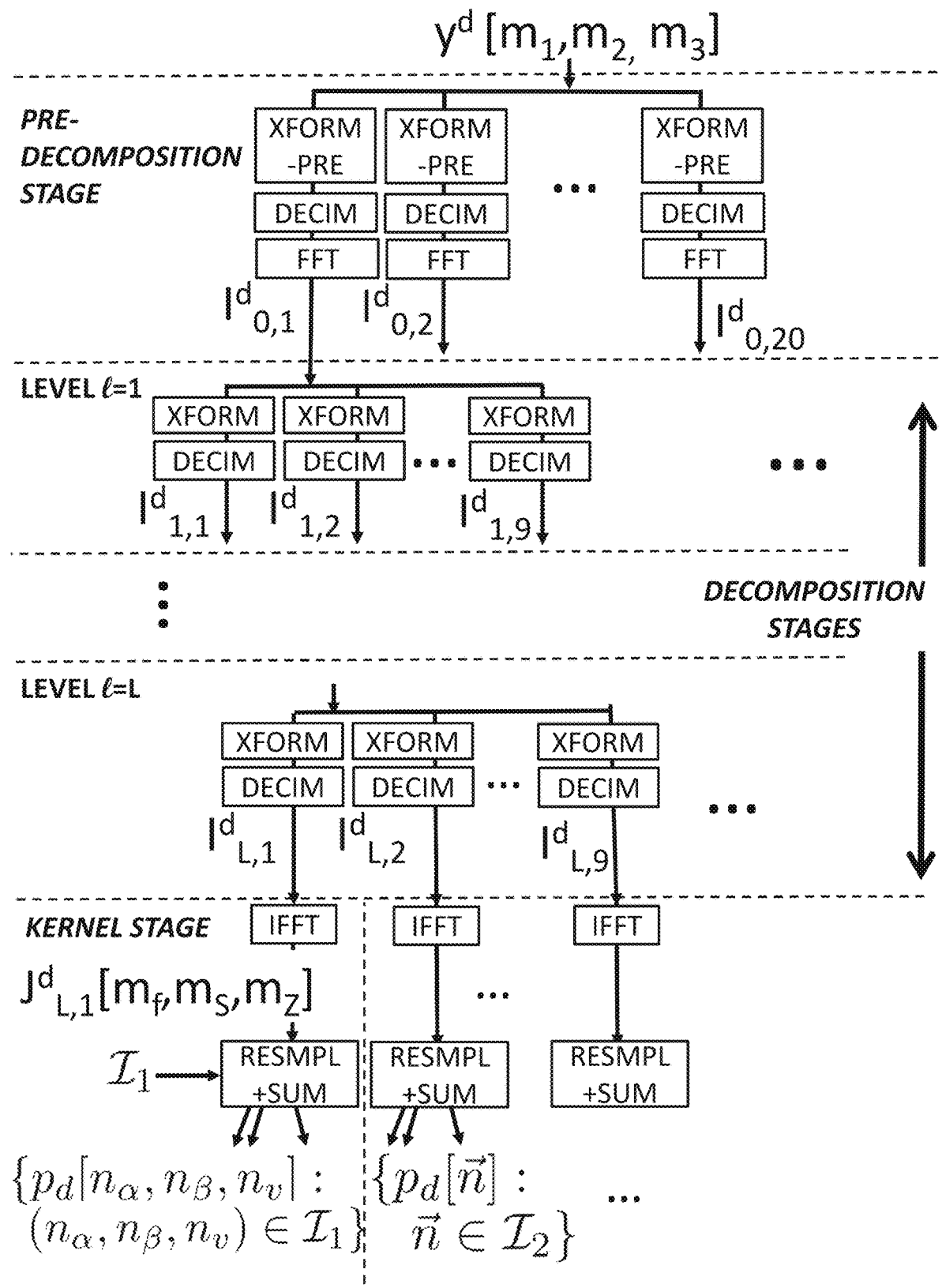
FIG. 33 is a block diagram of DIA reprojection algorithm for wide cone-angle geometries as explained in Section 2.3.9. The input is the 3D image volume $y^d$, at the top of the block-diagram, and the output is the 3D projections volume $p_d$ at the bottom of the block-diagram.

Putting together the previously described components we present an outline of the complete wide-cone RP method. The implementation is slightly different when operating in the Fourier-space-Fourier (FSF) domain or Fourier-space-space (FSS) domain. The block diagram for the FSS-domain method is shown in FIG. 33. This block diagram is very similar to the block-diagram for the narrow-cone-angle algorithm. The input 3D image volume $y^d$ is at the top of the block-diagram and the output 3D projection volume P is at the bottom of the block-diagram.

Pre-decomposition stage: The input image $y^d$ has eighteen children (ref FIG. 28C). Each branch is first subjected to an image transformation denoted by xform. The transformation first involves a fully spatial 3D rotation as prescribed in Section 2.3.7.2. Each branch corresponds to a rotation by the following eighteen 3D angles (azimuthal,elevation):

{(−30°,0°),(0°,0°), . . . ,(+120°,°)}∪{(−15°,+150°),(+15°,15°), . . . ,(+135°,15°)}∪{(−15°,−15°),(+15°,−15°), . . . ,(+135°,−15°)}

The rotation can be followed by an upsampling along f, z or s, for improved accuracy (Section 1.3.2), which can be incorporated into the separable rotation at no extra cost. A cropping along z can be incorporated to exploit spatial locality (Section 2.3.4). This sequence of three operations that together makes up the image transformation denoted by xform, is followed by a decimation along the slow coordinate axis, as detailed in Section 1.2.4.B.2, and denoted here by Decim. The spatial transformation is followed by an FFT along f to transform into the FSS domain. In the case of FSF there is an additional FFT in z to transform into the FSF domain. • Decomposition stage: Every parent has 9 children. Each branch is first subject to an image transformation denoted by xform. This transformation is an f-s shear followed by z-s shear and cropping along z.

In the case of FSS this is a voxel-wise complex multiplication (Section 2.3.6.2(a)), followed by 1D interpolation and cropping along z (Section 2.3.6.2(c)).

In the case of FSF this is a single voxel-wise complex multiplication (Section 2.3.6.1(a)) and a decimation along $\omega_z$ for z-cropping (Section 2.3.6.1(c)). Prior to z-cropping an optional z-f shear, implemented by 1D interpolation along $\omega_f$, can be applied to allow for tighter cropping (Section 2.3.7.1).

Finally decimation, denoted by Decim, is applied along the s coordinate direction.

Kernel Stage: Just as in the narrow-cone case, an IFFT along f is performed to return the image to the fully spatial-domain. In the case of FSF an additional IFFT along z is performed. The set of indices $\mathcal{I}_n$ of output rays to be synthesized from a given kernel-stage image $I_{L,n}^d$ are determined from a lookup table that has previously been computed similar to the 2.5D case (Section 2.2.2(a)).

Then the set of output rays are computed by iterating through the set of indices $\mathcal{I}_n$ and interpolating from the 3D image volume $J_{L,n}^d$ onto a 1D signal and summing along the slow coordinate direction (ref Section 2.2.2 and FIG. 20) to compute the rays of the output projections. For typical CT geometries this interpolation can be done in a separable manner. This last operation is indicated by the block labeled Resmpl+sum.

The specific embodiment we present here is not necessarily the most efficient on every computer architecture. There are a wide variety of modifications of this outline that could result in more efficient implementations. These include, but are not limited to, the following.

Using a decomposition hierarchy that uses a different radix (parent to child branching factor) or different branching factors in different nodes.

Partitioning the θ-ξ domain differently to result in different decomposition hierarchies Using a different mix of the three domains of interest i.e. fully spatial, FSS and FSF which result in a different ordering of operations.

Using different upsampling factors in different nodes of the hierarchy.

Splitting the interpolations into an IIR and FIR part and lifting the IIR part to a different node of the decomposition tree.

Incorporating additional image transformations or skipping some of the image transformation operations described above. For example replacing a set of image transformations with a theoretically less optimal set of image transformations that is in practice more computationally efficient.

Incorporating compensating filters in the Fourier or space domains to achieve higher accuracy. For example the spline interpolations used in the decomposition stages method could have a cumulative effect of suppressing higher frequencies. To compensate for this a filter that boosts higher frequencies can be applied in the kernel stage by a pixel-wise multiplication in hybrid space-Fourier domain prior to the IFFT in the Kernel-stage.

2.4 Backprojection

Figure 34:
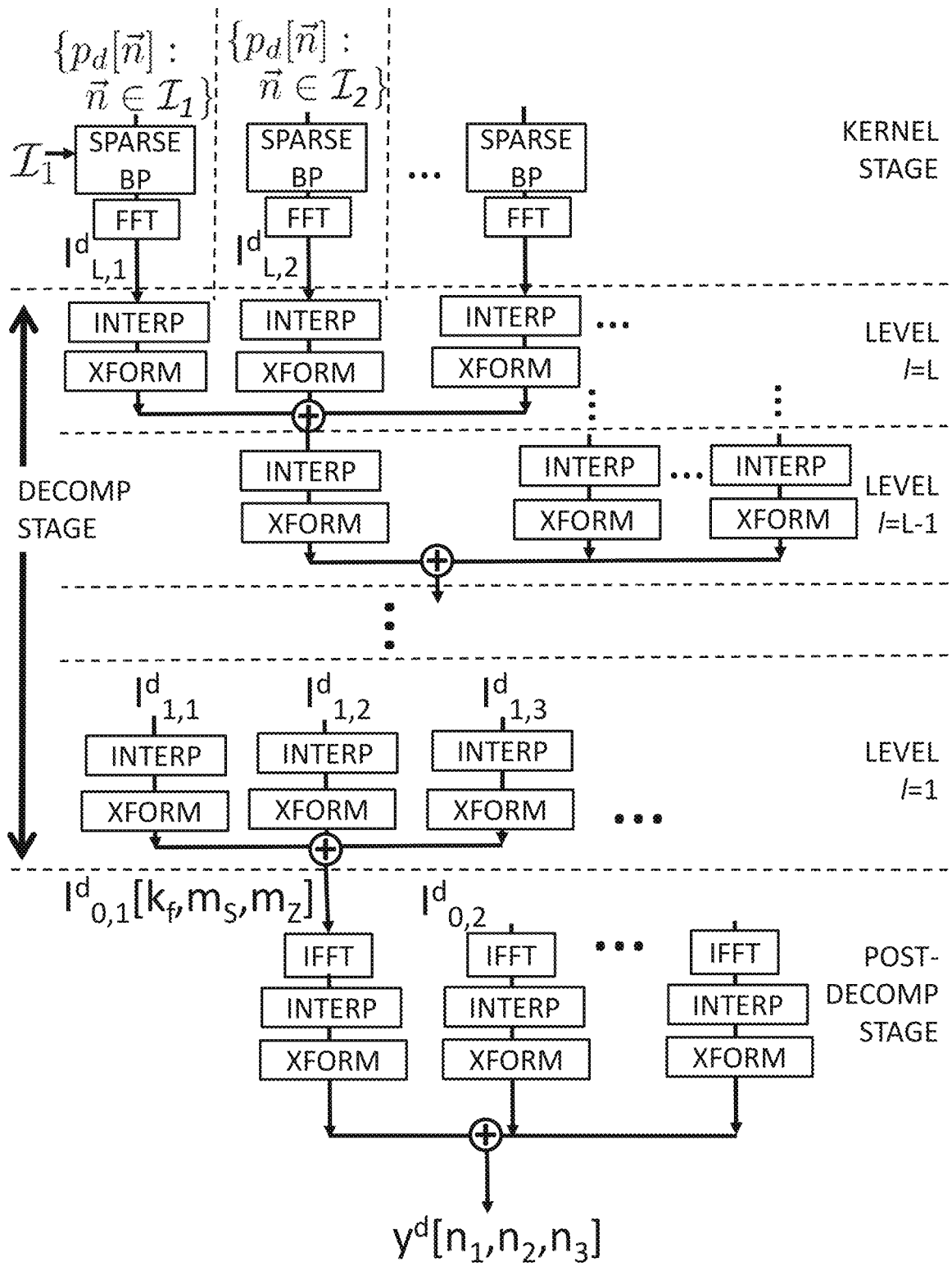
FIG. 34 is a block diagram of DIA backprojection algorithm for wide cone-angle geometries as explained in Section 2.4. The input is the 3D projections volume $p_d$ at the top of the block-diagram and the output is the 3D image volume $y^d$, at the bottom of the block-diagram.

As explained in Section 1.1.1 backprojection is the mathematical adjoint operation to reprojection (Chap 2.7 of [9]). The block diagram of the DIA backprojection operator for the wide cone-angle geometry is as shown in FIG. 34 and more details are given in Sections 2.4.1 to 2.4.3.

The input to the backprojection operator is a projection volume P, shown at the top of the block-diagram, and the output is an image volume $y^d$, shown at the bottom of the block-diagram. The backprojection block diagram is constructed by the operation of flow graph transposition (p. 410 of [4]): reversing the flow of the reprojection block diagram; replacing branches with summation junctions and vice versa, and replacing the individual blocks with their respective mathematical adjoints. So the following description is a reversal of that presented in 2.3.9. And the constituent operators here are adjoints of the operators described there.

2.4.1 Kernel Stage

The input to backprojection is the 3D volume of projections. The mapping of kernel-stage image $I_{L,n}^d$ to the individual rays indices ($m_\beta$, $m_\alpha$, $m_\nu$) is determined by looking up a precomputed lookup table $\mathcal{I}_n$ similarly to that described in Section 2.2.2(a). For the wide cone-angle case the partitioning of θ-ξ looks like FIGS. 28A-28C and for the narrow cone-angle case this partition looks like FIGS. 24A-24B.

The kernel-stage is shown at the top of FIG. 34. Different subsets of the projection volume are used as input to different branches of the kernel-stage. The first operation is denoted by the block labeled sparseBP. This refers to a backprojection onto an image grid that is sparsely sampled along the slow coordinate; specifically a sheared Cartesian grid as explained in Section 2.3.2(e). sparseBP is an exact adjoint to the block labeled Resmpl+sum in FIG. 33 (and defined in (82)).

Before we describe the adjoint operations, let us first explicitly restate the forward operations in the kernel-stage of the reprojection method. There is a sequence of three operations: fast-direction interpolation, z-direction interpolation, and slow direction summation and weighting. The fast-direction interpolation operates on a kernel-stage input image $I_{L,n}^d[m_f, m_s, m_z]$ and outputs $g_1[m_{\beta,\alpha}, m_s, m_z]$. Here the first coordinate of the input image ($m_f$, the fast coordinate index) is replaced in the output image by an index that runs over all the distinct pairs of (β, α) that are mapped to this kernel image $I_{L,n}$. The z-direction interpolation operates on $g_1$ and outputs $g_2[m_{\beta,\alpha}, m_s, m_\nu]$. Here the last coordinate of the input image (nm, the z coordinate index) is replaced in the output image by $m_\nu$, the detector row index.

Combining the separable interpolation and summation equations, (79)-(82), and, the spline interpolation equations (5), we get:

$$g_1[m_{\beta,\alpha}, m_s, m_z] \stackrel{(79)}{=}$$

$$I_{L,n}^d\left[h_f^{\beta,\alpha}[m_s], m_s, m_z\right] \stackrel{(5)}{=} \sum_{m_f} I_{L,n}^d[m_f, m_s, m_z]\psi\!\left(h_f^{\beta,\alpha}[m_s] - m_f\right) \text{ [fast]}$$

$$g_2[m_{\beta,\alpha}, m_s, m_\nu] \stackrel{(80)}{=} g_1[m_{\beta,\alpha}, m_s, h_z^{\beta,\alpha,\nu}[m_s]] \stackrel{(5)}{=}$$

$$\sum_{m_z} g_1[m_{\beta,\alpha}, m_s, m_z]\psi(h_z^{\beta,\alpha,\nu}[m_s] - m_z) \text{ [z]}$$

$$P_d[m_\beta, m_\alpha, m_\nu] \stackrel{(82)}{=} w_{\beta,\nu,\alpha} \sum_{m_s} g_2[m_{\beta,\alpha}, m_s, m_\nu] \text{ [sum, weight]}$$

The adjoints of these operations are performed in reverse order, so reversing input and output:

$$g_2[m_{\beta,\alpha}, m_s, m_\nu] = w_{\beta,\nu,\alpha} P_d[m_\beta, m_\alpha, m_\nu] \text{ [sum, weight]} \quad (83)$$

$$g_1[m_{\beta,\alpha}, m_s, m_z] = \sum_{m_\nu} g_2[m_{\beta,\alpha}, m_s, m_\nu]\psi(h_z^{\beta,\alpha,\nu}[m_s] - m_z) \text{ [z]} \quad (84)$$

$$I_{L,n}^d[m_f, m_s, m_z] = \sum_{m_{\beta,\alpha}} g_1[m_{\beta,\alpha}, m_s, m_z]\psi\!\left(h_f^{\beta,\alpha}[m_s] - m_f\right) \text{ [fast]} \quad (85)$$

The operations in (84)-(85) are known as anterpolation i.e. the adjoint of interpolation. While here we have described a separable implementation of the forward and adjoint operations, the kernel could be implemented in a non-separable way. The backprojection weights $w_{\beta,\nu,\alpha}$ are chosen to be equal to the reprojection weights.

After the sparse BP an FFT is performed along the fast coordinate direction to transform the image from the spatial domain to the hybrid space-Fourier domain. If the FFS domain is used an additional FFT is performed along the z coordinate direction.

2.4.2 Decomposition Stage

In every node of the decomposition stage in FIG. 34 a certain number of children image are combined to form a parent image. Each child image is first subject to the adjoint of decimation i.e. interpolation, denoted by the block labeled Interp. This is a 1D operation along the slow coordinate in which the sample rate is increased by a factor of D Following the interpolation an image transformation is performed on the image. This is denoted by the block labeled xform. This image transformation is the adjoint of the corresponding transform in the reprojection method so the adjoints of each constituent operation are performed in reverse order. The adjoint of the voxel-wise complex multiplication is a complex multiplication by the complex conjugate of the original multiplicative factor, and the adjoint of interpolation is anterpolation.

So in the hybrid domain where the forward operater is an f-s shear and uses a voxel-wise complex multiplication by $e^{j\alpha m_s 2\pi k_f/N_f}$, as described in (81), the corresponding node of the adjoint operator is a voxel-wise complex multiplication of its complex conjugate i.e., $e^{-j\alpha m_s 2\pi k_f/N_f}$. And in the case where the forward operator is a z-s shear and uses a voxel-wise complex multiplication by $e^{j\alpha m_s 2\pi k_z/N_z}$ the corresponding node of the adjoint operator would use a voxel-wise complex multiplication by its complex conjugate i.e., $e^{-j\alpha m_s 2\pi k_z/N_z}$.

On the other hand, in the space domain, where the forward operator is an f-s shear and the expression for the forward filtering operator is (extending (27) from 2D to 3D): $g_2[\bullet, m_s, m_z] = g_1[\bullet, m_s, m_z] * h_d^{\alpha m_s}$ where $h_d^\tau[m] \triangleq \psi(m+\tau)$ represents a delay by τ using the basis function ψ, then the corresponding node of the adjoint operator performs the negative delay i.e. $\tilde{g}_1[\bullet, m_s, m_z] = \tilde{g}_2[\bullet, m_s, m_z] * h_d^{-\alpha m_s}$. In the case where the forward operator is a z-s shear and the expression for the forward filtering operator is $g_1[m_s, m_z, \bullet] = g_1[m_s, m_z, \bullet] * h_d^{\alpha m_s}$, then the corresponding node of the adjoint operator will perform the negative delay i.e. $\tilde{g}_1[m_s, m_z, \bullet] = \tilde{g}_2[m_s, m_z, \bullet] * h_d^{-\alpha m_s}$.

Following the image transformation the children images are added together to produce the parent image.

2.4.3 Post-Decomposition Stage

The post-decomposition stage, shown at the bottom of FIG. 34, is the adjoint to the pre-decomposition stage described in Section 2.3.9. First an IFFT along the fast coordinate is performed to return the image from the hybrid space-Fourier domain to the space domain. In the case of FFS an additional IFFT is performed along the z coordinate.

The block labeled Interp is the adjoint to the decimation block in the pre-decomposition stage of FIG. 33. If the decimation in the reprojection block diagram is a decimation by D along the slow direction as specified in (7), then the corresponding block of the backprojection block diagram is an interpolation along the slow direction by an integer factor D as specified by (6). The block labeled xform is an image transformation which is the adjoint of the image transformation indicated by the block xform in the pre-decomposition stage of FIG. 33.

2.4.4 Narrow Cone-Angle Backprojection

The description in Sections 2.4.1-2.4.3 and FIG. 34 refer to wide cone-angle backprojection. The block diagrams for the narrow cone-angle geometry (FIGS. 35 and 36) are simplifications of FIG. 34.

Figure 35:
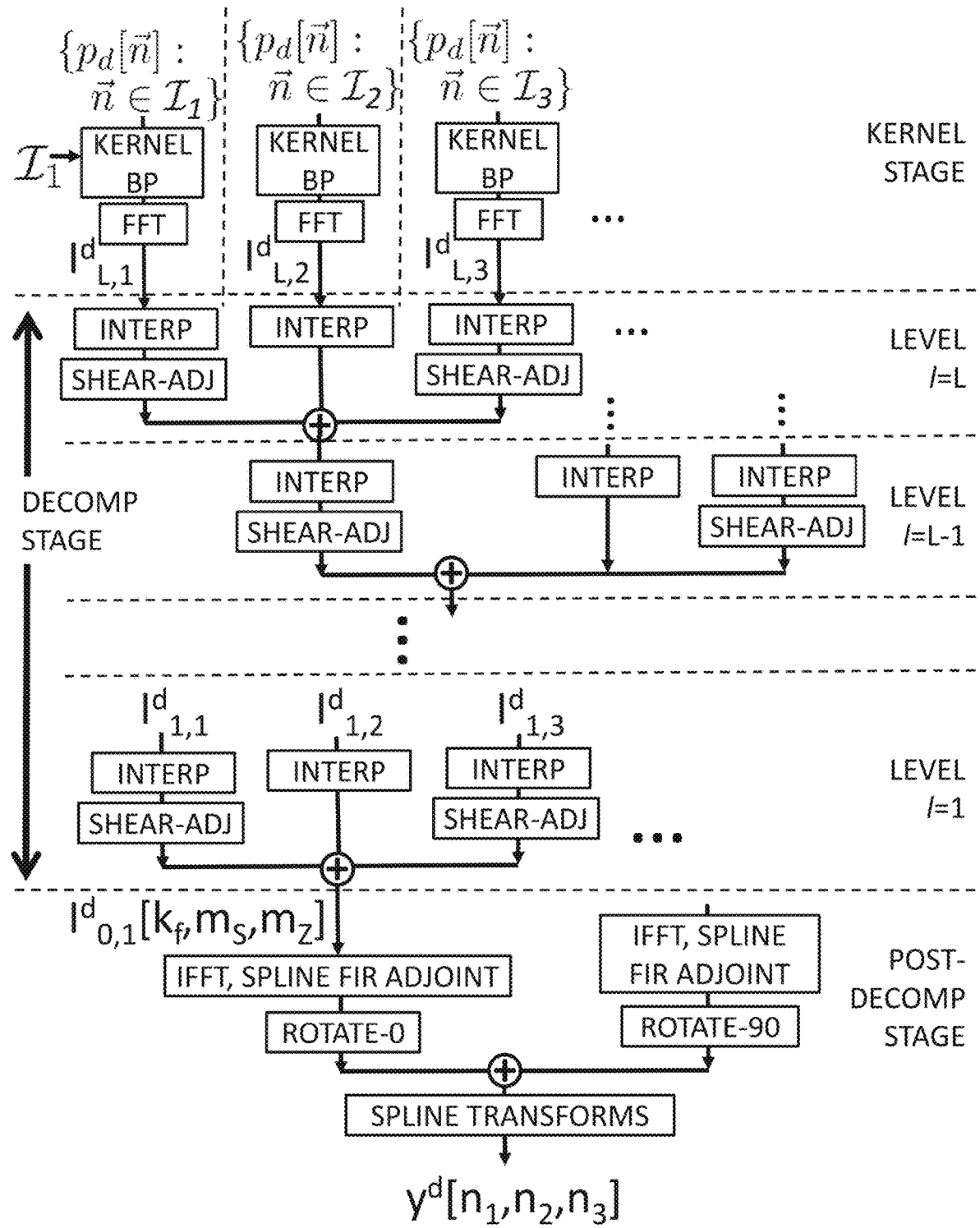
FIG. 35 is a block diagram of DIA backprojection algorithm for narrow cone-angle geometry that operates in the hybrid space-Fourier domain.

In FIG. 35 we show narrow cone-angle backprojection in the hybrid domain. It is the adjoint of FIG. 21. It is similar to the wide cone-angle blockdiagram and simpler in the following ways. In the kernel stage the blocks labelled kernel BP are similar to the blocks labeled sparse BP in FIG. 34. The narrow cone-angle implementation is similar to the wide cone-angle implementation, and simpler in that the mapping of rays to kernel-stage image depends only on θ and not ξ. In the decomposition stages the narrow cone-angle implementation is simpler than the wide cone-angle implementation in that the z-slices of the intermediate images are operated on independently of each other. In the preferred embodiment, in the decomposition stages, the branching factor is exactly 3 in the narrow cone-angle case and typically 9 in the wide cone-angle case. And in the post-decomposition stage the branching factor is exactly two in the narrow-cone-angle case.

Figure 36:
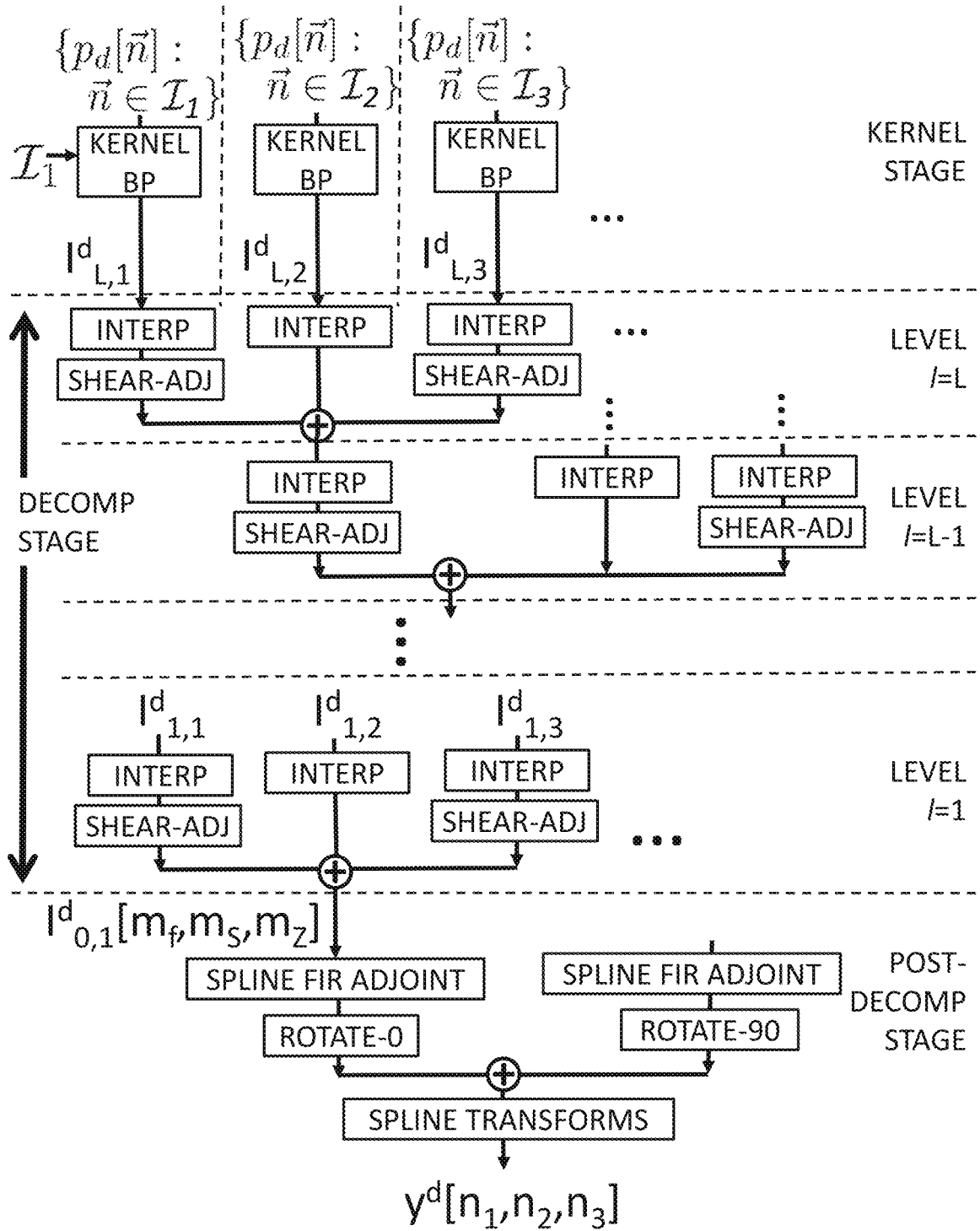
FIG. 36 is a block diagram of DIA backprojection algorithm for narrow cone-angle geometry that operates fully in the space domain.

FIG. 36 is the version of narrow cone-angle backprojection that operates purely in the space domain. It is almost identical to FIG. 35 except for the following differences. The FFT and IFFT do not exist in FIG. 36 as there is no need to transform intermediate images between the hybrid space-Fourier and space domains. Furthermore the implementation of the blocks labeled "shear-adj" in the space-domain (FIG. 36) and hybrid-domain (FIG. 35) versions are different. While in the latter it is implemented by a pixel-wise multiplication in the former it is implemented by a shift-invariant 1D filtering operation.

2.4.5 Other Variations of Backprojection

There are typically two contexts in which backprojection is used:
1. To perform a direct, non-iterative reconstruction of an image from tomographic projections. This typically involves some kind of filtering and preprocessing of the projections followed by a backprojection of those filtered projections to produce the reconstructed image. We call this the FBP case.
2. In conjunction with a reprojection operator such as in iterative reconstruction where backprojection and reprojection operators are applied multiple times. In this case it is often preferred that the backprojection and reprojection operators are close-to-exact mathematical adjoints of each other. We call this the RP-adjoint case The description in Sections 2.4.1-2.4.3 refers to the RP-adjoint case. In the FBP case the operations remain almost identical but since there is no adjointness constraint, the types of interpolators used can differ. Specifically the anterpolation operations (84)(85) are replaced by normal 3D backprojection interpolation operations for the appropriate geometry (Chapter 3.6 of [2]). There is an outer loop over the subset of views that interact with the kernel-stage image (i.e. the view-indices in the set $\mathcal{I}_n$). The grid of the kernel-stage input image, sparsely sampled along the slow direction, is transformed to physical space by inverting the transformation derived in Sections 1.3.6(b)-(c), in order to compute the interpolation coordinates and weights.

Another difference is that the reprojection weights $w_{\beta,\alpha,v}$ in (83) are combined with any weighting related to the specific backprojection method or geometry. Examples of the latter weights are the Feldkamp-Davis-Kress weights (Chapter 3.6 of [2]) for circular cone beam geometries and Katsevich weights [6] for helical cone-beam geometries. These two kinds of weights can typically be combined by taking their product.

3 Other Variations: Improved Physical Modeling

Real X-ray systems are better modeled with finite, rather than infinitesmal, detector and source widths. The previously described RP and BP methods are easily modified to accommodate this. There are two ways to model the finite detector width—the beamlet approach or the integrating-detector approach. The finite source width, a.k.a finite focal spot, can be modeled using the beamlet approach. The methods can be mixed and matched. All approaches require merely a modification of the kernel-stage resampling operations.

3.1 Beamlet Modeling Along Detector Channel Coordinate u

Figure 37A:
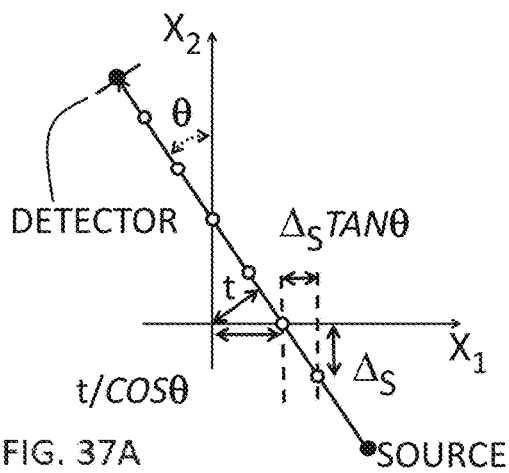
FIGS. 37A-37F illustrate the modeling of beamlets.

As shown in FIG. 37A, consider the reprojection of a 2D image along a single ray. This ray has a fan-beam parameterization of view-angle β and fan-angle α, and therefore a parallel-beam parameterization (θ, t), computed by (44).

Recall from Section 1.3.6 and FIG. 14 (c-d) that in the fan-beam geometry, in the kernel stage, every ray is computed by interpolating from the 2D kernel-stage input image onto a set of samples that lie on the ray, in the frame of the kernel-stage input image, and then summing those sampled values. The location of these samples in the frame of the kernel-stage input image is $\{(m_f = h^{\beta,\alpha}[m_s], m_s): m_s \in \mathbb{Z}\}$ where $h^{\beta,\alpha}[m_s]$ is specified by (57)-(60). Sections 1.3.6(b)-(c) derived the transformation of these samples from the frame of the input image $y(x_1, x_2)$ in physical space to that of the kernel-stage input image. So the location of these samples in physical space is computed by inverting the transformation derived in Sections 1.3.6(b)-(c). FIG. 37A depicts this ray and, by circles, the location of the samples along it in physical space The ray connects the source to an infinitesmally small detector. For this particular ray the fast direction is $x_1$ and the slow direction is $x_2$. The slow direction sample spacing is denoted by $\Delta_s$. Note that the ray intersects the $x_1$ axis at t/cos θ and the spacing along $x_1$ of the sample points along the ray is $\Delta_s$ tan θ. So the physical coordinates of the set of sample points in the ray are $\{(m_s \Delta_s \tan \theta, m_s \Delta_s): m_s = -N_s, -N_s+1, \ldots, +N_s\}$.

3.1.1 Finite Detector Width

Figure 37B:
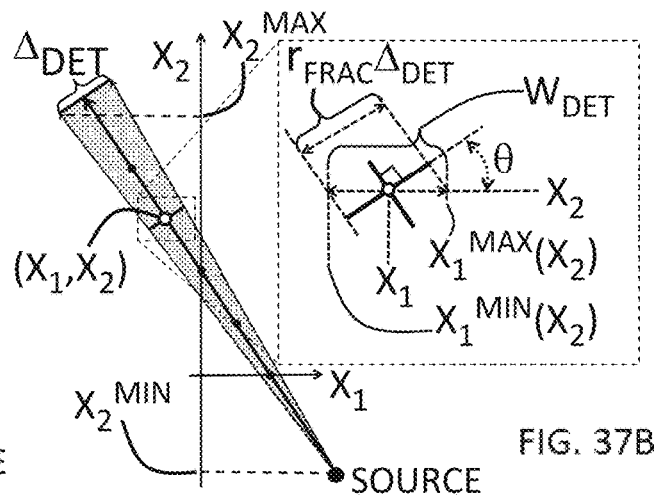

In order to model the finite detector width we want to perform the summation not along a set of samples along an infinitesmally thin line but rather incorporate the finiteness of the detector width. FIG. 37B illustrates the geometry of the finite detector width. Note that unlike in FIG. 37A the detector has a finite detector width of $\Delta_{DET}$. Rather than computing the 1D integral along the line from the source to an infinitesmally small detector, we want to compute the 2D integral in the cross-hatched triangular region that connects the source and the edges of the detector and divide by $\Delta_{DET}$.

Suppose we fix the location of the source and detector then this scaled 2D integral is as follows:

$$\frac{1}{\Delta_{DET}} \int_{x_2 = x_2^{MIN}}^{x_2^{MAX}} \int_{x_1 = x_1^{MIN}(x_2)}^{x_1 = x_1^{MAX}(x_2)} f(x_1, x_2) dx_1 dx_2 \quad (86)$$

The limits of the outer integral $x_2^{MIN}$ and $x_2^{MAX}$ are as shown in FIG. 37B, and the limits of the inner integral for a fixed $x_2$, i.e. $x_1^{MIN}(x_2)$ and $x_1^{MAX}(x_2)$ is shown in the inset image. Here we are making the slightly simplifying assumption that the object is zero close to the detector so we do not have to account for triangular region near the detector that is left out of the integral. Let us refer to $x_1^{MAX}(x_2) - x_1^{MIN}(x_2)$ as the integration width.

Figure 37C:
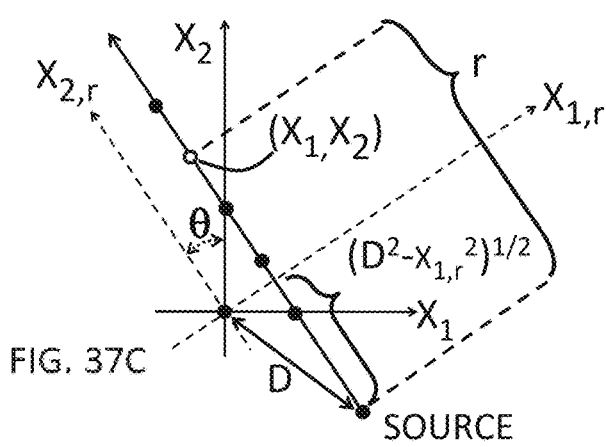

FIGS. 37B-C shows how $x_1^{MIN}(x_2)$ and $x_1^{MAX}(x_2)$ are computed. In order to compute them we define r, the distance from the point $(x_1, x_2)$ to the source, as shown in FIG. 37C. For a point $(x_1, x_2)$ that lies on a ray whose parallel-beam parameters are $(\theta, t)$, the distance to the source is computed by first rotating the frame of reference by $\theta$. Let the coordinates of the point in the rotated frame be $(x_{1,r}, x_{2,r})$ where $x_{1,r}=x_1 \cos\theta + x_2 \sin\theta$ and $x_{2,r}=-x_1 \sin\theta + x_2 \cos\theta$. Now it is easy to see that the distance to the source is $r=x_{2,r}+\sqrt{D^2-x_{1,r}^2}$. Let $d_{SD}$ be the distance from the source to the detector along the ray that passes through $(x_1, x_2)$.

Going back to FIG. 37B, let $r_{FRAC}=r/d_{SD}$ be the fraction of the distance of the point $(x_1, x_2)$ from the source to the detector. Then it is easy to see that the width of the triangle at the point $(x_1, x_2)$ in FIG. 37B, in the direction perpendicular to the ray, is $r_{FRAC}\Delta_{DET}$. Consequently the width of the shaded triangle along the x coordinate is $r_{FRAC}\Delta_{DET}/\cos\theta$ since $\theta$ is the angle between the ray and the vertical $x_2$ axis.

Defining $w_{DET}(x_2) \triangleq r_{FRAC}\Delta_{DET}/\cos\theta$, we obtain $x_1^{MIN}(x_2)=x_1-w_{DET}(x_2)/2$ and $x_1^{MAX}(x_2)=x_1+w_{DET}(x_2)/2$ Recall that in the case of the infinitesimal detector width, the kernel-stage resampling operation is to interpolate from the kernel-stage input image $I^d$ onto samples that lie on the ray and whose coordinates depend on the fan beam parameters $(\beta, \alpha)$ as specified in (43): $g_{\beta,\alpha}^d[m_s]=I^d[h^{\beta,\alpha}[m_s], m_s]$. The equivalent expression for the finite-detector width case is as follows:

$$g_{\beta,\alpha}^d[m_s] = \int_{x_f=h^{\beta,\alpha}[m_s]-w_{DET}(\beta,\alpha,m_s)/2}^{x_f=h^{\beta,\alpha}[m_s]+w_{DET}(\beta,\alpha,m_s)/2} I^d[x_f, m_s] dx_f \quad (87)$$

Here rather than simply evaluate the interpolation at a single sample, integration along $x_f$ over a width of $w_{DET}$ is performed. Note that in the expression $I^d[x_f, m_s]$ the first coordinate is a continuous variable and so we are using the interpolation shorthand along $x_f$. Each output sample has a different integration width i.e $w_{DET}(\beta, \alpha, m_s)$ is a function of the view-angle, fan-angle and slow coordinate. When combined with the subsequent summation over $m_s$, this corresponds to approximating the double integral over the shaded triangle in FIG. 37B by the sum of the integrals (87) over strips indexed by $m_s$. We call these inner strip integrals.

One way to discretize the integral along $x_f$ in (87) is to interpolate onto multiple adjacent points (which we call "beamlet samples") within the integration width, and perform a weighted average over them, such as prescribed by the Gaussian quadrature integral approximation rule [5]:

$$g_{\beta,\alpha}^d[m_s] = \sum_{k=1}^{K} \zeta_k I^d[h^{\beta,\alpha}[m_s] + \delta_k w_{DET}(\beta, \alpha, m_s), m_s] \quad (88)$$

Here the offsets $\{\delta_k\}$ and weights $\{\zeta_k\}$ depend on the order of the Gaussian quadrature approximation. For example for the third order approximation, K=5 and the offsets $\{\delta_k\}$ and weights $\{\zeta_k\}$ are $0.5 \times [-0.90618, -0.538469, 0, 0.538469, 0.90618]$ and $[0.236927, 0.478629, 0.568889, 0.478629, 0.236927]$ respectively.

Figure 37D:
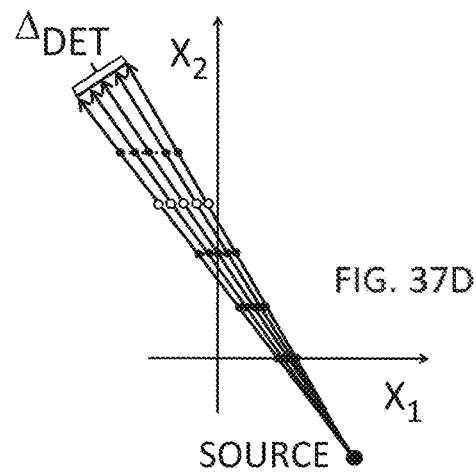

When these multiple sets of adjacent beamlet samples are transformed from the coordinate system of the kernel-stage input image to the coordinate system of the RP input image, they are as shown by the black dots in FIG. 37D. Rather than one set of samples that lie on a ray as shown in FIG. 14C, we interpolate onto a set of K lines that diverge from the point-source to a single finite-width detector. The points at which the lines intersect the detector are known as detectorlets. The number and location of the detectorlets depends on the Gaussian quadrature scheme used. And the lines themselves connecting the source to the detectorlets are known as beamlets.

If this scheme were naively implemented it would increase the cost of the kernel-stage interpolation by the factor K of the number of beamlets used. To avoid this cost increase, the weighted averaging over beamlets is integrated into the interpolation kernel. Recall the expression for the spline FIR operation (5) in the case of 1D interpolation along the fast coordinate direction of a 2D image. Let the kernel-stage input image be $I^d[m_f, m_s]$ and its spline transform along the fast coordinate direction be $\hat{I}^d[m_f, m_s]$, then the expression to evaluate the value of $I^d[x_f, m_s]$, where $x_f \in \mathbb{R}$ R is $I^d[x_f, m_s]=\Sigma_{m_f}\psi(x_f-m_f)\hat{y}^d[m_f, m_s]$. Incorporating this into (88), the equation for kernel-stage fast-direction interpolation for an infinitesmal detector width (43), we get:

$$g_{\beta,\alpha}^d[m_s] = I^d[h^{\beta,\alpha}[m_s], m_s] = \sum_{m_f} \psi(h^{\beta,\alpha}[m_s] - m_f)\hat{y}^d[m_f, m_s] \quad (89)$$

Here $\psi$ is the interpolation basis function.

The equivalent expression for the case of the finite detector width is derived by combining (5) with (88):

$$g_{\beta,\alpha}^d[m_s] = \sum_{k=1}^{K} \zeta_k I^d[h^{\beta,\alpha}[m_s] + \delta_k w_{DET}(\beta, \alpha, m_s), m_s] \quad (90)$$

$$= \sum_{k=1}^{K} \zeta_k \sum_{m_f} \psi(h^{\beta,\alpha}[m_s] + \delta_k w_{DET}(\beta, \alpha, m_s) - m_f)\hat{y}^d[m_f, m_s] \quad (91)$$

$$= \sum_{m_f} \hat{y}^d[m_f, m_s] \sum_{k=1}^{K} \zeta_k \psi(h^{\beta,\alpha}[m_s] + \delta_k w_{DET}(\beta, \alpha, m_s) - m_f) \quad (92)$$

Define a new basis function to be a function of both the output coordinate x and the integration width w as follows:

$$\hat{\psi}(x, w) = \sum_{k=1}^{K} \zeta_k \psi(x + \delta_k w) \quad (93)$$

Then (92) becomes:

$$g_{\beta,\alpha}^d[m_s] = \sum_{m_f} \hat{\psi}(h^{\beta,\alpha}[m_s] - m_f, w_{DET}(\beta, \alpha, m_s))\hat{y}^d[m_f, m_s] \quad (94)$$

Comparing (94), the interpolation formula for an extended detector, to (89), the formula for an infinitesmal detector, we see that the only change is that the original interpolation basis function $\psi$ has been replaced by a modified basis function b that is now also a function of the integration width $w_{DET}$. Both $\psi$ and $\hat{\psi}$ can be stored in look-up tables, and the support of $\hat{\psi}$ is typically only slightly longer than that of $\psi$ so the cost of performing the fast-direction interpolation only increases slightly, instead by a factor of K.

3.1.2 Finite Focal Spot

Figure 37E:
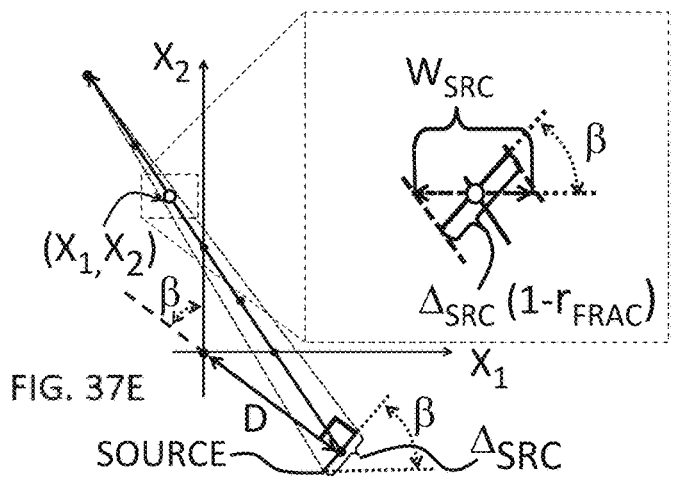

Similarly to modeling the finiteness of the detector width, the finiteness of focal spot size of the source can also be modeled. FIG. 37E depicts how the integration widths for finite focal spot modeling are computed for a finite focal spot and a single infintesmal detectorlet.

Similarly to the finite detector width case we use an approximation to compute the 2D integral in the triangle connecting the point detector and source with finite width $\Delta_{SRC}$. We do so by incorporating an integration width into the fast-direction interpolation. Just like in the finite detector width case, we approximate this 2D integral as the sum of strip integrals indexed by $m_s$. There are a couple of crucial differences with the finite detector width case: (i) The integration width of the strip integrals increases the closer the strip is to the source, and (ii) the source is assumed to be oriented perpendicular to the line from the source to iso-center (not perpendicular to the ray).

From (i) it follows that $w_{SRC}(x_1, x_2)=(1-r_{FRAC}(x_1, x_2))\Delta_{SRC}$. And from (ii) it follows that the inclination of the source is β (the fan-beam view-angle) not θ (the parallel-beam view-angle). Consequently the divisor in computing the effective integration width along the fast direction is cos(β) not cos(θ) i.e.

$$w_{SRC}(x_1,x_2)=(1-r_{FRAC}(x_1,x_2))\Delta_{SRC}/\cos(\beta) \quad (95)$$

Figure 37F:
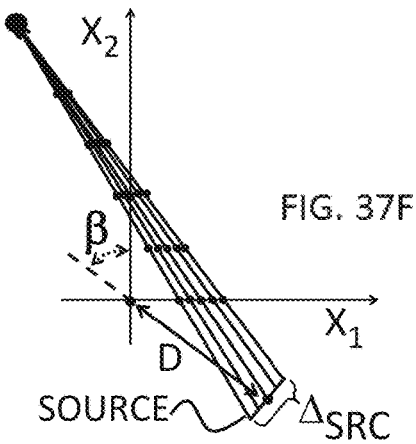

Using the beamlet method to approximate this integral then, when the beamlets are transformed to the coordinate system of the RP kernel-stage input image, they are as shown in FIG. 37F. The beamlet samples, shown by black dots, lie on lines that converge on the infinitesimally small detector from the finite-width source. The locations of the intersections of the beamlets with the source are called sourcelets. The equation for sourcelet interpolation is a straightforward modification of the detectorlets equation (94):

$$g^d_{\beta,\alpha}[m_s] = \sum_{m_f} \hat{\psi}(h^{\beta,\alpha}[m_s] - m_f, w_{SRC}(x_1(h^{\beta,\alpha}[m_s], m_s), x_2(h^{\beta,\alpha}[m_s], m_s))) \quad (96)$$

$$\hat{y}^d[m_f, m_s]$$

Here $\hat{\psi}$ is the modified basis function defined in (93), $h^{\beta,\alpha}[m_s]$ is the location of the samples along the ray as defined in (57)-(60), and $x_1(m_f, m_s)$ and $x_2(m_f, m_s)$ are the coordinates of the sample with index $(m_f, m_s)$.

Typically finite focal spot modeling is combined with finite detector width modeling. So in this case the beamlets connect each of the $K_{SRC}$ sourcelets to each of the $K_{DET}$ detectorlets and the single summation in (90) becomes a double summation over the sourcelets and detectorlets. The integration basis function is modified similarly to be a function of three variables $\hat{\psi}(x, w_{SRC}, w_{DET})$ to make the fast-direction interpolation similar to (94).

The taps of the filter used to perform the interpolation, i.e., samples of $\hat{\psi}$, can be saved in a lookup table, or computed on the fly, or some combination of the two—eg. saved in sparse lookup table in combination with a cheap on the fly computation.

3.2 Beamlet Modeling Along Detector Row Coordinate v

Section 3.1 describes the modeling of the finite detector width and finite focal spot for the 2D fanbeam geometry. In the case of the 3D conebeam imaging geometry this modeling needs to be applied along both the detector coordinate u and the row coordinate v. This can be done in a separable manner by applying the fanbeam-type modeling as is during the fast-direction interpolation step and then applying a similar modeling during the z-direction interpolation step.

Recall, from Section 2.2.2(d), that during the fast-direction interpolation, every z-slice of the kernel-stage input image is identically subject to the fanbeam fast-direction interpolation step. So, in order to incorporate the modeling of a finite detector width and finite focal spot in the u direction we simply apply the fan-beam geometry beamlet modeling, from Section 3.1, identically to every z-slice.

Figure 38A:
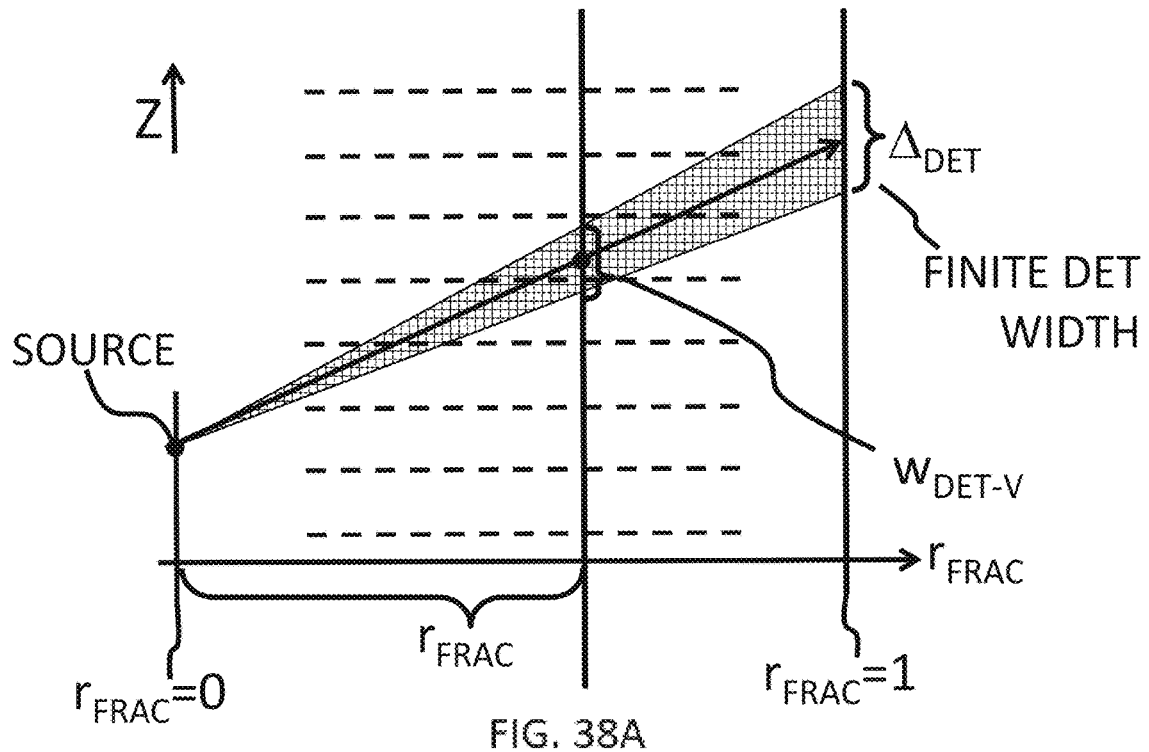
FIGS. 38A-38B illustrate the modeling of beamlets along detector row coordinate v as explained in Section 3.2 FIG. 38A Geometry of finite detector width FIG. 38B Geometry of finite focal spot.
Figure 38B:
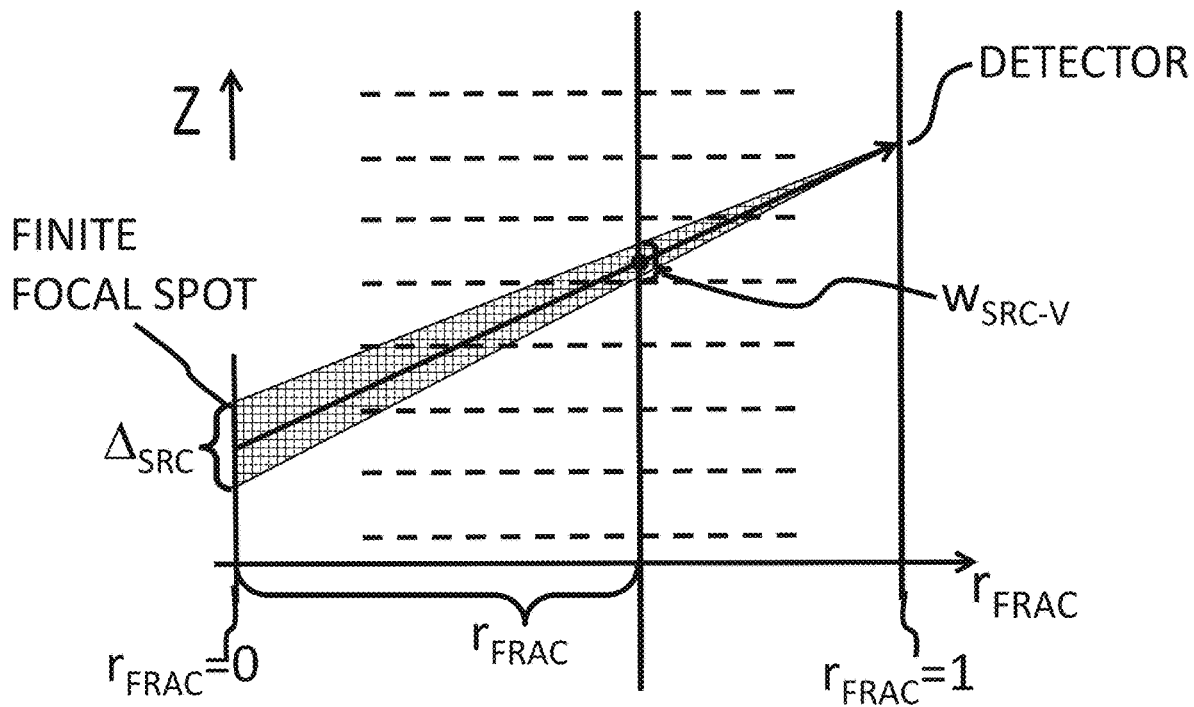

The output of this step is an image volume $g_1[n_{\alpha,\beta}, m_s, m_z]$. Every 2D slice of this volume $g_1[n_{\alpha,\beta}, :, :]$, when transformed to the coordinate system of y the input image to the whole reprojector corresponds to a plane that passes through the center of the source and the detector panel as shown in FIG. 38A. FIGS. 38A-B show a side view cut through the geometry and detector panel. They are oriented perpendicular to the inplane views depicted in FIG. 37.

Recall from Section 2.2.2(d) and FIG. 20 that the second step of kernel-stage filtering is interpolation along the z coordinate. FIG. 38A depicts z-direction interpolation combined with finite detector width modeling, similarly to how FIG. 37B depicts fast direction interpolation combined with finite detector width modeling. Rather than model the ray as a 1D line integral between an infinitesmal source and an infinitesmal detector we approximate the 2D integral in the shaded triangle that connects an infinitesmal source with a detector whose diameter is $\Delta_{DET}$. The 2D integral is formulated as the sum over inner strip integrals similar to (87). Recall that the inner strip integrals are indexed by $m_s$ and each strip is centered on a sample that lies on the ray if it were from an infinitesmal source to an infinitesmal detector. One such sample is shown by the dot. The height of the shaded triangle at the location this sample, i.e. the range of the inner strip integral, is $w_{DET-V} \cdot r_{FRAC}$ is the same as in the fan-beam case i.e. it is distance of a point from a source when projected onto the $x_1$-$x_2$ plane, as a fraction of the source-to-detector distance. So $r_{FRAC}$ ranges from 0.0 (at the source, at the left hand side of the subfigure) to 1.0 (at the detector, at the right hand side of the subfigure).

FIG. 38B depicts z-direction interpolation combined with finite focal spot modeling, similarly to how FIG. 37E depicts fast direction interpolation combined with finite focal spot modeling. Rather than model the ray as a 1D line integral between an infinitesmal source and an infinitesmal detector we approximate the 2D integral in the shaded triangle that connects an infinitesmal detector with a source whose diameter is $\Delta_{SRC}$. The 2D integral is again approximated by the sum of inner strip integrals similar to (87). The height of the shaded triangle at the location of the sample shown by the dot, i.e. the range of the inner strip integral, is $w_{SRC-V}$.

It is easy to see from FIG. 38A that $w_{DET-V}$ is proportional to $r_{FRAC}$ i.e. $w_{DET-V}=r_{FRAC}\Delta_{DET}$. From FIG. 38B it is easy to see that the relationship of $w_{SRC-V}$ to $r_{FRAC}$ is $w_{SRC-V}=\Delta_{SRC}(1-r_{FRAC})$. Using the fact that $r_{FRAC}=w_{DET-V}/\Delta_{DET}=1-(w_{SRC-V}/\Delta_{SRC})$ we derive the equations relating $w_{SRC-V}$ and $w_{DET-V}$:

$$w_{SRC-V} = \Delta_{SRC}(1 - r_{FRAC}) = \Delta_{SRC}\left(1 - \frac{w_{DET-V}}{\Delta_{DET}}\right) \triangleq w_{det \to src}(w_{DET-V}) \quad (97)$$

One way to incorporate both finite focal spot and finite detector width modeling into the z interpolation step at the same time is to use the beamlets method suggested in Section 3.1.2. It prescribes replacing the interpolation basis function $\psi$ with a beamlet modified basis function $\hat{\psi}(x, w_{SRC-V}, w_{DET-V})$. If the values of the beamlet-modified basis function were stored in a look-up table it would appear that it would need to be a 3D table. But because of the affine relationship between $w_{SRC-V}$ and $w_{DET-V}$ the second two coordinates can be collapsed into one i.e., for a fixed x and $w_{DET-V}$ the value of $\hat{\psi}$ will not need to be known at a range of $w_{SRC-V}$ but only for $w_{SRC-V}$ as defined in (97). So the domain of $(w_{DET-V}, w_{SRC-V})$ is collapsed from 2D to a 1D manifold.

So when computing the lookup table, rather than computing a 3D table that is a discretization of $\hat{\psi}(x, w_{DET-V}, w_{SRC-V})$: $E_{3D}[n_x, n_{wd}, n_{ws}] \triangleq \hat{\psi}(n_x \Delta_x, n_{wd} \Delta_{wd}, n_{ws} \Delta_{ws})$ we only need compute the following 2D table $E_{2D}[n_x, n_{wd}] \triangleq \hat{\psi}(n_x \Delta_x, n_{wd} \Delta_{wd}, w_{det \rightarrow src}(n_{wd} \Delta_{wd}))$ where $w_{det \rightarrow src}$ defined in (97) specifies the affine relationship between $w_{DET-V}$ and $w_{SRC-V}$.

3.2.1 Adjoint

Recall from Section 2.4 that backprojection requires the use of the adjoints of the operators used in reprojection. The adjoint expressions for sourcelet and detectorlet modeling are derived from their respective forward equations are derived by reversing the forward sourcelet and detector equations (96) and (94).

The adjoint of detectorlet modeling is $$\hat{y}^d[m_f, m_s] = \sum_{\beta,\alpha} g^d_{\beta,\alpha}[m_s] \hat{\psi}(h^{\beta,\alpha}[m_s] - m_f, \omega_{DET}(\beta, \alpha, m_s)) \quad (98)$$

And the adjoint of sourcelet modeling is $$\hat{y}^d[m_f, m_s] = \sum_{\beta,\alpha} g^d_{\beta,\alpha}[m_s]$$

$$\hat{\psi}(h^{\beta,\alpha}[m_s] - m_f, \omega_{SRC}(x_1(h^{\beta,\alpha}[m_s], m_s), x_2(h^{\beta,\alpha}[m_s], m_s))) \quad (99)$$

In each case every sample of every ray that is mapped to a kernel stage input image $g_{\beta,\alpha}^d[m_s]$ is multiplied by a scalar weight $\hat{\psi}(\ldots)$ and accumulated into the kernel stage image $\hat{y}^d$.

3.3 Integrating Detectors

Instead of modeling finite-width detectors using detectorlets where the values of multiple adjacent samples are weighted and averaged as explained in Section 3.1.1, we now describe an alternative preferred embodiment in which the 2D integral over the shaded triangle in FIG. 37B or FIG. 38A can be evaluated more accurately. Sections 3.3.1-3.3.2 derive the method and Section 3.3.4 specifies exactly how it is used in the Kernel stage of the RP methods

3.3.1 Incorporating Integration into 1D Resampling

Suppose we are given a 1D discrete signal $y^d[n]$ that are samples of a continuous-domain signal $y(t)$ and an ordered set of output coordinates $\{s_m\}_{m=1,\ldots,M}$. We want to compute an output signal $g[m] = \int_{s_m}^{s_m+1} y(t) dt$ for $m=0, 1, \ldots, M-1$.

Suppose $y(t)$ lies in the space of spline basis functions i.e., $y(t) = \sum_n \hat{y}[n] \psi(t-n)$ where $\psi(t)$ is the spline basis function of some order. We can recover $\hat{y}$ from $y^d$ by performing a spline transform, as explained in Section 1.1.4. Define $h[m] = \int_{t=-\infty}^{s_m} y(t) dt$. Then $$g[m] = h[m+1] - h[m] \quad (100)$$

Consequently $$h[m] = \int_{t=-\infty}^{s_m} \sum_n \hat{y}[n] \psi(t-n) dt =$$

$$\sum_n \hat{y}[n] \int_{t=-\infty}^{s_m} \psi(t-n) dt = \sum_n \hat{y}[n] \int_{t'=-\infty}^{s_m-n} \psi(t') dt'$$

Denoting by $\tilde{\psi}$ the integrated version of the basis function i.e.

$$\tilde{\psi}(t) = \int_{t'=-\infty}^{t} \psi(t') dt' \quad (101)$$

then $$h[m] = \sum_n \hat{y}[n] \tilde{\psi}(s_m - n) \quad (102)$$

3.3.2 Handling the Non-Compact Support of $\tilde{\psi}$

For a cubic spline $\psi(t)$ has a support of $(-2, +2)$. Consequently $\tilde{\psi}(t)$ has a support of $(-2, +\infty)$. This seems like it would make the computation much less efficient but this can be efficiently dealt with as follows. For the rest of this section we will assume that $\psi$ is a cubic spline but the method can be generalized to other basis functions.

Note that $\tilde{\psi}(t)$ is constant valued for $t \geq 2$. Let this value be denoted $\tilde{\psi}(\infty)$. So $\tilde{\psi}(x) \neq 0$ and $\tilde{\psi}(x) \neq \tilde{\psi}(\infty)$ if and only if $x \in (-2, +2)$. Consequently $$(\tilde{\psi}(s_m - n) \neq 0) \& (\tilde{\psi}(s_m - n) \neq 0) \Leftrightarrow ((s_m - n) \in (-2, +2)) \quad (103)$$

$$\Leftrightarrow ((n - s_m) \in (-2, +2)) \quad (104)$$

$$\Leftrightarrow ((n - s_m) > -2) \& ((n - s_m) < +2) \quad (105)$$

$$\Leftrightarrow (n > (s_m - 2)) \& (n < (s_m + 2)) \quad (106)$$

$$s_m \in \mathbb{R}, n \in \mathbb{Z} \Leftrightarrow n \in \{n_{ST}(s_m), n_{ST}(s_m) + 1, \quad (107)$$

$$n_{ST}(s_m) + 2, n_{ST}(s_m) + 3\} \quad (108)$$

where we define $n_{ST}(m) \triangleq \lfloor s_m \rfloor - 1 \quad (109)$

So the sum (102) can be broken up as follows:

$$h[m] = \sum_{n=-\infty}^{n_{ST}(m)-1} \hat{y}[n] \tilde{\psi}(s_m - n) + \sum_{n=n_{ST}(m)}^{n_{ST}(m)+3} \hat{y}[n] \tilde{\psi}(s_m - n) \quad (110)$$

$$= \sum_{n=-\infty}^{n_{ST}(m)-1} \hat{y}[n] \tilde{\psi}(\infty) + \sum_{n=n_{ST}(m)}^{n_{ST}(m)+3} \hat{y}[n] \tilde{\psi}(s_m - n) \quad (111)$$

We break up the sum this way as we know, from (108)-(109), that the only four indices n for which $\vec{\tilde{\psi}}(s_m - n)$ will have a value that is neither zero nor $\tilde{\psi}(\infty)$ is $\{n_{ST}(m), n_{ST}(m)+1, \ldots, n_{ST}(m)+3\}$.

Since we are ultimately only concerned with $g[m] = h[m+1] - h[m]$, let us consider special cases of adjacent $s_m$. In each case we want to show that our output value depends on a finite sum rather than an infinite sum.

If $s_m$ and $s_{m+1}$ lie within the same integer interval i.e. for some $P \in \mathbb{Z}$, $P \leq s_m < s_{m+1} < (P+1)$:

$$h[m] = \sum_{n=0}^{n_{ST}(m)-1} \hat{y}[n] \tilde{\psi}(\infty) + \sum_{n=n_{ST}(m)}^{n_{ST}(m)+3} \hat{y}[n] \tilde{\psi}(s_m - n)$$

and $$h[m+1] = \sum_{n=0}^{n_{ST}(m+1)-1} \hat{y}[n]\tilde{\psi}(\infty) + \sum_{n=n_{ST}(m+1)}^{n_{ST}(m+1)+3} \hat{y}[n]\tilde{\psi}(s_{m+1}-n)$$

Since $s_m$ and $s_{m+1}$ lie in the same integer interval $n_{ST}(m)=n_{ST}(m+1)$. So when computing $g[m]=h[m+1]-h[m]$ the first sums cancel and we get the following expression which consists of finite sums:

$$g[m] = \sum_{n=n_{ST}(m+1)}^{n_{ST}(m+1)+3} \hat{y}[n]\tilde{\psi}(s_{m+1}-n) - \sum_{n=n_{ST}(m)}^{n_{ST}(m)+3} \hat{y}[n]\tilde{\psi}(s_m-n)$$

If $s_m$ and $s_{m+1}$ lie in different integer intervals then the first sums do not cancel exactly so $$g[m] = h[m+1] - h[m]$$
$$= \tilde{\psi}(\infty)\left(\sum_{n=0}^{n_{ST}(m+1)-1} \hat{y}[n] - \sum_{n=0}^{n_{ST}(m)-1} \hat{y}[n]\right) + \sum_{n=n_{ST}(m+1)}^{n_{ST}(m+1)+3} \hat{y}[n]\tilde{\psi}(s_{m+1}-n)$$
$$- \sum_{n=n_{ST}(m)}^{n_{ST}(m)+3} \hat{y}[n]\tilde{\psi}(s_m-n)$$

It turns out that the exact form of this expression differs if $\{s_m\}$ is an increasing or decreasing sequence, but we still get finite sums. Putting both cases together we get the following expression for $g[m]=h[m+1]-h[m]=$ $$\sum_{n=n_{ST}(m+1)}^{n_{ST}(m+1)+3} \hat{y}[n]\tilde{\psi}(s_{m+1}-n) - \sum_{n=n_{ST}(m)}^{n_{ST}(m)+3} \hat{y}[n]\tilde{\psi}(s_m-n) \quad (112)$$

$$+ \begin{cases} \sum_{n=n_{ST}(m)}^{n_{ST}(m+1)-1} \hat{y}[n] & \text{if } n_{ST}(m+1) > n_{ST}(m) \\ -\sum_{n=n_{ST}(m+1)}^{n_{ST}(m)-1} \hat{y}[n] & \text{if } n_{ST}(m+1) < n_{ST}(m) \\ 0 & \text{if } n_{ST}(m+1) = n_{ST}(m) \end{cases} \quad (113)$$

3.3.3 Interpolation with Integrating Detectors

Putting together the pieces from the previous sections, we lay out the whole procedure to perform interpolation with integrating detectors on a 1D input signal y to produce a 1D output signal g.

First we compute $\{h[0], h[1], \ldots, h[M-1]\}$ efficiently as follows. We need to keep track of if adjacent $s_m$'s lie in the same interval or not. Let us denote the first sum by $h_\infty[m]$ i.e. $h_\infty[m] = \sum_{n=-\infty}^{n_{ST}(m+1)-1} \hat{y}[n]\tilde{\psi}(\infty)$ For m=0 explicitly compute $h_\infty[m]$ and add in the normal four-tap summation to get $h[m]$ i.e.

$$h[0] = h_\infty[0] + \sum_{n=n_{ST}(0)}^{n_{ST}(0)+3} \hat{y}[n]\tilde{\psi}(s_0-n) \quad (114)$$

For m>0, if $s_m$ lies in the same integer interval as $s_{m-1}$ (i.e. $\lfloor s_{m-1}\rfloor=\lfloor s_m\rfloor$) then let $h_\infty[m]=h_\infty[m-1]$ and add in the four-tap summation as in (114):

$$h[m] = h_\infty[m] + \sum_{n=n_{ST}(m)}^{n_{ST}(m)+3} \hat{y}[n]\tilde{\psi}(s_m-n) \quad (115)$$

For m>0, if $s_m$ lies in a different integer interval than $s_{m-1}$ (i.e., $\lfloor s_{m-1}\rfloor \neq \lfloor s_m \rfloor$) then increment $h_\infty[m]$ by the difference:

$$\text{If } s_m > s_{m-1} \quad h_\infty[m] = h_\infty[m-1] + \tilde{\psi}(\infty)\sum_{n=n_{ST}(m-1)}^{n_{ST}(m)-1} \hat{y}[n] \quad (116)$$

$$\text{else } h_\infty[m] = h_\infty[m-1] - \tilde{\psi}(\infty)\sum_{n=n_{ST}(m)}^{n_{ST}(m+1)-1} \hat{y}[n] \quad (117)$$

and then add in the four-tap summation exactly as in (115).

After we perform the steps described in (114) to (117), that we call interpolation-integration. We then take a finite difference to compute the output g i.e., $h[m]=g[m+1]-g[m]$ In practice we apply the method above modified in the following two ways: (i) Since we are only concerned with the difference we can simplify things further by setting $h_\infty[0]=0$ (ii) We don't simply take the integral but also scale by the $$\frac{1}{s_{m+1} - s_m}$$

i.e.

$$g[m] = \frac{1}{s_{m+1} - s_m} \int_{t=s_m}^{s_{m+1}} y(t)dt.$$

This scaling changes the sign when $s_{m+1}<s_m$. The only change to the algorithm is that the output is scaled by $1/(s_{m+1}-s_m)$.

Consider the cost of this method. Ignoring the update of $h_\infty$, the number of taps over which the summation is performed is the same as for the normal spline interpolation (5) that does not include the integration width. This is an improvement over detectorlet modeling in which the summation over detectorlets causes the filter length to be longer than the underlying spline filter. The cost of updating $h_\infty$ depends on the spacing of $s_m$ but is typically a small fraction of the cost of the four-tap summation.

Since we deal with signals on finite domains, we can enforce the further restriction that $\hat{y}[n]$ is negligible outside the set of indices $n \in [0, \ldots, N]$. Combining it with $h_\infty[0]=0$ we rewrite (111) as:

$$h[m] = \sum_{n=0}^{n_{ST}(m)-1} \hat{y}[n]\tilde{\psi}(\infty) + \sum_{n=n_{ST}(m)}^{n_{ST}(m)+3} \hat{y}[n]\tilde{\psi}(s_m - n) \quad (118)$$

$$= \sum_{n=0}^{n_{ST}(0)-1} \hat{y}[n]\tilde{\psi}(\infty) + \sum_{n=n_{ST}(0)}^{n_{ST}(m)-1} \hat{y}[n]\tilde{\psi}(\infty) + \quad (119)$$

$$\sum_{n=n_{ST}(m)}^{n_{ST}(m)+3} \hat{y}[n]\tilde{\psi}(s_m - n)$$

$$= h_\infty[0] + \sum_{n=n_{ST}(0)}^{n_{ST}(m)-1} \hat{y}[n]\tilde{\psi}(\infty) + \sum_{n=n_{ST}(m)}^{n_{ST}(m)+3} \hat{y}[n]\tilde{\psi}(s_m - n) \quad (120)$$

$$= (A_s\hat{y})[m] + (A_f\hat{y})[m] \quad (121)$$

$$\text{where } (A_s\hat{y})[m] \triangleq \sum_{n=n_{ST}(0)}^{n_{ST}(m)-1} \hat{y}[n]\tilde{\psi}(\infty) \quad (122)$$

$$\text{and } (A_f\hat{y})[m] \triangleq \sum_{n=n_{ST}(m)}^{n_{ST}(m)+3} \hat{y}[n]\tilde{\psi}(s_m - n) \quad (123)$$

So interpolation with integration detectors is the sum of two operators: a cumulative sum $A_s$ and a filtering operator $A_f$.

3.3.4 Kernel Stage: Separable Interpolation with Integrating Detectors

Recall from Section 2.2.2(a), that at the kernel stage we have an input image $I_{L,n}$ and a set of indices $\mathcal{I}_n$, containing triplets of the form $(m_\beta, m_\alpha, m_\nu)$, that specify which rays are synthesized from this input image. This set is further partitioned into indices that share the same view-index i.e. $\mathcal{I}_n = \mathcal{I}_{n,m_\beta^1} \cup \mathcal{I}_{n,m_\beta^2} \cup \ldots \cup \mathcal{I}_{n,m_\beta^{N_n}}$, The outer loop of the kernel stage iterates over these sets. Each set $\mathcal{I}_{n,m_\beta}$ contains triplet indices that all share the same view index $m_\beta$. Separable interpolation is performed first in the fast direction and then the z direction.

Recall from (79), that for the infinitesmal detector case, the fast direction interpolation step computes a 2D image $g_1$ from the kernel-stage input image i.e., $g_1[m_s, m_z] = I_{L,n}{}^d [h_f^{\beta,\alpha,\nu}[m_s], m_s, m_z]$. In the finite detector width case we apply the 1D procedure described in Section 3.3.3 to each 1D signal $I_{L,n}{}^d[\bullet, m_s, m_z]$, i.e. first an interpolation-integration step, followed by a finite differencing step.

For the interpolation-integration step we need to know not just the fan-angles $\alpha$ but the fan-angles of the detector boundaries $\tilde{\alpha}$, which is specified in the geometry specification, similar to (73). Let the number of unique fan-angle indices in $\mathcal{I}_{n,m_\beta}$ be $N_\alpha$. It is always true that the set of fan-angle indices in $\mathcal{I}_{n,m_\beta}$ forms a contiguous set $A \triangleq \{\alpha_{m_0+1}, \alpha_{m_0+2}, \ldots, \alpha_{m_0+N_\alpha}\}$ for some integer $m_0$. Then the number of detector boundaries is $N_\alpha + 1$ and let this set be defined as $\tilde{A} \triangleq \{\tilde{\alpha}_1, \tilde{\alpha}_2, \ldots, \tilde{\alpha}_{N_\alpha+1}\}$.

So we first perform a 1D interpolation-integration along the fast coordinate of the 3D volume $I_{L,n}{}^d$, which is of size $N_f \times N_s \times N_z$, to produce a 3D volume $g_3$ of size $(N_\alpha+1) \times N_s \times N_z$. Here we use $\tilde{\psi}$ the integrated version of the spline basis function. The set of interpolation-integration coordinates $\{s_m\}$ to be applied to the 1D signal $I_{L,n}{}^d[\bullet, m_s, m_z]$ is $\{h_f^{\beta,\alpha_m,\nu}[m_s]: n=1, 2, \ldots, N_\alpha+1\}$ (where $h_f^{\beta,\alpha,\nu}$ is defined in (77)). So the $m^{th}$ plane $g_3[m, \cdot, \bullet]$, $m \in \{1, 2, \ldots, (N_\alpha+1)\}$, corresponds to $\tilde{\alpha}_m$ the $m^{th}$ element of the set of detector boundary fan-angles.

Then we take the first order difference along the fast coordinate to complete the fast-direction step of the separable interpolation using integrating detectors. In order to compute the 2D array corresponding to fan-angle $\alpha_m$, that we denote as $g_1^{\alpha_m}$, we need to take the finite difference between the two appropriate adjacent planes of $g_3$. Comparing the sets A and $\tilde{A}$, specified above, we see that fan-angle $\alpha_m$ is dependent on the planes $m-m_0$ and $m-m_0+1$ i.e., $$g_1^{\alpha_m}[m_s, m_z] = g_3[m-m_0+1, m_s, m_z] - g_3[m-m_0, m_s, m_z]$$

We then apply the same procedure, interpolation-integration and finite-differencing, along the z coordinate of $g_1^{\alpha_m}$ to get $g_2[m_s]$. The set of coordinates to use when operating on the 1D signal $g_1^{\alpha_m}[m_s, \bullet]$ is $\{h_z^{\beta,\alpha,\tilde{\nu}_m}[m_s]: m=1, 2, \ldots, N_\nu+1\}$ where $\tilde{\nu}_1, \tilde{\nu}_2, \ldots, \tilde{\nu}_{N_\nu+1}$ are the set of row coordinates of the detector boundaries and $h^{\beta,\alpha,\nu}$ is defined in (77).

3.3.5 Adjoint

Recall from Section 2.4 that backprojection requires the use of the adjoints of the operators used in reprojection. In order to derive the adjoint of integrating-detector interpolation on a 1D input signal, we make use of (121) which expresses integrating-detector interpolation as the sum of two operators. Without loss of generality we assume henceforth that $\tilde{\psi}(\infty)=1$ (which is the case for the B-spline basis).

Note that since the kernel-stage images upon which integrating-detector interpolation is performed are finite in extent and real-valued and the operators $A_s$ and $A_f$ are linear, the operations can be written as matrix-vector products with real-valued matrices. Given an operation represented by the multiplication of a vector by a real valued matrix A, the adjoint of this operation is represented by multiplication by the transpose matrix $A^T$. So the output signal of integrating detector interpolation is $h=(A_s+A_f)f$, and therefore the adjoint operator is $(A_s^T+A_s^T)$.

The matrix representing the filtering operator is derived by translating the sum in (123) into matrix form:

$$A_f[m, n] = \begin{cases} \tilde{\psi}(s_m - n) & \text{for } n_{ST}(m) \leq n \leq n_{ST}(m) + 3 \\ 0 & \text{otherwise} \end{cases}$$

And therefore the adjoint filtering matrix is $A_f^T[m, n] = A_f[n, m]$

We then compute the adjoint of the cumulative sum part $A_s^T$. The formula for the matrix $A_s$ is derived by translating the sum in (122) into matrix form:

$$A_s[m, n] = \begin{cases} \tilde{\psi}\infty & \text{for } n_{ST}(0) \leq n \leq n_{ST}(m) - 1 \\ 0 & \text{otherwise} \end{cases} \quad (124)$$

Figure 39A:
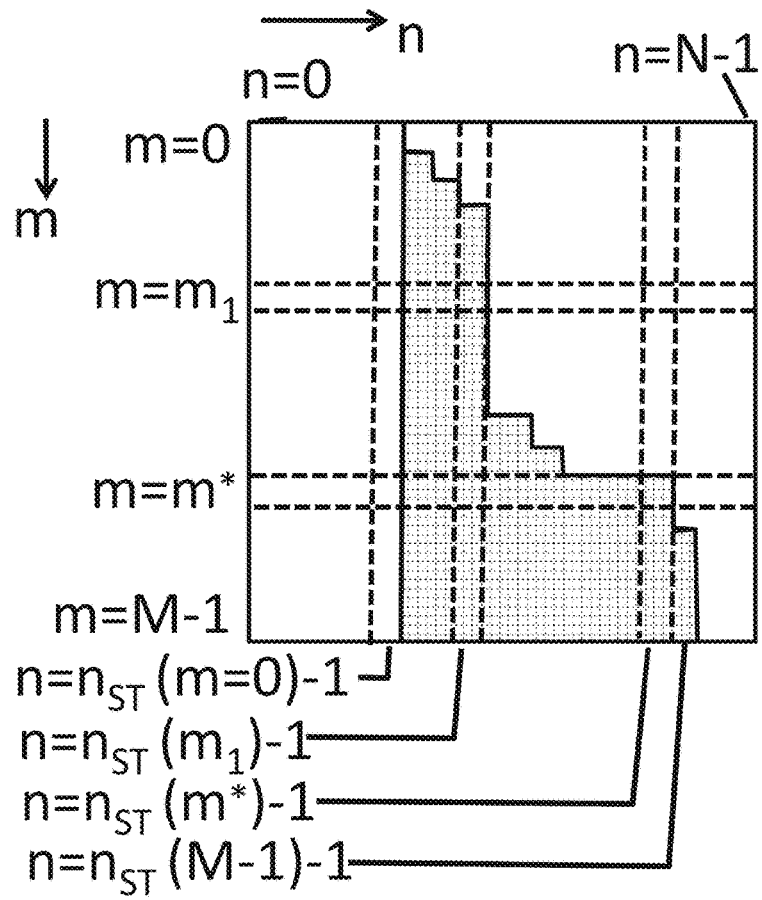
FIGS. 39A-39B are illustrations of the forward cumulative sum operator and its adjoint.
Figure 39B:
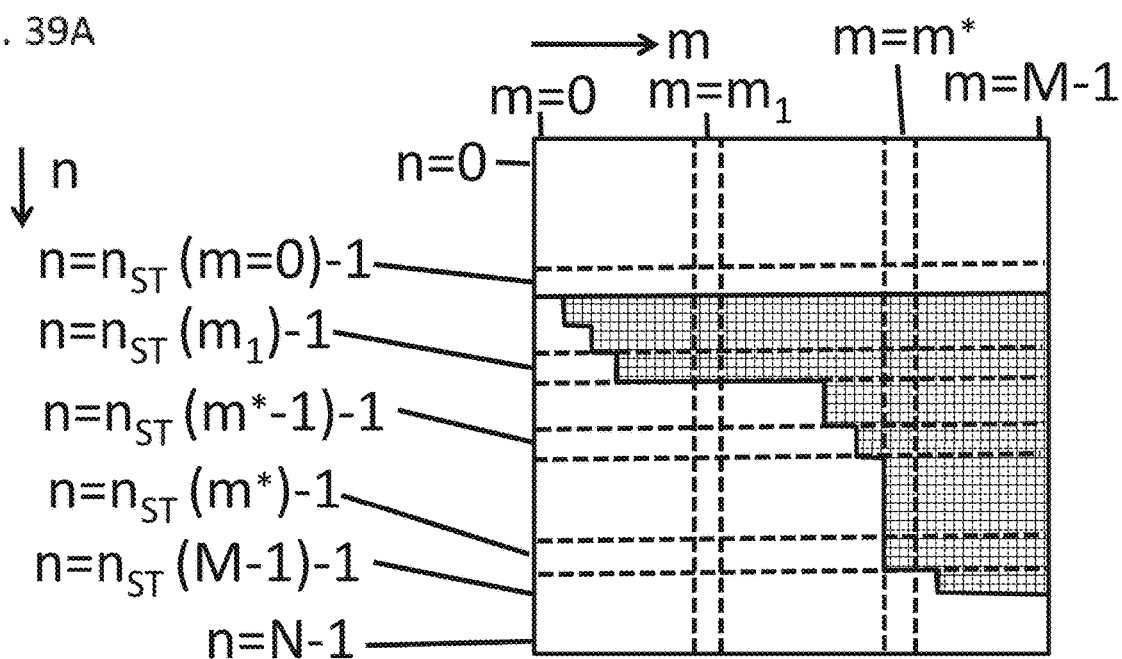

FIG. 39A shows the matrix $A_s$ and FIG. 39B shows its transpose $A_s^T$. The entries in the hatched region are equal to a constant $\tilde{\psi}(\infty)$ which is exactly 1.0 when $\psi$ is a spline basis function of $\tilde{\psi}$ which is its integrated version. The entries in the non-hatched region are zero.

The formulation for $A_s^T$, equivalent to (124), can be constructed by examining FIG. 39B. It is as follows. Given a matrix row index n, suppose there is an m*s.t. $n \geq n_{ST}(m^*-1)$ and $n \leq (n_{ST}(m^*)-1)$ then $A_s^T(n, m) = \tilde{\psi}(\infty)$ for $m \geq m^*$.

FIG. 40 displays code that computes the application of the operator $A_s^T$ on an input signal h to produce the output signal $\hat{y}$(y_hat). It iterates backwards over the input variable m. Here the function $n_{ST}(m)$ is as defined in (109) and is a monotonically increasing function of m. The for-loop over k is necessary for the case when $n_{ST}(m-1) < n_{ST}(m)-1$ (such as for m=m* in FIG. 39B. In the case when $n_{ST}(m-1)=n_{ST}(m)-1$ (such as for m=$m_1$ in FIGS. 39A-39B), then next_zh=zh+1 so the for-loop over k reduces to f [n_st (m)]=running_sum.

3.3.6 Integrating Detector+Finite Focal Spot

To model both a finite detector width and a finite focal spot at the same time we combine the beamlet-modeling of the finite focal spot described in Section 3.1.2 with the integrating detector method described in Section 3.3.3. Just like in the beamlets and integrating detectors case we reduce the computations to an interpolation type operation followed by a finite differencing.

Recall the geometry in FIG. 37F which shows the case of a finite focal spot and an infinitesmal detector. To enhance readability and to avoid multiple subscripts, let us focus on the 1D interpolation performed along a single row (indexed by $m_s$). The input 1D signal $\hat{y}^d$ is the $m_s^{th}$ row of the kernel-stage input image and the output is a 1D signal $g^d[m]$ of length M containing all the rows to be synthesized from this kernel-stage image for a single view-angle β. Let the integration width due to the finite focal spot, at the $m^{th}$ output ray be $w_{SRC}^m$ (Equation (95), scaled to the coordinate frame of the kernel stage input image). We can express this case, with an infinitesmal detector and finite focal spot, mathematically as follows. This is derived similar to the infinitesmal source, finite detector width case (94) and reduced to 1D:

$$g^d[m] = \sum_k \zeta_k y(t_m + \delta_k w_{SRC}^m) \quad (125)$$

Here $t_m$ is the 1D interpolation coordinate for the $m^{th}$ ray for the infinitesmal source and infinitesmal detector case (ref (77)).

We incorporate the finite detector width via integrating detector modeling. For this we need the interpolation coordinates of the detector boundaries (which we get from the geometry specification similar to Section 3.3.4). Since there are M adjacent rays, there are M+1 detector boundary interpolation coordinates $\{s_m\}$ (similar to Section 3.3.1). So we modify (125) by incorporating the integration between detector boundaries:

$$g^d[m] = \sum_k \zeta_k \int_{t=s_m+\delta_k w_{SRC}^m}^{s_{m+1}+\delta_k w_{SRC}^m} y(t) dt \quad (126)$$

Similar to (102), let us define $$h_k[m] \triangleq \int_{t=-\infty}^{s_m+\delta_k w_{SRC}^m} y(t)dt \stackrel{(102)}{=} \sum_n \hat{y}[n]\tilde{\psi}(s_m + \delta_k w_{SRC}^m - n)$$

So $$g^d[m] = \sum_k \zeta_k (h_k[m+1] - h_k[m])$$

In order to be able to define $g^d[m]=h[m+1]-h[m]$ similarly to (100), we define h[m] as follows $$h[m] \triangleq \sum_k \zeta_k h_k[m] = \sum_k \zeta_k \sum_n \hat{y}[n]\tilde{\psi}(s_m + \delta_k w_{SRC}^m - n) \quad (127)$$

$$= \sum_n \hat{y}[n] \sum_k \zeta_k \tilde{\psi}(s_m + \delta_k w_{SRC}^m - n) \quad (128)$$

We can then define h in terms of a spline basis function that incorporates both beamlet modeling of the finite focal spot and integrating detector modeling of the finite detector width:

$$h[m] = \sum_n \hat{y}[n]\overline{\psi}(s_m - n, w_{SRC}^m) \quad (129)$$

$$\text{where } \overline{\psi}(x, w) \triangleq \sum_k \zeta_k \tilde{\psi}(x + \delta_k w)$$

Comparing (129) to (102) we see that the expression for the incorporation of finite focal spot modeling is exactly the same as that for integrating detectors, except with a different modified basis function $\overline{\psi}$ that incorporates both beamlet and integrating detector modeling.

So the 1D interpolation procedure is a straightforward application of the procedure in Section 3.3.3 with $\overline{\psi}$ substituted in for $\tilde{\psi}$. The procedure to apply this in the kernel stage is exactly as explained in Section 3.3.4 with $\overline{\psi}$ substituted in for $\tilde{\psi}$. And the adjoint application procedure is as explained in Section 3.3.5 with $\overline{\psi}$ substituted in for $\tilde{\psi}$.

One difference between $\tilde{\psi}$ and $\overline{\psi}$, is that the latter has a focal spot width parameter w. In practice $\overline{\psi}$ is precomputed and stored in a lookup table for the expected range of focal spot widths w. Every point evaluated in the kernel stage has an associated width $w_{SRC}$, as seen in FIG. 37E, and that is the width parameter that is used in $\overline{\psi}$.

In this document we have described several preferred embodiments of fast algorithms for tomographic backprojection and reprojection. Starting with the 2D parallel-beam geometry (Section 1.2), we extended it to the 2D fan-beam (Section 1.3), 3D cone-beam (Section 2), and wide cone-beam geometries (Section 2.3). In Section 2.4 we describe the accompanying backprojection method and in Section 3 we describe a variation of the methods to incorporate more accurate physical modeling of tomographic systems.

APPENDICES

A Proof of RP Based on the Shear-Scale Operator

We show that $$\int_{-\infty}^{\infty} f\left(\begin{bmatrix}\cos\theta & -\sin\theta \\ \sin\theta & \cos\theta\end{bmatrix}\begin{bmatrix}t \\ s\end{bmatrix}\right)ds = \quad (130)$$

$$\frac{1}{\cos\theta}\int_{-\infty}^{\infty} f\left(\begin{bmatrix}1/\cos\theta & -\tan\theta \\ 0 & 1\end{bmatrix}\begin{bmatrix}t \\ s\end{bmatrix}\right)ds$$

Figure 2B:
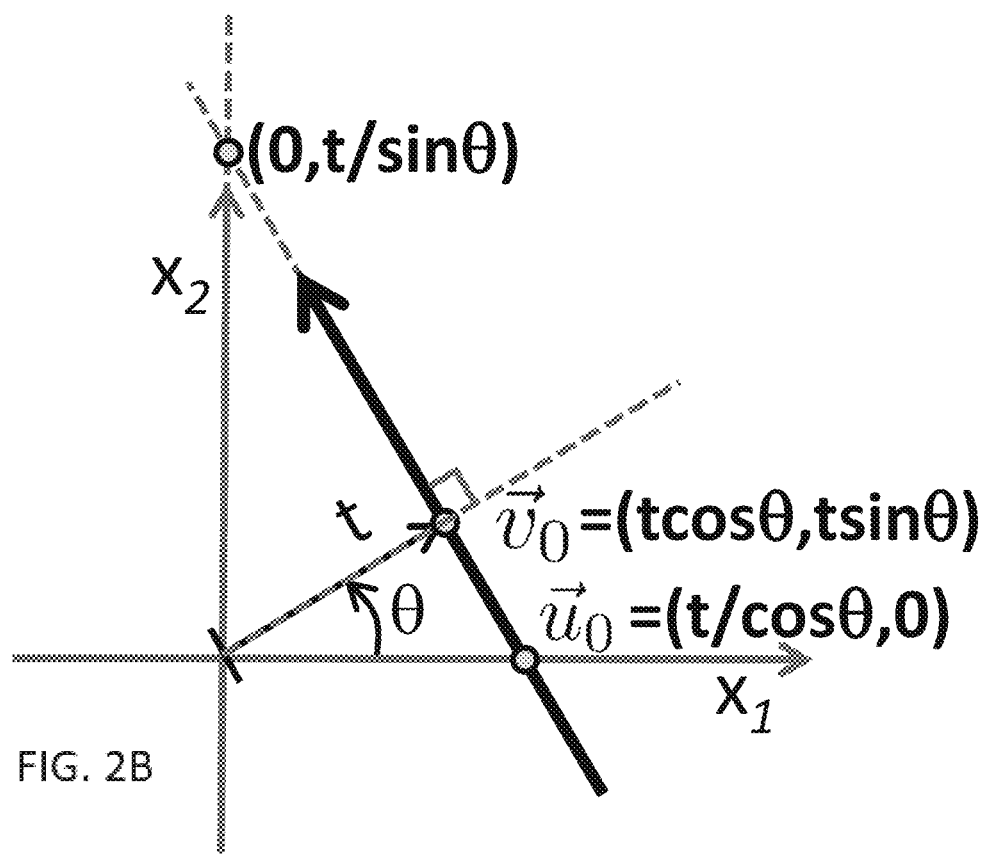

For a fixed t, θ consider the line upon which this line-integral is performed, illustrated in FIG. 2B.

$$\vec{x}_R(s) = \begin{bmatrix} t\cos\theta \\ t\sin\theta \end{bmatrix} + s\begin{bmatrix} -\sin\theta \\ \cos\theta \end{bmatrix} \stackrel{\Delta}{=} \vec{v}_0 + s\vec{v}_1 \quad (131)$$

Now consider a different parameterization of the same line $\vec{u}_0 + s\vec{u}_1$ where $\vec{u}_0$ lies on the $x_1$ axis:

$$\vec{x}_S(s) = \begin{bmatrix} t/\cos\theta \\ 0 \end{bmatrix} + s\begin{bmatrix} -\tan\theta \\ 1 \end{bmatrix} \stackrel{\Delta}{=} \vec{u}_0 + s\vec{u}_1 \quad (132)$$

The points $\vec{u}_0$ and $\vec{v}_0$ are shown in FIG. 2B.

Note that $\vec{v}_1 = \vec{u}_1 \cos\theta$ and $\vec{v}_0 = (\vec{u}_0 + t\sin\theta \vec{u}_1)$:

$$\vec{u}_1 \cos\theta \stackrel{(132)}{=} \begin{bmatrix} -\tan\theta \\ 1 \end{bmatrix} \cos\theta = \begin{bmatrix} -\sin\theta \\ \cos\theta \end{bmatrix} \stackrel{(131)}{=} \vec{v}_1 \quad (133)$$

$$(\vec{u}_0 + t\sin\theta \vec{u}_1) \stackrel{(132)}{=} \begin{bmatrix} t/\cos\theta \\ 0 \end{bmatrix} + t\sin\theta \begin{bmatrix} -\tan\theta \\ 1 \end{bmatrix} \quad (134)$$

$$= t\begin{bmatrix} (1/\cos\theta) - (\sin\theta\tan\theta) \\ \sin\theta \end{bmatrix}$$

$$= t\begin{bmatrix} (1 - \sin^2\theta)/\sin\theta \\ \sin\theta \end{bmatrix} \quad (135)$$

$$= t\begin{bmatrix} \cos^2\theta/\cos\theta \\ \sin\theta \end{bmatrix}$$

$$= t\begin{bmatrix} \cos\theta \\ \sin\theta \end{bmatrix}$$

$$\stackrel{(131)}{=} \vec{v}_0$$

It follows that that $\vec{x}_R(s) = \vec{x}_S(sc_1 + c_2)$ where $c_1 = \cos\theta$ and $c_2 = t\sin\theta$:

$$\vec{x}_S(s\cos\theta + t\sin\theta) \stackrel{(132)}{=} \vec{u}_0 + (s\cos\theta + t\sin\theta)\vec{u}_1 \quad (136)$$

$$= (\vec{u}_0 + t\sin\theta \vec{u}_1) + s\cos\theta \vec{u}_1$$

$$\stackrel{(133-135)}{=} \vec{v}_0 + s\vec{v}_1 \quad (137)$$

$$\stackrel{(131)}{=} \vec{x}_R(s)$$

Now we are ready to conclude the proof. Starting with the LHS of (130) we get:

$$\int_{-\infty}^{\infty} f\left(t\begin{bmatrix} \cos\theta \\ \sin\theta \end{bmatrix} + s\begin{bmatrix} -\sin\theta \\ \cos\theta \end{bmatrix}\right) ds = \int_{-\infty}^{\infty} f(\vec{x}_R(s)) ds$$

$$\stackrel{(137)}{=} \int_{-\infty}^{\infty} f(\vec{x}_S(s\cos\theta + t\sin\theta)) ds$$

$$[r = s\cos\theta + t\sin\theta \text{ and } dr = ds\cos\theta] = \frac{1}{\cos\theta}\int_{-\infty}^{\infty} f(\vec{x}_S(r)) dr$$

$$\stackrel{(132)}{=} \frac{1}{\cos\theta}\int_{-\infty}^{\infty} f\left(\begin{bmatrix} t/\cos\theta \\ 0 \end{bmatrix} + r\begin{bmatrix} -\tan\theta \\ 1 \end{bmatrix}\right) dr$$

$$= \frac{1}{\cos\theta}\int_{-\infty}^{\infty} f\left(\begin{bmatrix} 1/\cos\theta & -\tan\theta \\ 0 & 1 \end{bmatrix}\begin{bmatrix} t \\ r \end{bmatrix}\right) dr$$

$$= RHS \text{ of } (130)$$

B Proofs of Shear and Shear-Scale Identities

Consider a sequence of two linear image transformations operators $g = \mathcal{A}_2 \mathcal{A}_1 f$, where each operator $\mathcal{A}_n y(\vec{x}) = y(A_n \vec{x})$ and $A_n \in \mathbb{R}^{2 \times 2}$ are matrices. Then we can decompose this into two steps as $h = \mathcal{A}_1 f$ and $g = \mathcal{A}_2 h$. So $h(\vec{x}) = y(A_1 \vec{x})$ and $g(\vec{x}) = h(A_2 \vec{x})$. And $g(\vec{x}) = h(A_2 \vec{x}) = y(A_1 A_2 \vec{x})$ i.e.

$$g(\vec{x}) = (\mathcal{A}_2 \mathcal{A}_1 f)(\vec{x}) = y(A_1 A_2 \vec{x})$$

Therefore $\mathcal{S}(\alpha_2) \mathcal{S}(\alpha_1) = \mathcal{S}(\alpha_2 + \alpha_1)$ follows from the matrix identity:

$$\begin{bmatrix} 1 & \alpha_1 \\ 0 & 1 \end{bmatrix}\begin{bmatrix} 1 & \alpha_2 \\ 0 & 1 \end{bmatrix} = \begin{bmatrix} 1 & \alpha_1 + \alpha_2 \\ 0 & 1 \end{bmatrix}$$

The proof of $\mathcal{S}(\alpha_1) \mathcal{S}(\alpha_2) \ldots \mathcal{S}(\alpha_n) = \mathcal{S}(\alpha_1 + \alpha_2 + \ldots + \alpha_n)$ follows trivially.

Likewise $\mathcal{C}(\sigma_1, \sigma_2) \mathcal{S}(\alpha) = \mathcal{C}(\sigma_1, \sigma_2 + \alpha)$ follows from the matrix identity $$\begin{bmatrix} 1 & \alpha \\ 0 & 1 \end{bmatrix}\begin{bmatrix} \sigma_1 & \sigma_2 \\ 0 & 1 \end{bmatrix} = \begin{bmatrix} \sigma_1 & \sigma_2 + \alpha \\ 0 & 1 \end{bmatrix} \quad (138)$$

A special case of (138) is that $\mathcal{C}(\sigma_1, 0) \mathcal{S}(\alpha) = \mathcal{C}(\sigma_1, \alpha)$. Equation (138) says that when a shear is followed by a shear-scale the shear-parameters simply add and the scale parameter remains unchanged.

C Derivation of Periodic Sinc (Dirichlet Kernel) Interpolator

We show that multiplying the DFT of a signal by $$H[k] = e^{\frac{i\tau 2\pi k}{N}}$$

is equivalent to interpolating onto the continuous domain with a periodic sinc interpolator, delaying by a fractional shift $\tau$ and resampling. We start by computing the inverse DFT of the $H[k]$. Without loss of generality we are assuming that the signal and DFT length $N = 2M+1$ is odd:

$$h[n] = \quad (139)$$

$$\frac{1}{N}\sum_{k=-M}^{M} H[k] \cdot e^{\frac{i2\pi kn}{(2M+1)}} = \frac{1}{N}\sum_{k=-M}^{M} e^{\frac{i\tau 2\pi k}{N}} \cdot e^{\frac{i2\pi kn}{(2M+1)}} = \frac{1}{N}\sum_{k=-M}^{M} e^{\frac{i2\pi k}{N}(n+\tau)}$$

We use the following property of the summation of exponentials:

$$\sum_{k=-M}^{M} a^k = \frac{(a^{M+0.5} - a^{-(M+0.5)})}{(a^{0.5} - a^{-0.5})} \quad (140)$$

Using (140) to simplify (139), by using the substitution $\alpha = e^{i\beta}$ where $$\beta = \frac{2\pi}{N}(n + \tau)$$

we get:

$$h[n] = \frac{1}{N}\sum_{k=-M}^{M} e^{\frac{i2\pi k}{N}(n+\tau)} = \frac{\sin(\pi(n+\tau))}{N\sin\left(\frac{\pi}{N}(n+\tau)\right)} \quad (141)$$

So $h[n]=\psi(n+\tau)$ where $\psi(x)=\sin(\pi x)/(N \sin(\pi x/N))$ is the periodic Sinc (or Dirichlet kernel) interpolator. So multiplying the DFT of y by the DFT of h is equivalent, in the space-domain, to convolving y with h where h is the periodic Sinc interpolator, delayed by $\tau$ and sampled with a unit sample spacing. This is in turn equivalent to interpolating y using the periodic sinc interpolator and then sampling it on a sample grid delayed by $\tau$. This completes derivations and proofs in the Appendices.

Figure 41:
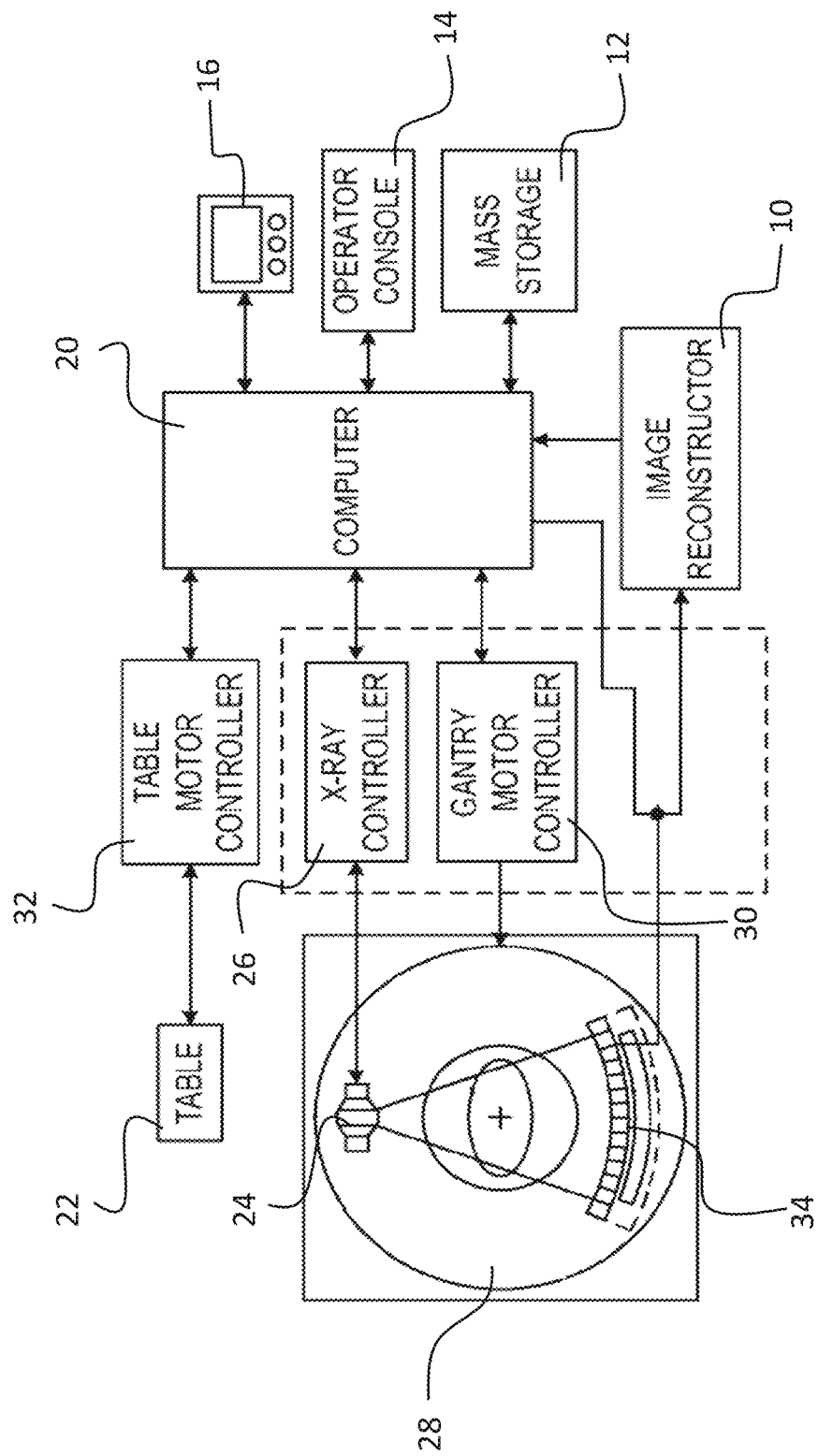
FIG. 41 is a schematic diagram of a preferred embodiment that includes the reprojection and backprojection computed tomography system of the invention.

FIG. 41 illustrates a system of the invention that includes an image reconstructor 10 that conducts reprojection and backprojection suitable for integrating detectors and addresses overlap of rays and voxels in image space. Image data is stored in mass storage 12. An operator console 14 is used to direct system operations, and a display 16 can display reconstructed images. A computer 20 coordinates system operations and data acquisition. During operation of the system, projection data of a subject under examination lying on an imaging table 22 (schematically represented but being movable within the center of a gantry 28) is acquired by operating an X-ray source 24 under control of an X-ray controller 26 while spinning the gantry 28 under control of a gantry motor controller 30, and moving the table 22 under control of a table motor controller 32, with the controllers being coordinated by the computer 20, instructed by commands given by an operator through the operator console 14. An integrating detector array 34 detects radiation passing through the subject. Detected electrical signals at the detector are digitized and transmitted to the image reconstructor 10 and computer 20, which stores reconstructed images in mass storage 12. After preprocessing and correction, projection data are derived from the detector data and fed to an iterative reconstruction module of the image reconstructor 10. The image reconstructor 10 can be a software module implementing the method of this invention and running on the computer 20, or a separate physical device, itself a computer running the software implementing a preferred method of the invention. Alternatively, the image reconstructor can be implemented in a combination of hardware, firmware, and software, including GPUs (graphical processing units), FPGAs, ASICS, circuit boards, and various electronic or electro-optical components.

Figure 42:
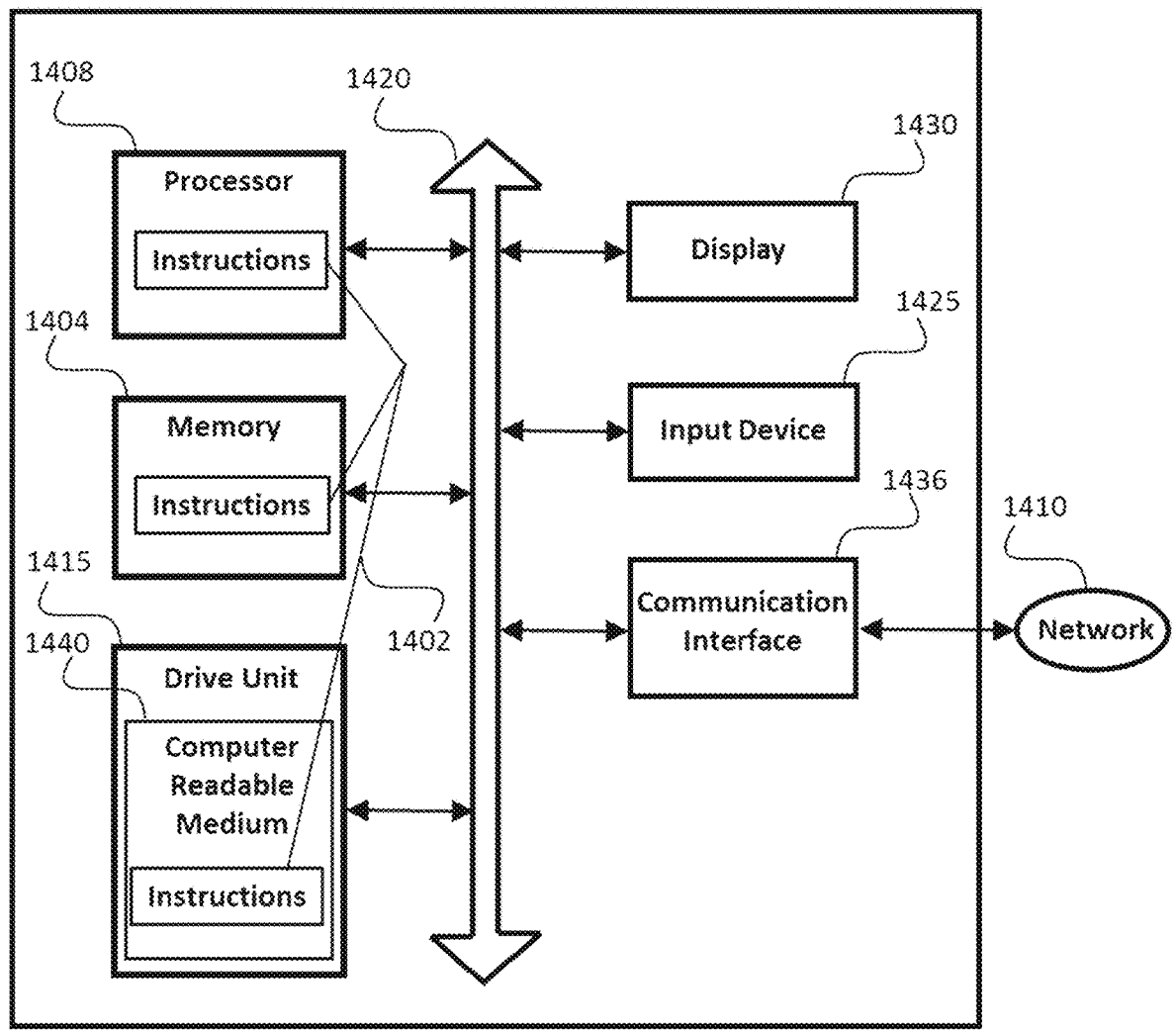
FIG. 42 illustrates a general computer system that can perform preferred methods of the invention and can serve as both the image reconstructor 10 and the computer 20 of FIG. 41.

FIG. 42 illustrates a general computer system 1400 that can perform the above methods and can serve as both the image reconstructor 10 and the computer 20 of FIG. 1. The system 1400 can represent such a computer in a computed tomography (CT) system, or other imaging system, or a processing device coupled with an imaging system for processing imaging data from an imagining system, and generating control signals such as acquisition parameter settings for an imaging system. The computer system 1400 may include an ordered listing of a set of instructions 1402 that may be executed to cause the computer system 1400 to perform any one or more of the methods or computer-based functions disclosed herein. The computer system 1400 may operate as a stand-alone device or may be connected to other computer systems or peripheral devices, e.g., by using a network 1410.

In a networked deployment, the computer system 1400 may operate in the capacity of a server or as a client-user computer in a server-client user network environment, or as a peer computer system in a peer-to-peer (or distributed) network environment. The computer system 1400 may also be implemented as or incorporated into various devices, such as a personal computer or a mobile computing device capable of executing a set of instructions 1402 that specify actions to be taken by that machine, including and not limited to, accessing the internet or web through any form of browser. Further, each of the systems described may include any collection of sub-systems that individually or jointly execute a set, or multiple sets, of instructions to perform one or more computer functions.

The computer system 1400 may include a memory 1404 on a bus 1420 for communicating information. Code operable to cause the computer system to perform any of the acts or operations described herein may be stored in the memory 1404. The memory 1404 may be a random-access memory, read-only memory, programmable memory, hard disk drive or any other type of volatile or non-volatile memory or storage device.

The computer system 1400 may include a processor 1408, such as a central processing unit (CPU) and/or a graphics processing unit (GPU). The processor 1408 may include one or more general processors, digital signal processors, application specific integrated circuits, field programmable gate arrays, digital circuits, optical circuits, analog circuits, combinations thereof, or other now known or later-developed devices for analyzing and processing data. The processor 1408 may implement the set of instructions 1402 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The computer system 1400 may also include a disk or optical drive unit 1415. The disk drive unit 1415 may include a non-transitory computer-readable medium 1440 in which one or more sets of instructions 1402, e.g., software, can be embedded. Further, the instructions 1402 may perform one or more of the operations as described herein. The instructions 1402 may reside completely, or at least partially, within the memory 1404 and/or within the processor 1408 during execution by the computer system 1400. Accordingly, the data acquired by a scanner or imaging system and/or the numerical phantom data generated as described above may be stored in the memory 1404 and/or the disk unit 1415. The memory 1404 and the processor 1408 also may include non-transitory computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 1400 may include an input device 1425, such as a keyboard or mouse, configured for a user to interact with any of the components of system 1400. It may further include a display 1430, such as a liquid crystal display (LCD), a cathode ray tube (CRT), or any other display suitable for conveying information. The display 1430 may act as an interface for the user to see the functioning of the processor 1408, or specifically as an interface with the software stored in the memory 1404 or the drive unit 1415.

The computer system 1400 may include a communication interface 1436 that enables communications via the communications network 1410. The network 1410 may include wired networks, wireless networks, or combinations thereof. The communication interface 1436 to the network may enable communications via any number of communication standards, such as 802.11, 802.17, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be embedded in a computer program, which includes features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for forward projection in divergent beam computed tomography (CT) to obtain output divergent beam tomographic projections from a pixel or voxel image, the method comprising:
providing the pixel or voxel image as an input image;
performing digital image coordinate transformations on the input image to produce multiple intermediate-images of which one or more are sampled on Cartesian or rotated and/or translated sheared Cartesian grids, wherein one or more of the digital image coordinate transformations is a combination of shears and/or rotations in the 2D or 3D DTFT (discrete time Fourier transform) domain with parameters chosen so that an intermediate-image being produced contains Fourier content sufficient to fully synthesize 2D or 3D parallel-beam X-ray transform projections of the input image at a set of angles and can be represented with a desired accuracy by sparse samples on Cartesian or rotated and/or translated sheared Cartesian grids;
performing additional digital image coordinate transformations in a recursive manner, for a finite number of recursions, to produce additional intermediate-images, wherein one of more of the additional digital image coordinate transformations is a combination of shears and/or rotations in the 2D or 3D DTFT domain with parameters chosen so that an intermediate image being produced contains Fourier content sufficient to fully synthesize 3D parallel-beam X-ray transform projections of the input image at a subset of the set of angles that could be synthesized prior to the digital image transformation and is sampled on a Cartesian or rotated and/or translated sheared Cartesian grid; and
producing samples of the output tomographic projections by interpolation of the intermediate-images onto lines, curves or surface, and weighted summation of the data along lines, curves, or surfaces.

2. The method of claim 1, wherein said producing, performing digital image coordinate transformations, performing additional digital image coordinate transformations and producing samples are conducted in the space domain without any Fourier Transformations.

3. The method of claim 1, wherein said performing digital image coordinate transformations is conducted in a hybrid space-Fourier domain with Fast Fourier Transforms and complementary inverse Fast Fourier Transforms being performed along one or more coordinate directions.

4. The method of claim 3, wherein said performing digital image coordinate transformations executes 1D spline transforms along one or more coordinate axes of the input image.

5. The method of claim 4, comprising executing a finite impulse response filtering along a fast coordinate direction, executing a discrete Fourier transform along a fast coordinate direction and executing a finite impulse response filtering along a slow coordinate with output produced on uniformly spaced coordinates with fractional spacing.

6. The method of claim 1, wherein said performing digital image coordinate transformations executes wide cone-angle hierarchical partitioning such that at least one intermediate-image corresponds to a cell of restricted size in a domain of azimuthal-elevation angles and can be used to compute a 3D parallel beam projection parameterized by coordinate parameters that lie inside the cell.

7. The method of claim 6, wherein a cell corresponding to one or more intermediate-images in a later recursion is of smaller extent than a cell corresponding to an intermediate-image in an earlier recursion.

8. The method of claim 1, wherein the input image is first subjected to pre-decomposition by a fully spatial 3D rotation, an upsampling along a coordinate direction and a cropping along a coordinate axis to exploit spatial locality.

9. The method of claim 1, wherein, during said performing additional digital image coordinate transformations in a recursive manner, one or more of the digital coordinate transformations are performed independently on different planes of a 3D pixel array being operated upon.

10. The method of claim 9, wherein, during one or more of the digital coordinate transformations, the output pixel value of one plane is computed independently of output pixel values in any other plane.

11. The method of claim 10, wherein the sparse samples are produced from multiple intermediate-images by applying a combination of frequency selective filtering, modulation and interpolation.

12. The method of claim 1, wherein during said producing digital image coordinate transformations, a tomographic detector element of non-infinitesimal extent is emulated by filtering selected samples of an intermediate-image, so that said filtering has the combined effect of interpolation onto a set of diverging lines and weighted averaging of the values obtained by said interpolation.

13. The method of claim 1, wherein said producing digital image coordinate transformations comprises emulating a non-infinitesimal extent of a tomographic source by filtering selected samples of an intermediate-image, so that said filtering has the combined effect of interpolation onto a set of converging lines and weighted averaging of the values obtained by the interpolation.

14. The method of claim 1 wherein the intermediate-images produce projection samples that correspond to lines in a 3D tomographic geometry whose angles of azimuth and angles of elevation differ, respectively, by no more than predetermined amounts, the amounts decreasing from one level of recursions to a next level of recursion.

15. The method of claim 1, wherein said performing digital image coordinate transformations and performing additional digital image coordinate transformation comprise decreasing a spatial extent of the transformed intermediate-images.

16. The method of claim 1, wherein said producing digital image coordinate transformations and performing additional digital image coordinate transformation conduct an interpolation by consecutively applying 1D interpolation or 1D resampling on one or more coordinate directions.

17. A method for forward projection in computed tomography (CT) to obtain output tomographic projections from a pixel or voxel image, the method comprising:

providing the pixel or voxel image as an input image;

performing digital image coordinate transformations on the input image to produce multiple intermediate-images of which one or more are sampled on Cartesian or sheared Cartesian grids, the parameters of one or more coordinate transformations being chosen such that Fourier spectral support of an intermediate-image being produced is modified so that a region of interest has a reduced extent along one or more coordinate direction and the intermediate-images can be represented with a desired accuracy by sparse samples;

repeating said performing digital image coordinate transformations in a recursive manner, for a finite number of recursions, to produce additional intermediate-images of which one or more are sampled on a Cartesian or sheared Cartesian grid; and producing samples of the output tomographic projections by interpolation of the intermediate-images onto lines, curves or surface, and weighted summation of the data along lines, curves, or surfaces, wherein said producing comprises emulating a non-infinitesimal extent of a tomographic detector element, or of both detector element and source, by processing selected samples of at least one intermediate-image by (i) forming a first 1D signal;

(ii) applying a filter to the first 1D signal to produce a second 1D signal;

(iii) applying a cumulative summation operation to the first 1D input signal to produce a third 1D signal by traversing the first 1D input signal and the third 1D signal in order of increasing index, and setting the third 1D signal value at a particular index to the sum of the third 1D signal at the previous index plus a selection between a sample from the first 1D signal or zero;

(iv) adding the second 1D signal and the third 1D signal sample by sample to produce a fourth 1D signal; and (v) computing the differences between selected adjacent samples of the fourth 1D signal.

* * * * *